United States Patent
Jeon et al.

(10) Patent No.: US 11,419,066 B2
(45) Date of Patent: Aug. 16, 2022

(54) BEAM FAILURE REPORT

(71) Applicant: Comcast Cable Communications, LLC, Philadelphia, PA (US)

(72) Inventors: Hyoungsuk Jeon, Oakton, VA (US);
Esmael Hejazi Dinan, Herndon, VA (US); Kyungmin Park, Herndon, VA (US); Hua Zhou, Herndon, VA (US);
Ali Cirik, Herndon, VA (US); Alireza Babaei, Fairfax, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 181 days.

(21) Appl. No.: 16/277,400

(22) Filed: Feb. 15, 2019

(65) Prior Publication Data

US 2019/0253986 A1  Aug. 15, 2019

Related U.S. Application Data

(60) Provisional application No. 62/631,332, filed on Feb. 15, 2018.

(51) Int. Cl.
*H04W 52/36* (2009.01)
*H04B 7/06* (2006.01)
(Continued)

(52) U.S. Cl.
CPC ........ *H04W 52/365* (2013.01); *H04B 7/0626* (2013.01); *H04B 7/0695* (2013.01);
(Continued)

(58) Field of Classification Search
CPC .... H04B 7/04; H04B 7/06; H04L 1/00; H04L 25/02; H04L 5/0048
See application file for complete search history.

(56) References Cited

U.S. PATENT DOCUMENTS

| 9,125,218 | B2 | 9/2015 | Chang |
| 9,736,795 | B2 | 8/2017 | Dinan |

(Continued)

FOREIGN PATENT DOCUMENTS

| CN | 108809580 A | 11/2018 |
| EP | 3397015 A1 | 10/2018 |

(Continued)

OTHER PUBLICATIONS

R2-1707001 3GPP TSG-RAN WG2 Meeting #AH, Qingdao, China, Jun. 27-29, 2017, Source: Lenovo, Motorola Mobility, Title: Random access procedure for beam recovery request.

(Continued)

*Primary Examiner* — Khaled M Kassim
*Assistant Examiner* — Berhanu D Belete
(74) *Attorney, Agent, or Firm* — Banner & Witcoff, Ltd.

(57) ABSTRACT

Systems, apparatuses, and methods are described for wireless communications. A wireless device configured to communicate via beams of one or more cells may report a beam failure using a media access control (MAC) control element (CE) (e.g., a power headroom report (PHR) MAC CE). The MAC CE may also be used to report other information for one or more cells with which the wireless device is associated. Beam failure reporting with a MAC CE may be combined with other beam failure procedures.

18 Claims, 35 Drawing Sheets

(51) Int. Cl.

| | | |
|---|---|---|
| *H04W 80/02* | (2009.01) | |
| *H04W 72/04* | (2009.01) | |
| *H04W 16/28* | (2009.01) | |
| *H04L 1/00* | (2006.01) | |
| *H04L 25/02* | (2006.01) | |
| *H04L 5/00* | (2006.01) | |
| *H04W 76/11* | (2018.01) | |
| *H04W 76/19* | (2018.01) | |
| *H04B 7/0413* | (2017.01) | |

(52) U.S. Cl.
CPC .......... *H04L 1/0061* (2013.01); *H04L 5/0048* (2013.01); *H04L 25/0226* (2013.01); *H04W 16/28* (2013.01); *H04W 72/042* (2013.01); *H04W 72/046* (2013.01); *H04W 72/0466* (2013.01); *H04W 72/0473* (2013.01); *H04W 76/11* (2018.02); *H04W 76/19* (2018.02); *H04W 80/02* (2013.01); *H04B 7/0413* (2013.01)

(56) References Cited

U.S. PATENT DOCUMENTS

| | | |
|---|---|---|
| 9,949,298 B1 | 4/2018 | Akoum et al. |
| 2010/0279700 A1 | 11/2010 | Kim et al. |
| 2013/0039345 A1 | 2/2013 | Kim et al. |
| 2013/0188580 A1 | 7/2013 | Dinan |
| 2013/0250828 A1 | 9/2013 | Chou et al. |
| 2015/0189574 A1 | 7/2015 | Ng et al. |
| 2015/0208462 A1 | 7/2015 | Lee et al. |
| 2015/0365921 A1 | 12/2015 | Wu |
| 2017/0195998 A1 | 7/2017 | Zhang et al. |
| 2017/0207843 A1 | 7/2017 | Jung et al. |
| 2017/0332406 A1 | 11/2017 | Islam et al. |
| 2017/0339662 A1 | 11/2017 | Lin et al. |
| 2017/0373731 A1 | 12/2017 | Guo et al. |
| 2018/0006770 A1 | 1/2018 | Guo et al. |
| 2018/0054348 A1 | 2/2018 | Luo et al. |
| 2018/0054382 A1 | 2/2018 | Luo et al. |
| 2018/0054783 A1 | 2/2018 | Luo et al. |
| 2018/0054811 A1 | 2/2018 | Luo et al. |
| 2018/0054812 A1 | 2/2018 | Luo et al. |
| 2018/0054832 A1 | 2/2018 | Luo et al. |
| 2018/0083753 A1 | 3/2018 | Nagaraja et al. |
| 2018/0098334 A1 | 4/2018 | Tie et al. |
| 2018/0110066 A1 | 4/2018 | Luo et al. |
| 2018/0115940 A1 | 4/2018 | Abedini et al. |
| 2018/0115990 A1 | 4/2018 | Abedini et al. |
| 2018/0124687 A1 | 5/2018 | Park et al. |
| 2018/0132266 A1 | 5/2018 | Chen et al. |
| 2018/0138962 A1 | 5/2018 | Islam et al. |
| 2018/0176958 A1 | 6/2018 | Islam et al. |
| 2018/0191422 A1 | 7/2018 | Xia et al. |
| 2018/0219604 A1 | 8/2018 | Lu et al. |
| 2018/0220448 A1 | 8/2018 | Akkarakaran et al. |
| 2018/0227899 A1* | 8/2018 | Yu .................... H04B 7/088 |
| 2018/0234960 A1 | 8/2018 | Nagaraja et al. |
| 2018/0241452 A1 | 8/2018 | Akkarakaran et al. |
| 2018/0249453 A1 | 8/2018 | Nagaraja et al. |
| 2018/0270698 A1 | 9/2018 | Babaei et al. |
| 2018/0270699 A1 | 9/2018 | Babaei et al. |
| 2018/0270700 A1 | 9/2018 | Babaei et al. |
| 2018/0278310 A1 | 9/2018 | Lee et al. |
| 2018/0279150 A1 | 9/2018 | He et al. |
| 2018/0279193 A1 | 9/2018 | Park et al. |
| 2018/0279229 A1 | 9/2018 | Dinan et al. |
| 2018/0279318 A1* | 9/2018 | Wang .................. H04B 7/0695 |
| 2018/0288756 A1 | 10/2018 | Xia et al. |
| 2018/0302889 A1 | 10/2018 | Guo et al. |
| 2018/0310321 A1 | 10/2018 | Basu Mallick et al. |
| 2018/0317123 A1* | 11/2018 | Chen ................. H04W 72/0413 |
| 2018/0323856 A1 | 11/2018 | Xiong et al. |
| 2018/0324723 A1 | 11/2018 | Akkarakaran et al. |
| 2018/0324867 A1 | 11/2018 | Basu Mallick et al. |
| 2018/0343653 A1 | 11/2018 | Guo |
| 2018/0351611 A1 | 12/2018 | Nagaraja et al. |
| 2018/0367374 A1 | 12/2018 | Liu et al. |
| 2018/0368009 A1* | 12/2018 | Xia ..................... H04B 7/088 |
| 2018/0368126 A1 | 12/2018 | Islam et al. |
| 2018/0368142 A1 | 12/2018 | Liou |
| 2019/0028174 A1 | 1/2019 | Chakraborty et al. |
| 2019/0037423 A1 | 1/2019 | Yu et al. |
| 2019/0037498 A1* | 1/2019 | Tseng ................ H04W 72/0413 |
| 2019/0053294 A1* | 2/2019 | Xia ................... H04W 72/0413 |
| 2019/0059129 A1 | 2/2019 | Luo et al. |
| 2019/0074882 A1 | 3/2019 | Zhou et al. |
| 2019/0081675 A1* | 3/2019 | Jung ..................... H04B 7/088 |
| 2019/0081689 A1* | 3/2019 | Yu ..................... H04W 74/0833 |
| 2019/0081691 A1* | 3/2019 | Nagaraja ............... H04B 7/0632 |
| 2019/0089579 A1* | 3/2019 | Sang .................. H04W 76/27 |
| 2019/0141592 A1* | 5/2019 | Park .................... H04W 36/08 |
| 2019/0173740 A1 | 6/2019 | Zhang et al. |
| 2019/0182870 A1* | 6/2019 | Shih .................... H04W 74/004 |
| 2019/0190582 A1* | 6/2019 | Guo ................... H04B 7/0695 |
| 2019/0200248 A1* | 6/2019 | Basu Mallick ...... H04B 7/0695 |
| 2019/0207667 A1* | 7/2019 | Zhou .................. H04W 52/146 |
| 2019/0208436 A1* | 7/2019 | Zhou .................. H04L 1/0026 |
| 2019/0215896 A1* | 7/2019 | Zhou .................. H04B 7/0695 |
| 2019/0230529 A1* | 7/2019 | Sadiq .................. H04W 16/28 |
| 2019/0245737 A1* | 8/2019 | Zhou .................... H04B 7/06 |
| 2019/0261288 A1* | 8/2019 | Loehr ............... H04W 72/0446 |
| 2019/0268893 A1* | 8/2019 | Tsai .................. H04W 76/19 |
| 2019/0349915 A1* | 11/2019 | Ahn ................ H04W 72/0413 |
| 2019/0349960 A1* | 11/2019 | Li ...................... H04L 5/0055 |
| 2020/0059398 A1* | 2/2020 | Pan .................. H04W 56/001 |
| 2020/0213034 A1* | 7/2020 | Zhou ................. H04L 1/0009 |
| 2020/0322035 A1* | 10/2020 | Shi ..................... H04L 5/0048 |
| 2020/0344834 A1* | 10/2020 | Harada ................ H04W 76/38 |
| 2020/0374960 A1* | 11/2020 | Deenoo ................ H04W 72/14 |
| 2021/0068162 A1* | 3/2021 | Agiwal ................ H04L 5/0023 |

FOREIGN PATENT DOCUMENTS

| | | |
|---|---|---|
| EP | 3424152 A1 | 1/2019 |
| WO | 2013025142 A1 | 2/2013 |
| WO | 2016127403 A1 | 8/2016 |
| WO | 2017024516 A1 | 2/2017 |
| WO | 2017123060 A1 | 7/2017 |
| WO | 2017135803 A1 | 8/2017 |
| WO | 2017151876 A1 | 9/2017 |
| WO | 2017196612 A1 | 11/2017 |
| WO | 2017217898 A1 | 12/2017 |
| WO | 2018017840 A1 | 1/2018 |
| WO | 2018031327 A1 | 2/2018 |
| WO | 2018031799 A1 | 2/2018 |
| WO | 2018038859 A1 | 3/2018 |
| WO | 2018038860 A1 | 3/2018 |
| WO | 2018038861 A1 | 3/2018 |
| WO | 2018038862 A1 | 3/2018 |
| WO | 2018038864 A1 | 3/2018 |
| WO | 2018075985 A1 | 4/2018 |
| WO | 2018084544 A1 | 5/2018 |
| WO | 2018128426 A1 | 7/2018 |
| WO | 2018129300 A1 | 7/2018 |
| WO | 2018136300 A1 | 7/2018 |
| WO | 2018141303 A1 | 8/2018 |
| WO | 2018144592 A1 | 8/2018 |
| WO | 2018148552 A1 | 8/2018 |
| WO | 2018156299 A1 | 8/2018 |
| WO | 2018156696 A1 | 8/2018 |
| WO | 2018169848 A1 | 9/2018 |
| WO | 2018170481 A1 | 9/2018 |
| WO | 2018171476 A1 | 9/2018 |
| WO | 2018174667 A1 | 9/2018 |
| WO | 2018174800 A1 | 9/2018 |
| WO | 2018175303 A1 | 9/2018 |
| WO | 2018190617 A1 | 10/2018 |
| WO | 2018195975 A1 | 11/2018 |
| WO | 2018196520 A1 | 11/2018 |
| WO | 2018199074 A1 | 11/2018 |
| WO | 2018199079 A1 | 11/2018 |
| WO | 2018199100 A1 | 11/2018 |
| WO | 2018199162 A1 | 11/2018 |

(56) References Cited

FOREIGN PATENT DOCUMENTS

| | | | |
|---|---|---|---|
| WO | 2018199243 A1 | 11/2018 |
| WO | 2018200579 A1 | 11/2018 |
| WO | 2018201450 A1 | 11/2018 |
| WO | 2018201990 A1 | 11/2018 |
| WO | 2018203719 A1 | 11/2018 |
| WO | 2018203785 A1 | 11/2018 |
| WO | 2018204255 A1 | 11/2018 |
| WO | 2018204718 A1 | 11/2018 |
| WO | 2018204922 A1 | 11/2018 |
| WO | 2018222276 A1 | 12/2018 |
| WO | 2018227464 A1 | 12/2018 |
| WO | 2018227551 A1 | 12/2018 |
| WO | 2018228187 A1 | 12/2018 |
| WO | 2018230862 A1 | 12/2018 |
| WO | 2018231655 A1 | 12/2018 |
| WO | 2018232090 A1 | 12/2018 |
| WO | 2018232259 A1 | 12/2018 |
| WO | 2018237400 A1 | 12/2018 |
| WO | 2019004694 A1 | 1/2019 |
| WO | 2019032882 A1 | 2/2019 |

OTHER PUBLICATIONS

R1-17111617 3GPP TSG RAN WG1 NR AH#2, Qingdao, China, Jun. 27-30, 2017, Source: CATT, Title: RACH power control and power ramping procedure (revision of R1-1710034).
R1-1711161 3GPP TSG RAN WG1 NR#2, Qingdao, China, Jun. 27-30, 2017, Source: Qualcomm Incorporated, Title: Beam recovery procedures.
International Search Report and Written Opinion for PCT/US2018/046368 dated Dec. 13, 2018.
Apr. 15, 2019—Extented European Search Report—EP 19150964.5.
R1-1708678 3GPP TSG-RAN WG1 #89, Hangzhou, China, May 15-19, 2017, Source: Ericsson, Title: Beam failure recovery mechanism.
May 22, 2019—Extended European Search Report—19156175.2.
R2-1800560 3GPP TSG-RAN WG2 NR, Vancouver, Canada, Jan. 22-26, 2018, Source: Sharp, Title: Remaining issues on beam failure recovery.
R2-1800632 3GPP TSG-RAN WG2 AH, Vancouver, Canada, Jan. 22-26, 2018, Source: Huawei, HiSilicon, Title: Remaining issue for beam failure recovery.
R2-1801049 3GPP TSG-RAN WG2 AH, Vancouver, Canada, Jan. 22-26, 2018, Source: Huawei, HiSilicon, Title: Non-contention based random access for beam failure recovery in CA.
3GPP TS 38.321 V15.0.0 (Dec. 2017); Technical Specification; 3rd Generation Partnership Project; Technical Specification Group Radio Access Network; NR; Medium Access Control (MAC) protocol specification (Release 15).
3GPP TS 38.213 V15.0.1 (Feb. 2018); Technical Specification; 3rd Generation Partnership Project; Technical Specification Group Radio Access Network; NR; Physical layer procedures for control (Release 15).
R2-1804475 3GPP TSG-RAN WG2 Meeting #101 bis, Sanya, China, Apr. 16-20, 2018, Source: Spreadtrum Communications, Title: Beam Failure recovery on SCell.
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V.14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification (Release 14).
3GPP TR 38.802 V14.1.0 (Jun. 2017); Technical Report; 3rd Generation Partnership Project; Technical Specification Group Radio Access Network; Study on New Radio Access Technology; Physical Layer Aspects (Release 14).
3GPP TR 38.912 V14.0.0 (Mar. 2017); Technical Report; 3rd Generation Partnership Project; Technical Specification Group Radio Access Network; Study on New Radio (NR) Access Technology (Release 14).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #89 v0.2.0 (Hangzhou, China, May 15-19, 2017).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #AH NR2 v0.1.0 (Qingdao, China, Jun. 27-30, 2017).
R1-1708890 3GPP TSG RAN WG1 Meeting #89, Hangzhou, China, May 15-19, 2017, Source: MCC Support, Title:Final Report of 3GPP TSG RAN WG1 #88bis v1.0.0 (Spokane, Washington, Apr. 3-7, 2017).
R1-1709907 3GPP TSG RAN WG1 NR Ad-Hoc#2, Qingdao, China, Jun. 27-30, 2017, Source: Xinwei, Title: Discussion on Beam Failure Recovery.
R1-1709929 3GPP TSG RAN WG1 NR Ad Hoc Meeting, Qingdao, China, Jun. 27-30, 2017, Source: Huawei, HiSilicon, Title: General views on beam failure recovery.
R1-1710058 3GPP TSG RAN WG1 NR Ad-Hoc#2, Qingdao, China, Jun. 27-30, 2017, Source: CATT, Title: Considerations on DL beam failure and recovery.
R1-1710283 3GPP TSG RAN WG1 NR Ad-Hoc#2, Qingdao, China, Jun. 27-30, 2017, Source: LG Electronics, Title: Discussion on beam failure recovery.
R1-1710400 3GPP TSG RAN WG1 NR Ad-Hoc#2, Qingdao, China, Jun. 27-30, 2017, Source: Vivo, Title: Beam failure recovery procedure.
R1-1710596 3GPP TSG RAN WG1 NR Ad-Hoc#2, Qingdao, China, Jun. 27-30, 2017, Source: Lenovo, Motorola Mobility, Title: Discussion of beam recovery procedure.
R1-1710810 3GPP TSG RAN WG1 AH_NR Meeting, Qingdao, China, Jun. 27-30, 2017, Source: MediaTek Inc., Title: Mechanism for flexible beam failure recovery.
R1-1710926 3GPP TSG RAN WG1 NR Ad-Hoc#2, Qingdao, China, Jun. 27-30, 2017, Source: InterDigital, Inc., Title: On Remaining Details of Beam Failure Recovery.
R1-1711017 3GPP TSG RAN WG1 #89ah-NR, Qingdao, China, Jun. 27-30, 2017, Source: Ericsson, Title: Mechanism to recover from beam failure.
R1-1711291 3GPP TSG RAN WG1 NR Ad-Hoc#2, Qingdao, China, Jun. 27-30, 2017, Source: Nokia, Alcatel-Lucent Shanghai Bell, Title: Beam Recovery.
R2-1706680 3GPP TSG-RAN WG2 NR-Adhoc, Qingdao, China, Jun. 27-29, 2017, Source: AT&T, Title: Beam Failure Recovery Mechanism and RLF.
3GPP TSG-RAN WG2 NR Ad Hoc, Qingdao, China, Jun. 27-29, 2017, Source: RAN2 Chairman (Intel), Object: Chairman Notes.
PRACH—Preamble Detection and Timing Advance Estimation for multi-UE in 3GPP LTE, 3GPP LTE Solutions, from www.mymowireless.com.
Jul. 16, 2019—European Extended Search Report—EP 19166184.2.
R1-1702078 3GPP TSG RAN WG1 Meeting #88, Athens, Greece, Feb. 13-17, 2017, Source: CATT, Title: Considerations on beam recovery mechanism.
R1-1707121 3GPP TSG RAN WG1 Meeting #89, Hangzhou, China, May 15-19, 2017, Source: ZTE, Title: Discussion an beam recovery mechanism.

(56) References Cited

OTHER PUBLICATIONS

3GPP TS 38.213 V15.0.0 (Dec. 2017); Technical Specification; 3rd Generation Partnership Project; Technical Specification Group Radio Access Network; NR; Physical layer procedures for control (Release 15).
3GPP TS 38.213 V15.1.0 (Mar. 2018); Technical Specification; 3rd Generation Partnership Project; Technical Specification Group Radio Access Network; NR; Physical layer procedures for control (Release 15).
3GPP TS 38.321 V15.1.0 (Mar. 2018); Technical Specification; 3rd Generation Partnership Project; Technical Specification Group Radio Access Network; NR; Medium Access Control (MAC) protocol specification (Release 15).
3GPP TS 38.331 V15.1.0 (Mar. 2018); Technical Specification; 3rd Generation Partnership Project; Technical Specification Group Radio Access Network; NR; Radio Resource Control (RRC) protocol specification (Release 15).
R1-180xxxx 3GPP TSG RAN WG1 Meeting #93 Busan, South Korea, May 21-25, 2018, Source: Ericsson, Title: Feature lead summary for beam measurement and reporting.
R1-180xxxx 3GPP TSG RAN WG1 Meeting #92bis, Sanya, China, Apr. 16-20, 2018, Source: MediaTek, Inc., Title: Summary 1 on Remaining issues on Beam Failure Recovery.
R1-1803362 3GPP TSG RAN WG1 Meeting #92, Athens, Greece, Feb. 26-Mar. 2, 2018, Source:MediaTek, Inc., Title: Summary on remaining issues on Beam Failure Recovery.
R1-180xxxx 3GPP TSG RAN WG1 Meeting #93 Busan, South Korea, May 21-25, 2018, Source: MediaTek Inc., Title: Summary on Remaining issues on Beam Failure Recovery.
R1-1704400 3GPP TSG RAN WG1 Meeting #8 8bis, Spokane, USA, Apr. 3-7, 2017, Source: ZTE, ZTE Microelectronics, Title: Discussion on beam recovery mechanism.
R1-1704465 3GPP TSG RAN WG1 Meeting #88bis, Spokane, USA, Apr. 3-7, 2017, Source: MediaTek, Inc., Title: Discussion on beam recovery mechanism.
R1-1704478 3GPP TSG RAN WG1 Meeting #88bis, Spokane, USA, Apr. 3-7, 2017, Source: Fujitsu, Title: Discussion an beam failure recovery procedure.
R1-1704723 3GPP TSG RAN WG1 Meeting #88bis, Spokane, USA, Apr. 3-7, 2017, Source: Intel Corporation, Title: Details for UL Beam Management.
May 14, 2019—European Extended Search Report—19157460.7.
Huawei HiSilicon: "RAN2 aspects of DL beam management", Oct. 9, 2017.
Dec. 16, 2019—European Extended Search Report—EP 19191018.1.
Dec. 20, 2019—European Extended Search Report—EP 19199208.0.
R2-1811208 3GPP TSG-RAN WG2 Meeting #103, Gothenburg, Sweden, Aug. 20-24, 2018, Source: CATT, Title: UL/DL BWP linkage for PDCCH order initiated CFRA.
Aug. 27, 2019—European Extended Search Report—EP 19173892.1.
3GPP TSG-RAN WG1 #89: "Beam failure recovery mechanism", May 15, 2017.
3GPP TSG-RAN WG2 Meeting#AH: "Random access procedure for beam recovery request", Jun. 27, 2017.
R1-1807210 3GPP TSG RAN WG1 Meeting #93, Busan, Korea, May 21-25, 2018, Source: ASUSTeK, Title: Remaining issues on beam management.
R1-1804788 3GPP TSG RAN WG1 Meeting #92b, Sanya, China, Apr. 16-20, 2018, Source: Qualcomm, Title: Beam failure recovery procedure.
Jan. 24, 2020—European Extended Search Report—EP 19199658.6.
R2-1804877 3GPP TSG-RAN WG2 Meeting #101 bis, Sanya, China, Apr. 16-20, 2018, Source: Xiaomi, Title: Consideration on SR Transmission Occasion Overlap with a UL-SCH Resource.
R2-18006164 3GPP TSG-RAN WG2 Meeting #101 bis, Sanya, China, Apr. 16-20, 2018, Source: Media Tek Inc., Title: On Parallel SR and RACH Procedure in NR.
R1-170xxxx 3GPP TSG RAN WG1 Meeting #88b, Spokane, USA, Apr. 3-7, 2017, Source: Huawei, HiSilicon, Title: WF on Beam Failure Recovery.
R1-171xxxx 3GPP TSG RAN WG1 Meeting #90, Prague, Czech Republic, Aug. 21-25, 2017, Source: MediaTek Inc. Title: Offline Discussion on Beam Recovery Mechanism.
R1-1704230 3GPP TSG RAN WG1 Meeting #88b, Spokane, USA, Apr. 3-7, 2017, Source: Huawei, HiSilicon, Title: Link recovery procedure for beam failure.
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TSG RAN WG1 Meeting #90, Prague, Czech Republic, Aug. 21-25, 2017, Title: RAN1 Chairman's Notes.
R1-1705719 3GPP TSG RAN WG1 Meeting #88bis, Spokane, USA, Apr. 3-7, 2017, Source: NTT DOCOMO, Inc., Title: Further views on mechanism to recover from beam failure.
R1-1711016 3GPP TSG RAN WG1 #89AH-NR, Qingdao, China, Jun. 27-30, 2017, Source: Ericsson, Title: UL beam management details.
R1-1712223 3GPP TSG RAN WG1 Meeting #90, Prague, Czech Republic, Aug. 21-25, 2017, Source: Huawei, HiSilicon, Title: UL beam management.
R1-1712224 3GPP TSG RAN WG1 Meeting #90, Prague, Czech Republic, Aug. 21-25, 2017, Source: Huawei, HiSilicon, Title: Procedure details for beam failure recovery.
R1-1712268 3GPP TSG RAN WG1 Meeting #90, Prague, Czech Republic, Aug. 21-25, 2017, Source: Xinwei, Title: Discussion on beam failure recovery.
R1-1712299 3GPP TSG RAN WG1 Meeting #90, Prague, Czech Republic, Aug. 21-25, 2017, Source: ZTE, Title: UL beam management for NR MIMO.
R1-1712378 3GPP TSG RAN WG1 Meeting #90, Prague, Czech Republic, Aug. 21-25, 2017, Source: CATT, Title: Considerations on UL beam management.
R1-1712379 3GPP TSG RAN WG1 Meeting #90, Prague, Czech Republic, Aug. 21-25, 2017, Source: CATT, Title: Beam failure detection and recovery.
R1-1712551 3GPP TSG RAN WG1 Meeting #90, Prague, Czech Republic, Aug. 21-25, 2017, Source: Intel Corporation, Title: Details for UL beam management.
R1-1712552 3GPP TSG RAN WG1 Meeting #90, Prague, Czech Republic, Aug. 21-25, 2017, Source: Intel Corporation, Title: Discussion for mechanism to recover from beam failure.
R1-1721672 3GPP TSG RAN WG1 Meeting #90, Prague, Czech Republic, Aug. 21-25, 2017, Source: Lenovo, Motorola Mobility, Title: Discussion of beam failure recovery.
R1-1712713 3GPP TSG RAN WG1 Meeting #90, Prague, Czech Republic, Aug. 21-25, 2017, Source: AT&T, Title: Mechanisms to recover from beam failure.
R1-1712838 3GPP TSG RAN WG1 Meeting #90, Prague, Czech Republic, Aug. 21-25, 2017, Source: Vivo, Title: Discussion on uplink beam management.
R1-1712966 3GPP TSG RAN WG1 Meeting #90, Prague, Czech Republic, Aug. 21-25, 2017, Source: Sony, Title: Considerations on UL beam management.
R1-1713287 3GPP TSG RAN WG1 Meeting #90, Prague, Czech Republic, Aug. 21-25, 2017, Source: Guangdong CPPO Mobile Telecom, Title: Discussion on the UL beam management.
R1-1713596 3GPP TSG RAN WG1 Meeting #90, Prague, Czech Republic, Aug. 21-25, 2017, Source: Samsung, Title: Discussion on UL beam management.
R1-1714143 3GPP TSG RAN WG1 Meeting #90, Prague, Czech Republic, Aug. 21-25, 2017, Source: InterDigital, Inc., Title: On efficient UL beam management.
R1-1714250 3GPP TSG RAN WG1 Meeting #90, Prague, Czech Republic, Aug. 21-25, 2017, Source: Nokia, Nokia Shanghai Bell, Title: SRS transmission for beam management.

(56) References Cited

OTHER PUBLICATIONS

R1-1714292 3GPP TSG RAN WG1 Meeting #90, Prague, Czech Republic, Aug. 21-25, 2017, Source: Ericsson, Title: On UL beam management.
R1-1714383 3GPP TSG RAN WG1 Meeting #90, Prague, Czech Republic, Aug. 21-25, 2017, Source: ASUSTeK, Title: Considerations on UE Beamforming Management.
3GPP TSG RAN WG1 Meeting NR#3, Nagoya, Japan, Sep. 18-21, 2017, Title: RAN1 Chairman's Notes.
R1-1715441 3GPP TSG RAN WG1 Meeting NR#3, Nagoya, Japan, Sep. 18-21, 2017, Source: ZTE, Sanechips, Title: Discussion on beam recovery.
R1-1715620 3GPP TSG RAN WG1 Meeting NR#3, Nagoya, Japan, Sep. 18-21, 2017, Source: Vivo, Title: Discussion on beam failure recovery procedure.
R1-1715802 3GPP TSG RAN WG1 Meeting NR#3, Nagoya, Japan, Sep. 18-21, 2017, Source: CATT, Title: Beam failure detection and recovery.
R2-1708696 3GPP TSG RAN WG2 #99, Berlin, Germany, Aug. 21-25, 2017, Source: Huawei, HiSilicon, Title: Consideration on DRX with beam management.
R2-1708755 3GPP TSG RAN WG2 #99, Berlin, Germany, Aug. 21-25, 2017, Source: LG Electronics, Title: DRX related timers in NR (Revision of R2-1706750).
R2-1708791 3GPP TSG RAN WG2 #99, Berlin, Germany, Aug. 21-25, 2017, Source: Intel Corporation, Title: C-DRX anhancement in NR (Revision of R2-1707026).
R2-1709223 3GPP TSG RAN WG2 #99, Berlin, Germany, Aug. 21-25, 2017, Source: Qualcomm Incorporated, Title: Beam management in C-DRX.
R2-1709588 3GPP TSG RAN WG2 #99, Berlin, Germany, Aug. 21-25, 2017, Source: Samsung, Title: NR beamformed C-DRX operation (updated resubmission of R2-1705734).
R2-1709652 3GPP TSG RAN WG2 #99, Berlin, Germany, Aug. 21-25, 2017, Source: Qualcomm Incorporated, Apple, OPPO, Title: Wake-Up Signaling for C-DRX Mode.
R2-1709916 3GPP TSG RAN WG2 #99, Berlin, Germany, Aug. 21-25, 2017, Source: Ericsson, Title: Reply LS to SA2 on 5Qls for URLLC.
R1-1802393 3GPP TSG RAN WG1 Meeting #92, Athens, Greece, Feb. 26-Mar. 2, 2018, Source: Intel Corporation, Title: On beam management issues for mutli-CC operation.
R1-1802397 3GPP TSG RAN WG1 Meeting #92, Athens, Greece, Feb. 26-Mar. 2, 2018, Source: Intel Corporation, Title: Remaining Issues on Beam Failure Recovery.
R1-1802472 3GPP TSG RAN WG1 Meeting #92, Athens, Greece, Feb. 26-Mar. 2, 2018, Source: NTT DOCOMO, Title: Remaining issues on beam recovery.
R1-1802557 3GPP TSG RAN WG1 Meeting #92, Athens, Greece, Feb. 26-Mar. 2, 2018, Source: Nokia, Nokia Shanghai Bell, Title: Remaining Details on Beam Recovery.
R1-1802593 3GPP TSG RAN WG1 Meeting #92, Athens, Greece, Feb. 26-Mar. 2, 2018, Source: AT&T, Title: In support of partial beam failure.
R1-1802744 3GPP TSG RAN WG1 Meeting #92, Athens, Greece, Feb. 26-Mar. 2, 2018, Source: Ericsson, Title: Remaining details on beam recovery.
R1-1802824 3GPP TSG RAN WG1 Meeting #92, Athens, Greece, Feb. 26-Mar. 2, 2018, Source: Qualcomm Incorporated, Title: Beam recovery procedures.
R1-1803397 3GPP TSG RAN WG1 Meeting #92, Athens, Greece, Feb. 26-Mar. 2, 2018, Source: CATT, Title: Summary of Email Discussion on Beam Failure Recovery on Scell.
R1-1803745 3GPP TSG-RAN WG1 Meeting #92bis, Sanya, China, Apr. 16-20, 2018, Source: CATT, Title: Remaining Details on Beam Failure Recovery.
R1-1804210 3GPP TSG-RAN WG1 Meeting #92bis, Sanya, China, Apr. 16-20, 2018, Source: Lenovo, Motorola Mobility, Title: Discussion of Beam Measurement for Carrier Aggregation.
R1-1804363 3GPP TSG-RAN WG1 Meeting #92bis, Sanya, China, Apr. 16-20, 2018, Source: Samsung, Title: Simultaneous Reception of Physical Channels and Reference Signals.
R1-1804789 3GPP TSG-RAN WG1 Meeting #92bis, Sanya, China, Apr. 16-20, 2018, Source: Qualcomm Incorporated, Title: Details on Simultaneous Reception/Transmission of PHY Channels and RS in FR2.
R1-1804975 3GPP TSG-RAN WG1 Meeting #92bis, Sanya, China, Apr. 16-20, 2018, Source: Ericsson, Title: Remaining Issues on Beam Recovery.
R1-1804977 3GPP TSG-RAN WG1 Meeting #92bis, Sanya, China, Apr. 16-20, 2018, Source: Ericsson, Title: On Simultaneous Reception of Physical and Reference Signals Across CCs.
R1-1805538 3GPP TSG-RAN WG1 Meeting #92bis, Sanya, China, Apr. 16-20, 2018, Source: NTT DOCOMO, Inc., Title: Offline Summary for AI 7.1.3.1 2 Search Space.
R1-1806616 3GPP TSG-RAN WG1 #93, Busan, Korea, May 21-25, 2018, Source: LG Electronics, Title: Remaining Issues on Search Space.
R1-1806729 3GPP TSG-RAN WG1 #93, Busan, Korea, May 21-25, 2018, Source: Samsung, Title: Corrections on Search Space Design.
R2-1707999 3GPP TSG-RAN WG2 #99, Berlin, Germany, Aug. 21-25, 2017, Source: MediaTek Inc., Title: Beam Management and Beam Recovery in MAC.
R2-1708677 3GPP TSG RAN WG2 #99, Berlin, Germany, Aug. 21-25, 2017, Source: Nokia, Nokia Shanghai Bell, Title: Beam Recovery in NR.
R2-1708697 3GPP TSG RAN WG2 #99, Berlin, Germany, Aug. 21-25, 2017, Source: Huawei, HiSilicon, Title: Handling of Resources for Beam Failure Recovery.
R2-1709085 3GPP TSG-RAN WG2 #99, Bedin, Germany, Aug. 21-25, 2017, Source: Qualcomm Incorporated, Title: Beam Recovery Request.
R2-1709320 3GPP TSG-RAN WG2 #99, Berlin, Germany, Aug. 21-25, 2017, Source: ASUSTeK, Title: Discussion on Beam Recover Request in NR.
R2-1800042 3GPP TSG-RAN WG2 Ah, Vancouver, Canada, Jan. 22-26, 2018, Source: ASUSTeK, Title: Discussion on Beam Failure Recovery Request in NR.
R2-1800049 3GPP TSG-RAN WG2 AH, Vancouver, Canada, Jan. 22-26, 2018, Source: ASUSTeK, Title: UE Behaviours Upon Beam Failure and Recovery.
R2-1800168 3GPP TSG-RAN WG2 AH, Vancouver, Canada, Jan. 22-26, 2018, Source: CATT, Title: Solution for PH Type Inconsistency Between RAN1 and RAN2.
R2-1800169 3GPP TSG-RAN WG2 AH, Vancouver, Canada, Jan. 22-26, 2018, Source: CATT, Title: PHR MAC CE for EN-DC.
R2-1800231 3GPP TSG-RAN WG2 #100, Reno, USA, Nov. 27-Dec. 1, 2017, Source: Xiaomi, Title: Consideration on PHR Trigger Condition for Supporting SUL.
R2-1800253 3GPP TSG-RAN WG2 AH, Vancouver, Canada, Jan. 22-26, 2018, Source: ASUSTeK, Title: Pathloss Change for Triggering PHR.
R2-1800254 3GPP TSG-RAN WG2 AH, Vancouver, Canada, Jan. 22-26, 2018, Source: CATT, Title: RA Procedure and Parameters for BFR.
R2-1800343 3GPP TSG-RAN WG2 AH, Vancouver, Canada, Jan. 22-26, 2018, Source: Ericsson, Title: PHR Format for SUL.
R2-1800614 3GPP TSG-RAN WG2 AH, Vancouver, Canada, Jan. 22-26, 2018, Source: Samsung, Title: Support tor Type 2 PH in NR.
R2-1800619 3GPP TSG-RAN WG2 AH, Vancouver, Canada, Jan. 22-26, 2018, Source: Samsung, Title: SUL and PHR.
R2-1800642 3GPP TSG-RAN WG2 AH, Vancouver, Canada, Jan. 22-26, 2018, Source: Huawei, HiSilicon, Title: PHR Alignment Between RAN1 and RAN2.
R2-1800680 3GPP TSG-RAN WG2 AH, Vancouver, Canada, Jan. 22-26, 2018, Source: Lenovo, Motorola Mobility, Title: PHR for NR CA.
R2-1800822 3GPP TSG-RAN WG2 AH, Vancouver, Canada, Jan. 22-26, 2018, Source: Spreadtrum Communications, Title: Beam Failure Recovery Clarification.

(56) References Cited

OTHER PUBLICATIONS

R2-1801008 3GPP TSG-RAN WG2 AH, Vancouver, Canada, Jan. 22-26, 2018, Source: Huawei, HiSilicon, Title: Discussion on Power Sharing and its Impact on PHR for EN-DC.
R2-1801009 3GPP TSG-RAN WG2 Ah, Vancouver, Canada, Jan. 22-26, 2018, Source: Huawei, HiSilicon, Title: General Consideration on RA Procedure for Beam Failure Recovery.
R2-1801041 3GPP TSG-RAN WG2 AH, Vancouver, Canada, Jan. 22-26, 2018, Source: Huawei, HiSilicon, Title: Remaining Issue of Power Management in NR.
R2-1801043 3GPP TSG-RAN WG2 AH, Vancouver, Canada, Jan. 22-26, 2018, Source: Huawei, HiSilicon, Title: Consideration of PHR with Multi-Beam Operation.
R2-1801404 3GPP TSG-RAN WG2 AH, Vancouver, Canada, Jan. 22-26, 2018, Source: NTT DOCOMO, Inc., Title: Discussion on Beam Failure Recovery.
R2-1801406 3GPP TSG-RAN WG2 AH, Vancouver, Canada, Jan. 22-26, 2018, Source: NTT DOCOMO, Inc., Title: Remaining Issue on PHR.
R2-1801539 3GPP TSG-RAN WG2 AH, Vancouver, Canada, Jan. 22-26, 2018, Source: CATT, Title: PHR MAC CE for EN-DC.
R2-1801540 3GPP TSG-RAN WG2 AH, Vancouver, Canada, Jan. 22-26, 2018, Source: CATT, Title: Correction on PHR MAC CE in EN-DC in TS38.321.
R2-1801564 3GPP TSG-RAN WG2 AH, Vancouver, Canada, Jan. 22-26, 2018, Source: NTT DOCOMO, Inc., Title: LS on PHR.
R2-1801568 3GPP TSG-RAN WG2 AH, Vancouver, Canada, Jan. 22-26, 2018, Source: RAN WG2, Title: LS on PHR.
R2-1801814 3GPP TSG-RAN WG2 #101, Athens, Greece, Feb. 26-Mar. 2, 2018, Source: Huawei, HiSilicon, Title: Beam Failure Recovery on SCell.
R2-1802490 3GPP TSG-RAN WG2 #101, Athens, Greece, Feb. 26-Mar. 2, 2018, Source: CATT, Huawei, HiSilicon, Title: Discussion on Beam Failure Recovery for CE.
R2-1802554 3GPP TSG-RAN WG2 #101, Athens, Greece, Feb. 26-Mar. 2, 2018, Source: ASUSTeK, Title: Discussion on Beam Failure Recovery Request in NR.
R2-1803195 3GPP TSG-RAN WG2 #101, Athens, Greece, Feb. 26-Mar. 2, 2018, Source: Ericsson, Title: Beam Failure Recovery in Scell.
R1-1704725 3GPP TSG RAN WG1 Meeting #88bis, Spokane, USA, Apr. 3-7, 2017, Source: Intel Corporation, Title: On UE Initiated Beam Recovery.
R1-1705582 3GPP TSG RAN WG1 Meeting #88bis, Spokane, USA, Apr. 3-7, 2017, Source: Qualcomm Incorporated, Title: Beam recovery procedures.
R1-1705893 3GPP TSG RAN WG1 Meeting #88bis, Spokane, USA, Apr. 3-7, 2017, Source: Ericsson, Title: Beam failure detection and beam recovery actions.
R1-1705961 3GPP TSG RAN WG1 Meeting #88bis, Spokane, USA, Apr. 3-7, 2017, Source: Nokia, Alcatel-Lucent Shanghai Bell, Title: Beam Recovery in NR.
R1-1706928 3GPP TSG RAN WG1 Meeting #89, Hangzhou, China, May 15-19, 2017, Source: Huawei, HiSilicon, Title: Beam management across multiple carriers.
R1-1707255 3GPP TSG RAN WG1 Meeting #89, Hangzhou, China, May 15-19, 2017, Source: Fujitsu, Title: Discussion on beam failure recovery procedure.
R1-1707356 3GPP TSG RAN WG1 Meeting #89, Hangzhou, China, May 15-19, 2017, Source: Intel Corporation, Title: Discussion for Mechanism to Recover from Beam Failure.
R1-1707477 3GPP TSG RAN WG1 Meeting #89, Hangzhou, China, May 15-19, 2017, Source: CATT, Title: Discussior on DL beam recovery.
R1-1707698 3GPP TSG RAN WG1 Meeting #89, Hangzhou, China, May 15-19, 2017, Source: Guangdong OPPO Mobile Telecom, Title: On Beam Recovery Mechanism.
R1-1707782 3GPP TSG RAN WG1 Meeting #89, Hangzhou, China, May 15-19, 2017, Source: Spreadtrum Communications, Title: Discussion on UE initiated recovery from beam failure.

R1-1707814 3GPP TSG RAN WG1 Meeting #89, Hangzhou, China, May 15-19, 2017, Source: NEC, Title: Low latency beam failure recovery by PRACH/PRACH-like.
R1-1707954 3GPP TSG RAN WG1 Meeting #89, Hangzhou, China, May 15-19, 2017, Source: Samsung, Title: Discussion on beam recovery procedure.
R1-1708678 3GPP TSG RAN WG1 Meeting #89, Hangzhou, China, May 15-19, 2017, Source: Ericsson, Title: Beam failure recovery mechanism.
R1-1708905 3GPP TSG RAN WG1 Meeting #8 9, Hangzhou, China, May 15-19, 2017, Source: Nokia, Alcatel-Lucent Shanghai Bell, Title: Beam Recovery.
R1-1710144 3GPP TSG RAN WG1 NR Ad-Hoc #2, Qingdao, China, Jun. 27-30, 2017, Source: Guangdong OPPO Mobile Telecom, Title: On Beam Recovery Mechanism.
R1-1710185 3GPP TSG RAN WG1 NR Ad-Hoc #2, Qingdao, China, Jun. 27-30, 2017, Source: ZTE, Title: Discussion an beam recovery mechanism.
R1-1710527 3GPP TSG RAN WG1 NR Ad-Hoc #2, Qingdao, China, Jun. 27-30, 2017, Source: Intel Corporation, Title: Discussion for mechanism to recover from beam failure.
R1-1710655 3GPP TSG RAN WG1 NR Ad-Hoc #2, Qingdao, China, Jun. 27-30, 2017, Source: Samsung, Title: Beam failure recovery.
R1-1714251 3GPP TSG RAN WG1 Meeting #90, Prague, Czech Republic, Aug. 21-25, 2017, Source: Nokia, Nokia Shanghai Bell, Title: Beam recovery in NR.
R1-1715468 3GPP TSG RAN WG1 Meeting NR#3, Nagoya, Japan, Sep. 18-21, 2017, Source: Huawei, HiSilicon, Title: Beam Failure Recovery Design Details.
R1-1715860 3GPP TSG RAN WG1 Meeting NR#3, Nagoya, Japan, Sep. 18-21, 2017, Source: LG Electronics, Title: Discussion on beam failure recovery.
R1-1800362 3GPP TSG RAN WG1 Meeting AH 1801, Vancouver, Canada, Jan. 22-26, 2018, Source: LG Electronics, Title: Clarification on PDCCH beam indication by higher-layers.
R1-1800363 3GPP TSG RAN WG1 Meeting AH 1801, Vancouver, Canada, Jan. 22-26, 2018, Source: LG Electronics, Title: Text proposals on UL beam management.
R1-1800364 3GPP TSG RAN WG1 Meeting AH 1801, Vancouver, Canada, Jan. 22-26, 2018, Source: LG Electronics, Title: Discussion on PHY and MAC operation for beam failure recovery.
R1-1800401 3GPP TSG RAN WG1 Meeting AH 1801, Vancouver, Canada, Jan. 22-26, 2018, Source: Lenovo, Motorola Mobility, Title: Corrections on beam management.
R1-1800402 3GPP TSG RAN WG1 Meeting AH 1801, Vancouver, Canada, Jan. 22-26, 2018, Source: Lenovo, Motorola Mobility, Title: Corrections on beam failure recovery.
R1-1800432 3GPP TSG RAN WG1 Meeting AH 1801, Vancouver, Canada, Jan. 22-26, 2018, Source: Samsung, Title: Issues on beam management.
R1-1800433 3GPP TSG RAN WG1 Meeting AH 1801, Vancouver, Canada, Jan. 22-26, 2018, Source: Samsung, Title: Aperiodic beam reporting.
R1-1800434 3GPP TSG RAN WG1 Meeting AH 1801, Vancouver, Canada, Jan. 22-26, 2018, Source: Samsung, Title: Issues on beam failure recovery.
R1-1800472 3GPP TSG RAN WG1 Meeting AH 1801, Vancouver, Canada, Jan. 22-26, 2018, Source: Samsung, Title: PHR for CA.
R1-1800498 3GPP TSG RAN WG1 Meeting AH 1801, Vancouver, Canada, Jan. 22-26, 2018, Source: OPPO, Title: Text Proposal for Beam Management.
R1-1800499 3GPP TSG RAN WG1 Meeting AH 1801, Vancouver, Canada, Jan. 22-26, 2018, Source: OPPO, Title: Text Proposal for Beam Failure Recovery.
R1-1715941 3GPP TSG RAN WG1 Meeting NR#3, Nagoya Japan, Sep. 18-21, 2017, Source: Samsung, Title: Beam Failure recovery.
R1-1716295 3GPP TSG RAN WG1 Meeting NR#3, Nagoya, Japan, Sep. 18-21, 2017, Source: Intel Corporation, Title: Remaining Issues on Beam Failure Recovery.
R1-1716397 3GPP TSG RAN WG1 Meeting NR#3, Nagoya, Japan, Sep. 18-21, 2017, Source: Qualcomm Incorporated. Title: Beam recovery procedure.

(56) References Cited

OTHER PUBLICATIONS

R1-1716500 3GPP TSG RAN WG1 Meeting NR#3, Nagoya, Japan, Sep. 18-21, 2017, Source: Nokia, Nokia Shanghai Bell, Title: Beam Recovery in NR.
R1-1716469 3GPP TSG RAN WG1 Meeting NR#3, Nagoya, Japan, Sep. 18-21, 2017: Source: InterDigital, Inc., Title: Remaining issues on beam recovery.
R1-1717302 3GPP TSG RAN WG1 Meeting #90bis, Prague, Czech Republic, Oct. 9-13, 2017, Source: Huawei, HiSilicon Title: Beam failure recovery design details.
R1-1717369 3GPP TSG RAN WG1 Meeting #90bis, Prague, Czech Republic, Oct. 9-13, 2017, Source: Intel Corporation, Title: Remaining Issues on Beam Failure Recovery.
R1-1717473 3GPP TSG RAN WG1 Meeting #90bis, Prague, Czech Republic, Oct. 9-13, 2017, Source: vivo, Title: Discussion on beam failure recovery.
R1-1717606 3GPP TSG RAN WG1 Meeting #90bis, Prague, Czech Republic, Oct. 9-13, 2017, Source: Samsung, Title: Beam failure recovery.
R1-1717942 3GPP TSG RAN WG1 Meeting #90bis, Prague, Czech Republic, Oct. 9-13, 2017, Source: LG Electronics, Title: Discussion on beam failure recovery.
R1-1718010 3GPP TSG RAN WG1 Meeting #90bis, Prague, Czech Republic, Oct. 9-13, 2017, Source: NEC, Title: Discussion on Beam Failure Recovery.
R1-1718055 3GPP TSG RAN WG1 Meeting #90bis, Prague, Czech Republic, Oct. 9-13, 2017, Source: OPPO, Title: Discussion on Beam Recovery Mechanism.
R1-1718193 3GPP TSG RAN WG1 Meeting #90bis, Prague, Czech Republic, Oct. 9-13, 2017, Source: NTT DOCOMO, Title: Views on beam recovery.
R1-1718389 3GPP TSG RAN WG1 Meeting #90bis, Prague, Czech Republic, Oct. 9-13, 2017, Source: AT&T, Title: Beam Recovery for Full and Partial Control Channel Failure.
R1-1718512 3GPP TSG RAN WG1 Meeting #90bis, Prague, Czech Republic, Oct. 9-13, 2017, Source: Nokia, Nokia Shanghai Bell, Title: Beam Recovery in NR.
R1-1718542 3GPP TSG RAN WG1 Meeting #90bis, Prague Czech Republic, Oct. 9-13, 2017, Source: Qualcomm ncorpated, Title: Beam recovery procedure.
R1-1719423 3GPP TSG RAN WG1 Meeting #91, Reno, USA, Nov. 27-Dec. 1, 2017, Source: Huawei, HiSilicon, Title: Remaining details on beam failure recovery.
R1-1719619 3GPP TSG RAN WG1 Meeting #91, Reno, USA, Nov. 27-Dec. 1, 2017, Source: Fujitsu, Title: Discussion on beam failure recovery.
R1-1719633 3GPP TSG RAN WG1 Meeting #91, Reno, USA, Nov. 27-Dec. 1, 2017, Source: AT&T, Title Remaining Details on Mechanisms to Recover from Beam Failure.
R1-1719695 3GPP SG RAN WG1 Meeting #91, Reno, USA, Nov. 27-Dec. 1, 2017, Source: Spreadtrum Communications, Title: Remaining issues on beam failure recovery mechanism.
R1-1719770 3GPP TSG RAN WG1 Meeting #91, Reno, USA, Nov. 27-Dec. 1, 2017, Source: vivo, Title: Remaining details on mechanism to recover from beam failure.
R1-1719809 3GPP TSG RAN WG1 Meeting #91, Reno, USA, Nov. 27-Dec. 1, 2017, Source: Huawei, HiSilicon, Title: Design of PUCCH-based Beam Failure Recovery.
R1-1719908 3GPP TSG RAN WG1 Meeting #91, Reno, USA, Nov. 27-Dec. 1, 2017, Source: LG Electronics, Title: Discussion on beam failure recovery.
R1-1719988 3GPP TSG RAN WG1 Meeting #91, Reno, USA, Nov. 27-Dec. 1, 2017, Source: Discussion on Beam Recovery Mechanism.
R1-1720072 3GPP TSG RAN WG1 Meeting #91, Reno, USA, Nov. 27-Dec. 1, 2017, Source: Intel Corporation, Title: Remaining Issues on Beam Failure Recovery.
R1-1720291 3GPP TSG RAN WG1 Meeting #91, Reno, USA, Nov. 27-Dec. 1, 2017, Source: Samsung, Title: Beam failure recovery.
R1-1720305 3GPP TSG RAN WG1 Meeting #91, Reno, USA, Nov. 27-Dec. 1, 2017, Source: Samsung, Title: Discussion on cross-carrier beam management.
R1-1720574 3GPP TSG RAN WG1 Meeting #91, Reno, USA, Nov. 27-Dec. 1, 2017, Source: NEC, Title: On Partial Beam Failure Recovery.
R1-1720631 3GPP TSG RAN WG1 Meeting #91, Reno, USA, Nov. 27-Dec. 1, 2017, Source: InterDigital, Inc., Title: Remaining issues on beam recovery.
R1-1720804 3GPP TSG RAN WG1 Meeting #91, Reno, USA, Nov. 27-Dec. 1, 2017, Source: NTT DOCOMO, Title: Remaining issue on beam recovery.
R1-1720891 3GPP TSG RAN WG1 Meeting #91, Reno, USA, Nov. 27-Dec. 1, 2017, Source: Nokia, Nokia Shanghai Bell, Title: Beam Recovery in NR.
R1-1721523 3GPP TSG RAN WG1 Meeting #91, Reno, USA, Nov. 27-Dec. 1, 2017, Source: NTT DOCOMO, Samsung, Mediatek, AT&T, ZTE, Intel, Huawei, CATT, Qualcomm, Fujitsu, Spreadtrum, Title: WF for handling partial beam failure.
R1-1721673 3GPP TSG RAN WG1 Meeting #91, Reno, USA, Nov. 27-Dec. 1, 2017, Source: NTT DOCOMO, Intel, Huawei, NEC, Spreadtrum, Mediatek, China Telecom, AT&T, Samsung, ZTE, CATT, Qualcomm, Fujitsu, Nokia, Title: WF for handling partial beam failure.
R1-1800100 3GPP TSG RAN WG1 Meeting Ad Hoc, Vancouver, Canada, Jan. 22-26, 2018, Source: Huawei, HiSilicon, Title: Summary of remaining issues of beam measurement, reporting and indication.
R1-1800101 3GPP TSG RAN WG1 Meeting Ad Hoc, Vancouver, Canada, Jan. 22-26, 2018, Source: Huawei, HiSilicon, Title: Summary of remaining issues on beam failure recovery.
R1-1800110 3GPP TSG RAN WG1 Meeting Ad Hoc, Vancouver, Canada, Jan. 22-26, 2018, Source: ZTE, Sanechips, Title: Remaining details on bean management.
R1-1800111 3GPP TSG RAN WG1 Meeting Ad Hoc, Vancouver, Canada, Jan. 22-26, 2018, Source: ZTE, Sanechips, Title: Remaining details on mean management.
R1-1800312 3GPP TSG RAN WG1 Meeting Ad Hoc, Vancouver, Canada, Jan. 22-26, 2018, Source: Intel Corporation, Title: Remaining Issues on Beam Failure Recovery.
R1-1800526 3GPP TSG RAN WG1 Meeting Ad Hoc, Vancouver, Canada, Jan. 22-26, 2018, Source: Huawei, HiSilicon, Title: Remaining details of PHR.
R1-1800542 3GPP TSG RAN WG1 Meeting Ad Hoc, Vancouver, Canada, Jan. 22-26, 2018, Source: CMCC, Title: Discussion on remaining issues for beam indication.
R1-1800543 3GPP TSG RAN WG1 Meeting Ad Hoc, Vancouver, Canada, Jan. 22-26, 2018, Source: CMCC, Title: Discussion on beam recovery mechanism.
R1-1800582 3GPP TSG RAN WG1 Meeting Ad Hoc, Vancouver, Canada, Jan. 22-26, 2018, Source: AT&T, Title: TCI states configuration design to support dynamic BWP switching.
R1-1800583 3GPP TSG RAN WG1 Meeting Ad Hoc, Vancouver, Canada, Jan. 22-26, 2018, Source: AT&T, Title: In support of partial beam failure.
R1-1800622 3GPP TSG RAN WG1 Meeting Ad Hoc, Vancouver, Canada, Jan. 22-26, 2018, Source: ASUSTeK, Title: Remaining Issues for Beam Failure Recovery Procedure.
R1-1800629 3GPP TSG RAN WG1 Meeting Ad Hoc, Vancouver, Canada, Jan. 22-26, 2018, Source: InterDigital, Inc., Title: Remaining details on beam failure recovery.
R1-1800642 3GPP TSG RAN WG1 Meeting Ad Hoc, Vancouver, Canada, Jan. 22-26, 2018, Source: ITRI, Title: Discussion on timer for beam failure recovery.
R1-1800660 3GPP TSG RAN WG1 Meeting Ad Hoc, Vancouver, Canada, Jan. 22-26, 2018, Source: NTT DOCOMO, Title: Remaining Issue on Beam Indication.
R1-1800661 3GPP TSG RAN WG1 Meeting Ad Hoc, Vancouver, Canada, Jan. 22-26, 2018, Source: NTT DOCOMO, Title: Remaining issue on beam recovery.
R1-1800682 3GPP TSG RAN WG1 Meeting Ad Hoc, Vancouver, Canada, Jan. 22-26, 2018, Source: NTT DOCOMO, Inc., Title: Remaining issues on PHR.

(56) References Cited

OTHER PUBLICATIONS

R1-1800699 3GPP TSG RAN WG1 Meeting Ad Hoc, Vancouver, Canada, Jan. 22-26, 2018, Source: Ericsson, Title: Remaining details on beam management.
R1-1800700 3GPP TSG RAN WG1 Meeting Ad Hoc, Vancouver, Canada, Jan. 22-26, 2018, Source: Ericsson, Title: Remaining details and corrections for beam recovery.
R1-1800734 3GPP TSG RAN WG1 Meeting Ad Hoc, Vancouver, Canada, Jan. 22-26, 2018, Source: InterDigital, Inc., Title: Remaining issues on beam management.
R1-1800751 3GPP TSG RAN WG1 Meeting Ad Hoc, Vancouver, Canada, Jan. 22-26, 2018, Source: Nokia, Nokia Shanghai Bell, Title: Remaining details on beam indication, measurement and reporting.
R1-1800752 3GPP TSG RAN WG1 Meeting Ad Hoc, Vancouver, Canada, Jan. 22-26, 2018, Source: Nokia, Nokia Shanghai Bell, Title: Remaining Details on Beam Recovery.
R1-1800859 3GPP TSG RAN WG1 Meeting Ad Hoc, Vancouver, Canada, Jan. 22-26, 2018, Source: Qualcomm, Title: Beam management for NR.
R1-1800860 3GPP TSG RAN WG1 Meeting Ad Hoc, Vancouver, Canada, Jan. 22-26, 2018, Source: Qualcomm Incorporated. Title: Remaining details on beam recovery procedure.
R1-1801006 3GPP TSG RAN WG1 Meeting Ad Hoc, Vancouver, Canada, Jan. 22-26, 2018, Source: Ericsson, Title; Feature lead summary 1 of beam measurement and reporting.
R1-1801089 3GPP TSG RAN WG1 Meeting Ad Hoc, Vancouver, Canada, Jan. 22-26, 2018, Source: Media Tec Inc., Title: Summary for Remaining issue on Beam Failure Recovery.
R1-1801143 3GPP TSG RAN WG1 Meeting Ad Hoc, Vancouver, Canada, Jan. 22-26, 2018, Source: Ericsson, Title: Feature lead summary 2 of beam measurement and reporting.
R1-1801160 3GPP TSG RAN WG1 Meeting Ad Hoc, Vancouver, Canada, Jan. 22-26, 2018, Source: NTT DOCOMO, Qualcomm, Huawei, HiSilicon, ZTE, Sanechips, Fujitsu, Title: Updated offline proposal on PHR.
R1-1801187 3GPP TSG RAN WG1 Meeting Ad Hoc, Vancouver, Canada, Jan. 22-26, 2018, Source: Ericsson, Title: Feature lead summary 3 of beam measurement and reporting.
R1-1801197 3GPP TSG RAN WG1 Meeting Ad Hoc, Vancouver, Canada, Jan. 22-26, 2018, Source: MediaTek Inc., Title: Offline Summary for Remaining issues on Beam Failure Recovery.
R1-1801223 3GPP TSG RAN WG1 Meeting Ad Hoc, Vancouver, Canada, Jan. 22-26, 2018, Source: MediaTek Inc., Title: Offline Discussion Summary for Beam Failure Recovery.
R1-1801228 3GPP TSG RAN WG1 Meeting Ad Hoc, Vancouver, Canada, Jan. 22-26, 2018, Source: Ericsson, Title: Text proposal on source QCL for semi-persistent CSI-RS.
R1-1801229 3GPP TSG RAN WG1 Meeting Ad Hoc, Vancouver, Canada, Jan. 22-26, 2018, Source: Ericsson, Title: Text proposal for source spatial relation for semi-persistent SRS.
R1-1801230 3GPP TSG RAN WG1 Meeting Ad Hoc, Vancouver, Canada, Jan. 22-26, 2018, Source: Ericsson, Title: Text proposal on priority rules for PUCCH carrying RSRP reports and SRS.
R1-1801454 3GPP TSG RAN WG1 Meeting #92, Athens, Greece, Feb. 26-Mar. 2, 2018, Source: Huawei, HiSilicon, Title: Remaining issues on beam failure recovery.
R1-1801722 3GPP TSG RAN WG1 Meeting #92, Athens, Greece, Feb. 26- Mar. 2, 2018, Source: CATT, Title: Remaining issues on DL beam failure recovery.
Sep. 25, 2019—European Extended Search Report—EP 19166863.1.
R1-1803368 3GPP TSG RAN WG1 Meeting #92, Athens, Greece, Feb. 26-Mar. 2, 2018, Source: [RAN1], Title: Draft LS reply to RAN2 on beam failure recovery.
R1-1803441 3GPP TSG RAN WG1 Meeting #92, Athens, Greece, Feb. 26-Mar. 2, 2018, Source: MediaTek Inc., Title: Summary 2 on Remaing issues on Beam Failure Recovery.

R2-1811483 3GPP TSG-RAN WG2 Meeting #103, Gothenburg, Sweden, Aug. 20-24, 2018, Source: ZTE, Sanechips, Title: CR for the reset of BFD in 38.321.
R2-1812108 3GPP TSG-RAN WG2 Meeting #103, Gothenburg, Sweden, Aug. 20-24, 2018, Source: Nokia, Nokia Shanghai Bell, Title: Reset of BFD.
3GPP TS 38.213 V15.2.0 (Jun. 2018), Technical Specification, 3rd Generation Partnership Project; Technical Specification Group Radio Access Network; NR; Physical layer procedures for control (Release 15).
R2-1806229 3GPP TSG-RAN WG2 Meeting #101 bis, Sanya, China, Apr. 16-20, 2018, Source: Samsung, Title: Miscellaneous corrections.
R2-1815644 3GPP TSG-RAN WG2 Meeting #103bis, Chengdu, PR China, Oct. 8-12, 2018, Source: Ericsson, Samsung, Title: Correction for Reconfiguration of CFRA during ongoing RA.
R2-1811325 3GPP TSG-RAN WG2 Meeting #103, Gothenburg, Sweden, Aug. 20-24, 2018, Source: Samsung Electronics, Title: Handling Beam Failure Recovery Configuration Update.
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
R2-1811149 3GPP TSG-RAN WG2 Meeting #103, Gothenburg, Sweden, Aug. 20-24, 2018, Source: OPPO, Title: CR on beam failure recovery configuration.
R2-1811593 3GPP TSG-RAN WG2 Meeting #103, Gothenburg, Sweden, Aug. 20-24, 2018, Source: ZTE Corporation, Sanechips, Title: CR for the configuration of BeamFailureRecoveryConfig.
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-180XXXX 3GPP TSG-RAN WG1 Meeting #94, Gothenburg, Sweden, Aug. 20-24, 2018, Source: Ericsson, Title: Feature lead summary beam management v2.
R2-1804763 3GPP TSG-RAN WG2 Meeting #101 bis, Sanya, China, Apr. 16-20, 2018, Source: Nokia, Nokia Shangha Bell, Title: Running MAC CR for euCA.
R1-180XXXX 3GPP TSG-RAN WG1 Meeting #94, Gothenburg, Sweden, Aug. 20-24, 2018, Source: NTT DOCOMO, Inc., Title: Offline summary for PDCCH structure and search space.
R1-180XXXX 3GPP TSG-RAN WG1 Meeting #94, Gothenburg, Sweden, Aug. 20-24, 2018, Source: MediaTek Inc., Title: Summary #1 on Remaining Issues on Beam Failure Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713204 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1719650 3GPP TSG RAN WG1 Meeting #91, Reno, USA, Nov. 27-Dec. 1, 2017, Source: AT&T, Title: Remaining details on bandwidth parts.
R1-1719651 3GPP TSG RAN WG1 Meeting #91, Reno, USA, Nov. 27-Dec. 1, 2017, Source: AT&T, Title: Remaining details on carrier aggregation.
R1-1721027 3GPP TSG RAN WG1 Meeting #91, Reno, USA, Nov. 27-Dec. 1, 2017, Source: Ericsson, Title: On Carrier aggregation related aspects.
R1-1800879 3GPP TSG RAN WG1 NR Ad Hoc, Vancouver, Canada, Jan. 22-26, 2018, Source: Qualcomm Incorporated. Title: Remaining Issues on BWP.
R1-1803622 3GPP TSG RAN WG1 Meeting #92, Sanya, China, Apr. 16-20, 2018, Source: NEC, Title: Remaining issues on beam failure recovery.
R1-1804211 3GPP TSG-RAN WG1 Meeting #92bis, Sanya, China, Apr. 16-20, 2018, Source: Lenovo, Motorola Mobility, Title: Discussion of beam failure recovery for Carrier Aggregation.

(56) References Cited

OTHER PUBLICATIONS

R1-1806281 3GPP TSG-RAN WG1 #93, Busan, Korea, May 21-25, 2018, Source: CATT, Title: Remaining issues on beam failure recovery.
R1-1806508 3GPP TSG-RAN WG1 #93, Busan, Korea, May 21-25, 2018, Source: Intel Corporation, Title: Remaining issues on beam failure recovery.
R1-1806789 3GPP TSG-RAN WG1 #93, Busan, Korea, May 21-25, 2018, Source: MediaTek Inc., Title: Remaining issues on beam failure recovery.
R1-1807796 3GPP TSG-RAN WG1 #93, Busan, Korea, May 21-25, 2018, Source: MediaTek Inc., Title: Summary 2 on Remaining issues on beam failure recovery.
R1-1808720 3GPP TSG-RAN WG1 Meeting #94, Gothenburg, Sweden, Aug. 20-24, 2018, Source: Intel Corporation, Title: On SCell Beam Failure Recovery.
R1-1810020 3GPP TSG-RAN WG1 Meeting #94, Gothenburg, Sweden, Aug. 20-24, 2018, Source: Samsung, Title: CR to 38.213 capturing the RAN1#94 meeting agreements.
R2-1713170 3GPP TSG RAN WG2 Meeting #100, Reno, USA, Nov. 27-Dec. 1, 2017, Source: Nokia (rapporteur), Title: Report of [99bis#32][LTE/euCA] Faster activation for Scells (Nokia).
R2-1714289 3GPP TSG RAN WG2 Meeting #100, Reno, USA, Nov. 27-Dec. 1, 2017, Source: Nokia, Nokia Shanghai Bell, Title: Running CR for euCA Stage-2.
R2-1800866 3GPP TSG-RAN WG2 AH, Vancouver, Canada, Jan. 22-26, 2018, Source: vivo, Title: RACH configuration for beam recovery.
R2-1800895 3GPP TSG-RAN WG2 AH, Vancouver, Canada, Jan. 22-26, 2018, Source: vivo, Title: Discussion on the impact on beam failure recovery.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-1801926 3GPP TSG-RAN WG2 #101, Athens, Greece, Feb. 26-Mar. 2, 2018, Source: ZTE, Sanechips, Title: Remaining considerations on RACH procedure for BFR.
R2-1802143 3GPP TSG-RAN WG2 #101, Athens, Greece, Feb. 26-Mar. 2, 2018, Source: CATT, Title: RACH reattempt considering beam selection.
R2-1802151 3GPP TSG-RAN WG2 #101, Athens, Greece, Feb. 26-Mar. 2, 2018, Source: CATT, Title: Beam failure recovery.
R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803229 3GPP TSG-RAN WG2 #101, Athens, Greece, Feb. 26-Mar. 2, 2018, Source: Nokia, Nokia Shanghai Bell, Title: BWP switch interaction with contention free BFR preamble.
R2-1803564 3GPP TSG RAN WG2 Meeting #101, Athens, Greece, Feb. 26-Mar. 2, 2018, Source: Qualcomm ncorporated. Title: Dormant BWP for fast SCell activation.
R2-1804279 3GPP TSG-RAN WG2 Meeting #101, Sanya, China, Apr. 16-20, 2018, Source: ASUSTeK, Title: UE behaviours upon beam failure and recovery.
R2-1804303 3GPP TSG-RAN WG2 Meeting #101, Sanya, China, Apr. 16-20, 2018, Source: Samsung, Title: MAC mpacts: Beam Failure Recovery for SCell.
R2-1804407 3GPP TSG-RAN WG2 Meeting #101, Sanya, China, Apr. 16-20, 2018, Source: ZTE, Sanechips, Title: Consideration on beam failure recovery for SCell.
R2-1804410 3GPP TSG-RAN WG2 Meeting #101, Sanya, China, Apr. 16-20, 2018, Source: Huawei, HiSilicon, Title: Beam failure recovery using MAC CE.
R2-1804411 3GPP TSG-RAN WG2 Meeting #101, Sanya, China, Apr. 16-20, Z018, Source: Huawei, HiSilicon, Title: BWP issues for BFR.
R2-1804434 3GPP TSG-RAN WG2 Meeting #101, Sanya, China, Apr. 16-20, Z018, Source: OPPO, Title: Issues on supporting SCell BFR RACH.
R2-1804481 3GPP TSG-RAN WG2 Meeting #101, Sanya, China, Apr. 16-20, Z018, Source: CATT, Title: Leftover issues for BFR.
R2-1804482 3GPP TSG-RAN WG2 Meeting #101, Sanya, China, Apr. 16-20, 2018, Source: CATT, Title: BFR configurations and fallback options.
R2-1804483 3GPP TSG-RAN WG2 Meeting #101, Sanya, China, Apr. 16-20, 2018, Source: CATT, Title: BFR on SCell.
R2-1804696 3GPP TSG-RAN WG2 Meeting #101, Sanya, China, Apr. 16-20, 2018, Source: vivo, Title: Discussion on the SCell BFR.
R2-1805204 3GPP TSG-RAN WG2 Meeting #101, Sanya, China, Apr. 16-20, 2018, Source: Lenovo, Motorola Mobility, Title: Dedicated PRACH resource for beam failure recovery.
R2-1805414 3GPP TSG-RAN WG2 Meeting #101, Sanya, China, Apr. 16-20, 2018, Source: Ericsson, Title: Beam Failure Recovery in SCell and contention-based BFR on SpCell.
R2-1805896 3GPP TSG-RAN WG2 Meeting #101, Sanya, China, Apr. 16-20, 2018, Source: Huawei, HiSilicon, Title: ASN.1 for Beam Failure Recovery.
R2-1805905 3GPP TSG-RAN WG2 Meeting #101, Sanya, China, Apr. 16-20, 2018, Source: Huawei, HiSilicon, Title: Discussions on RA for SCells BFR.
R2-1806120 3GPP TSG-RAN WG2 Meeting #101, Sanya, China, Apr. 16-20, 2018, Source: ITL, Title: Beam Failure Recovery on SCell.
R2-1806166 3GPP TSG-RAN WG2 Meeting #101, Sanya, China, Apr. 16-20, 2018, Source: MediaTek, Inc., Title: On switching between CFRA and CBRA.
R2-1806774 3GPP TSG-RAN WG2 Meeting #102, Sanya, China, Apr. 16-20, 2018, Source: Nokia, Nokia Shanghai Bell, Title: Finalization of dormant SCell state.
R2-1806819 3GPP TSG-RAN WG2 Meeting #102, Busan, Korea, May 21-25, 2018, Source: Samsung, Title: MAC Impacts: Beam Failure Recovery for SCell.
R2-1806924 3GPP TSG-RAN WG2 Meeting #102, Busan, Korea, May 21-25, 2018, Source: Qualcomm, Inc., Title: SCell Dormant State Transitions based on New Timers & MAC-CEs.
R2-1806998 3GPP TSG-RAN WG2 Meeting #102, Busan, Korea, May 21-25, 2018, Source: CATT, Title: The validity of CFRA resources for BFR.
R2-1807160 3GPP TSG-RAN WG2 Meeting #102, Busan, Korea, May 21-25, 2018, Source: Panasonic, Title: Timer associated with the dedicated BFR PRACH resource.
R2-1807405 3GPP TSG-RAN WG2 Meeting #102, Busan, Korea, May 21-25, 2018, Source: ZTE, Title: Discussion on the beam failure recovery timer.
R2-1807415 3GPP TSG-RAN WG2 Meeting #102, Busan, Korea, May 21-25, 2018, Source: OPPO, Title: MAC Impacts on supporting BFR procedure on SCell.
R2-1807444 3GPP TSG RAN WG2 Meeting #10Z, Busan, Korea, May 21-25, 2018, Source: Huawei, HiSilicon, Title: BWP switch for BFR.
R2-1807481 3GPP TSG RAN WG2 Meeting #102, Busan, Korea, May 21-25, 2018, Source: Huawei, HiSilicon, Title: Remaining issues of temporary CQI reporting.
R2-1807584 3GPP TSG RAN WG2 Meeting #102, Busan, Korea, May 21-25, 2018, Source: vivo, Title: Discussion on the SCell BFR.
R2-1807961 3GPP TSG RAN WG2 Meeting #102, Busan, Korea, May 21-25, 2018, Source: Huawei, HiSilicon, Title: Discussion on BFR-config for SCell BFR.
R2-1807975 3GPP TSG RAN WG2 Meeting #102, Busan, Korea, May 21-25, 2018, Source: Huawei, HiSilicon, Title: Discussion on beam failure recovery for SCell.
R2-1808024 3GPP TSG RAN WG2 Meeting #102, Busan, Korea, May 21-25, 2018, Source: Nokia, Nokia Shanghai Bell, Title: SCell Beam Failure Recovery.
R2-1808570 3GPP TSG RAN WG2 Meeting #102, Busan, Korea, May 21-25, 2018, Source: Qualcomm Incorporated, Title: Dormant BWP for fast SCell activation.
R2-1808658 3GPP TSG RAN WG2 Meeting #102, Busan, Korea, May 21-25, 2018, Source: ITL, Title: Beam failure recovery on SCell.

(56) References Cited

OTHER PUBLICATIONS

R2-1808809 3GPP TSG RAN WG2 Meeting #102, Busan, Korea, May 21-25, 2018, Source: Ericsson, Title: CR on Dormat SCell state transition MAC CE.

R2-1809515 3GPP TSG RAN WG2 AH-1807, Montreal, Canada, Jul. 2-6, 2018, Source: CATT, Title: Further issues with DL BWP switching for CFRA.

R2-1809523 3GPP TSG RAN WG2 AH-1807, Montreal, Canada, Jul. 2-6, 2018, Source: CATT, Title: Further discussion on BFR termination criterion.

R2-1809721 3GPP TSG RAN WG2 AH-1807, Montreal, Canada, Jul. 2-6, 2018, Source: InterDigital, Title: BWP switching for RA-BFR.

R2-1809872 3GPP TSG RAN WG2 AH-1807, Montreal, Canada, Jul. 2-6, 2018, Source: vivo, Title: Remaining configuration issues for BFR.

R2-1809894 3GPP TSG RAN WG2 AH-1807, Montreal, Canada, Jul. 2-6, 2018, Source: vivo, Title: Preamble Selection when CFRA Resource Available.

R2-1809925 3GPP TSG RAN WG2 AH-1807, Montreal, Canada, Jul. 2-6, 2018, Source: OPPO, Title: The issue of BWP switching for BFR RACH.

R2-1810008 3GPP TSG RAN WG2 AH-1807, Montreal, Canada, Jul. 2-6, 2018, Source: Sharp, Title: Remaining issues on DL BWP switching upon RACH procedure initiation.

R2-1810063 3GPP TSG RAN WG2 AH-1807, Montreal, Canada, Jul. 2-6, 2018, Source: Ericsson, Title: Dormant SCell state in NR.

R2-1810091 3GPP TSG RAN WG2 AH-1807, Montreal, Canada, Jul. 2-6, 2018, Source: Huawei, HiSilicon, Title: BWP switch for BFR.

R2-1810424 3GPP TSG RAN WG2 AH-1807, Montreal, Canada, Jul. 2-6, 2018, Source: Qualcomm Inc., Title: BFD procedure in DRX mode.

R2-1810513 3GPP TSG RAN WG2 AH-1807, Montreal, Canada, Jul. 2-6, 2018, Source: Huawei, HiSilicon, Title: Clarification on RA procedure for BFR on BWPs without CBRA occasions.

R2-1810641 3GPP TSG RAN WG2 AH-1807, Montreal, Canada, Jul. 2-6, 2018, Source: Huawei, HiSilicon, Title: issues on BWP switch and search space configuration for BFR.

R2-1810643 3GPP TSG RAN WG2 AH-1807, Montreal, Canada, Jul. 2-6, 2018, Source: Huawei, HiSilicon, Title: RACH configuration on BWPs.

R2-1810797 3GPP TSG RAN WG2 AH-1807, Montreal, Canada, Jul. 2-6, 2018, Source: CATT, Title: Offline discussion #100 on DL-UL linking for CFRA.

R2-1811482 3GPP TSG-RAN WG2 Meeting #103, Gothenburg, Sweden, Aug. 20-24, 2018, Source: ZTE, Sanechips, Title: Consideration on implicit configuration of RS for BFD.

R2-1811896 3GPP TSG-RAN W2 Meeting #103, Gothenburg, Sweden, Aug. 20-24, 2018, Source: Huawei, HiSilicon, Title: BWP switch for BFR.

R2-1812639 3GPP TSG-RAN WG2 Meeting #103, Gothenburg, Sweden, Aug. 20-24, 2018, Source: LG Electronics Inc., Title: BWP operation for BFR RA.

R2-1814198 3GPP TSG-RAN WG2 Meeting #103bis, Chengdu, China, Oct. 8-12, 2018, Source: vivo, Title: Clarification on the beam change during BFR.

RP-181344 3GPP TSG RAN Meeting #80, La Jolla, USA, Jun. 11-14, 2018, Source: Ericsson, Nokia, Nokia Shanghai Bell, Huawei, Title: New WID on MR-DC enhancements (NR_MRDC_Enh).

Apr. 30, 2020—European Office Action—EP 19157460.7.

Jan. 11, 2021—European Office Action—19157460.7.

\* cited by examiner

User Plane Protocol Stack

Control Plane Protocol Stack

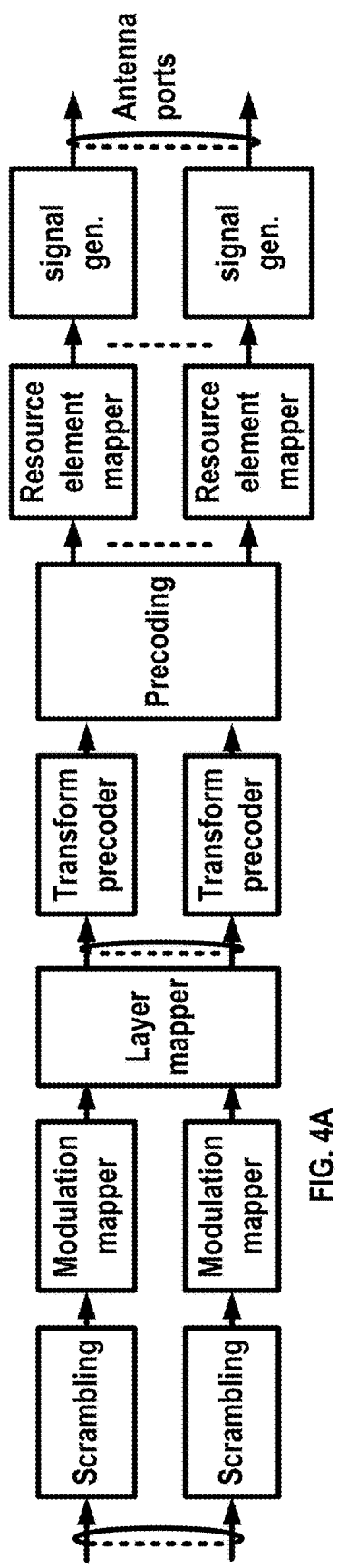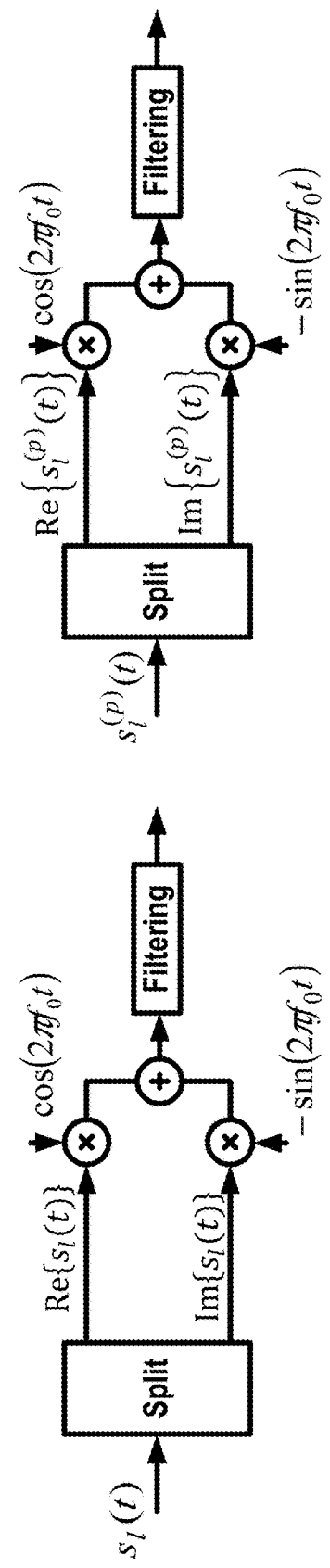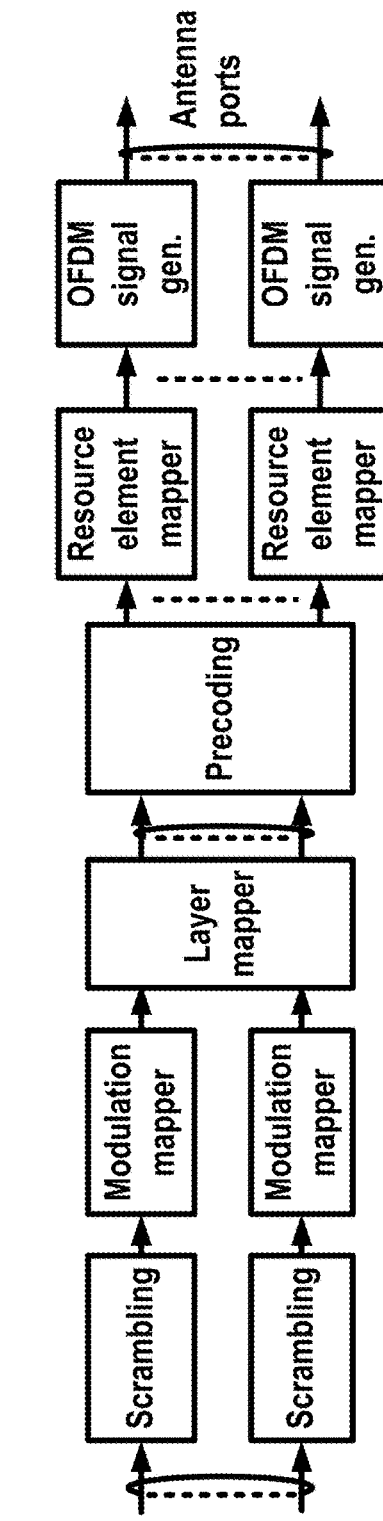
FIG. 4A
FIG. 4B
FIG. 4C
FIG. 4D

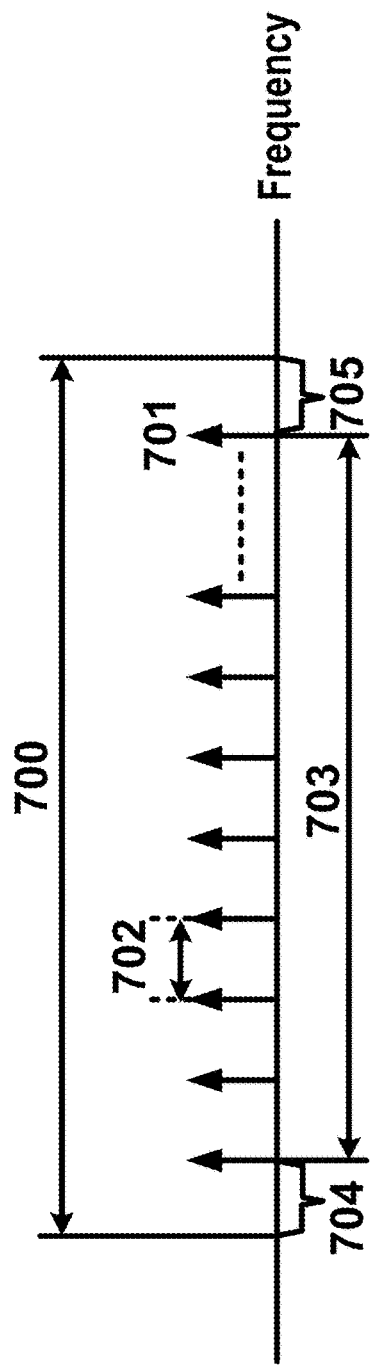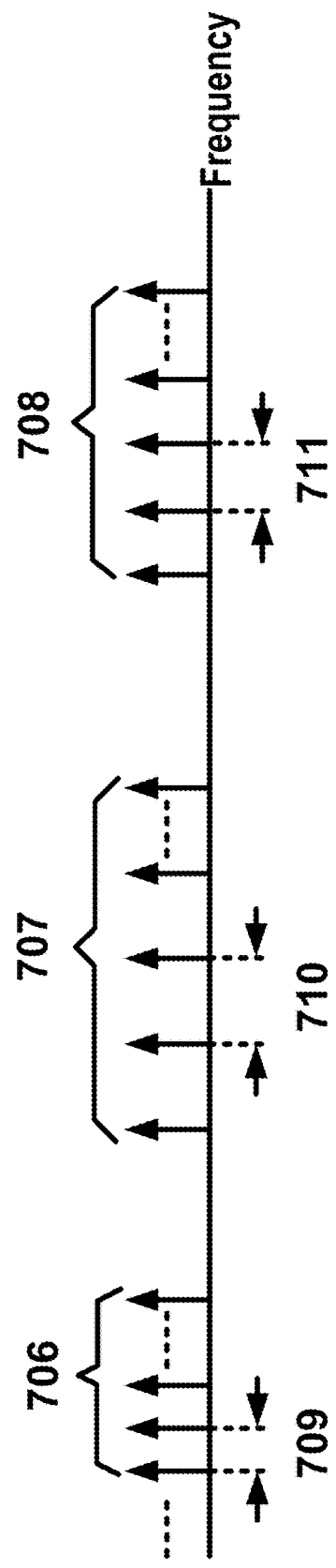
FIG. 7A
FIG. 7B

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

FIG. 22A

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

FIG. 22B

| Index | LCID values |
|---|---|
| 000000 | CCCH |
| 000001–100000 | Identity of the logical channel |
| 100001–110100 | Reserved |
| 110101 | SUL Multiple Entry PHR |
| 110110 | SUL Single Entry PHR |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 24

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, PCell) ||||||
| R | R | $P_{CMAX,c}$ 1 ||||||
| P | V | PH (Type 2, PSCell or PUCCH SCell) ||||||
| R | R | $P_{CMAX,c}$ 2 ||||||
| P | V | PH (Type X, PCell) ||||||
| R | R | $P_{CMAX,c}$ 3 ||||||
| P | V | PH (Type X, SCell 1) ||||||
| R | R | $P_{CMAX,c}$ 4 ||||||

...

| | | |
|---|---|---|
| P | V | PH (Type X, SCell n) |
| R | R | $P_{CMAX,c}$ m |

FIG. 26

| $C_7$ | $C_6$ | $C_5$ | $C_4$ | $C_3$ | $C_2$ | $C_1$ | R |
|---|---|---|---|---|---|---|---|
| P | V | \multicolumn{6}{l|}{PH (Type 2, PCell)} |
| R | R | \multicolumn{6}{l|}{$P_{CMAX,c}$ 1} |
| P | V | \multicolumn{6}{l|}{PH (Type 2, PSCell or PUCCH SCell)} |
| R | R | \multicolumn{6}{l|}{$P_{CMAX,c}$ 2} |
| P | V | \multicolumn{6}{l|}{PH (Type X, PCell)} |
| R | R | \multicolumn{6}{l|}{$P_{CMAX,c}$ 3} |
| P | V | \multicolumn{6}{l|}{PH (Type X, SCell 1)} |
| R | R | \multicolumn{6}{l|}{$P_{CMAX,c}$ 4} |

...

| P | V | PH (Type X, SCell M, UL1) |
|---|---|---|
| R | R | $P_{CMAX,1,c}$ n |
| P | V | PH (Type X, SCell M, UL2) |
| R | R | $P_{CMAX,2,c}$ i |

...

| P | V | PH (Type X, SCell j) |
|---|---|---|
| R | R | $P_{CMAX,c}$ k |

FIG. 27

| C₇ | C₆ | C₅ | C₄ | C₃ | C₂ | C₁ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |

| P | V | PH (Type 2, PCell) |
|---|---|---|
| R | R | $P_{CMAX,c}$ 1 |
| P | V | PH (Type 2, PSCell or PUCCH SCell) |
| R | R | $P_{CMAX,c}$ 2 |
| P | V | PH (Type X, PCell) |
| R | R | $P_{CMAX,c}$ 3 |
| P | V | PH (Type X, SCell 1) |
| R | R | $P_{CMAX,c}$ 4 |

...

| P | V | PH (Type X, SCell M, UL1) |
|---|---|---|
| R | R | $P_{CMAX,1,c}$ n |
| P | V | PH (Type X, SCell M, UL2) |
| R | R | $P_{CMAX,2,c}$ i |

...

| P | V | PH (Type X, SCell j) |
|---|---|---|
| R | R | $P_{CMAX,c}$ k |

FIG. 28

| Example DCI format | Example Usage |
| --- | --- |
| 0 | Uplink scheduling grant |
| 4 | Uplink scheduling grant with spatial multiplexing |
| 6-0A, 6-0B | Uplink scheduling grant for eMTC devices |
| 1C | Special purpose compact assignment |
| 1A | Contiguous allocation only |
| 1B | Codebook-based beamforming using CRS |
| 1D | MU-MIMO using CRS |
| 1 | Flexible allocations |
| 2A | Open-loop spatial multiplexing using CRS |
| 2B | Dual-layer transmission using DM-RS (TM8) |
| 2C | Multi-layer transmission using DM-RS (TM9) |
| 2D | Multi-layer transmission using DM-RS (TM9) |
| 2 | Closed-loop spatial multiplexing using CRS |
| 6-1A, 6-1B | Downlink scheduling grants for eMTC devices |
| 3, 3A | Power control commands |
| 5 | Sidelink operation |
| 6-2 | Paging/direct indication for eMTC devices |

FIG. 29

| Example DCI format | Example Usage |
|---|---|
| 0_0 | For scheduling of PUSCH in one cell |
| 0_1 | |
| 1_0 | For scheduling of PDSCH in one cell |
| 1_1 | |
| 2_0 | For notifying the slot format |
| 2_1 | For notifying the PRB(s) and OFDM symbol(s) where UE may assume no transmission is intended for the UE |
| 2_2 | For the transmission of TPC commands for PUCCH and PUSCH |
| 2_3 | For the transmission of a group of TPC commands for SRS transmissions by one or more UEs. Along with a TPC command, a SRS request may also be transmitted |

FIG. 30

| TPC Command Field | Accumulated $\delta_{PUSCH,f}$ [dB] | Absolute $\delta_{PUSCH,f}$ [dB] |
|---|---|---|
| 0 | -1 | -4 |
| 1 | 0 | -1 |
| 2 | 1 | 1 |
| 3 | 3 | 4 |

FIG. 31

| TPC Command Field | Accumulated $\delta_{PUCCH,f,c}$ [dB] |
|---|---|
| 0 | -1 |
| 1 | 0 |
| 2 | 1 |
| 3 | 3 |

FIG. 32

US 11,419,066 B2

BEAM FAILURE REPORT

CROSS-REFERENCE TO RELATED APPLICATIONS

This application claims the benefit of U.S. Provisional Application No. 62/631,332, titled "Beam Failure Report" and filed on Feb. 15, 2018, which is hereby incorporated by reference in its entirety.

BACKGROUND

A wireless device may be configured to receive transmissions via one of multiple different beams associated with a cell. Although this capability can increase cell capacity, individual beams may be subject to interruption (e.g., by passing vehicles or other objects), interference, transmission irregularities at a cell, etc. If such problems occur and a wireless device cannot be reconfigured to receive transmissions via a different beam, service may be degraded.

SUMMARY

The following summary presents a simplified summary of certain features. The summary is not an extensive overview and is not intended to identify key or critical elements.

Systems, apparatuses, and methods are described for reporting a beam failure. The beam failure may be reported to a base station by a wireless device using a media access control (MAC) control element (CE). The MAC CE may comprise one or more fields with values indicating beam failure for a cell and one or more fields with values that indicate the cell associated with that beam failure. Reporting a beam failure at a MAC layer may provide improvements such as allowing a beam failure report to be transmitted to a cell other than the cell experiencing the beam failure, reporting of beam failure for a cell that may be configured with a downlink carrier without an uplink carrier and/or for which a wireless device may otherwise not have a configured uplink, and/or an alternate method of beam failure reporting if other beam failure recovery procedures fail.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C and FIG. 4D show examples of uplink and downlink signal transmission.

FIG. 7A and FIG. 7B show example sets of orthogonal frequency division multiplexing (OFDM) subcarriers.

FIG. 22A shows examples power headroom levels corresponding to power headroom (PH) field values.

FIG. 22B shows examples of a nominal UE transmit power level corresponding to $P_{CMAX,c}$ (or $P_{CMAX,f,c}$) field values.

FIG. 24 shows an example of logical channel identifier (LCID) values.

FIG. 26 shows another example of a multiple entry PHR MAC CE.

FIG. 27 shows an example of an SUL multiple entry PHR MAC CE.

FIG. 28 shows another example of an SUL multiple entry PHR MAC CE.

FIG. 29 shows examples of downlink control information (DCI) formats.

FIG. 30 shows examples of DCI formats.

FIG. 31 shows an example parameter of a TPC command.

FIG. 32 shows an example parameter of a TPC command.

DETAILED DESCRIPTION

Figure 1:
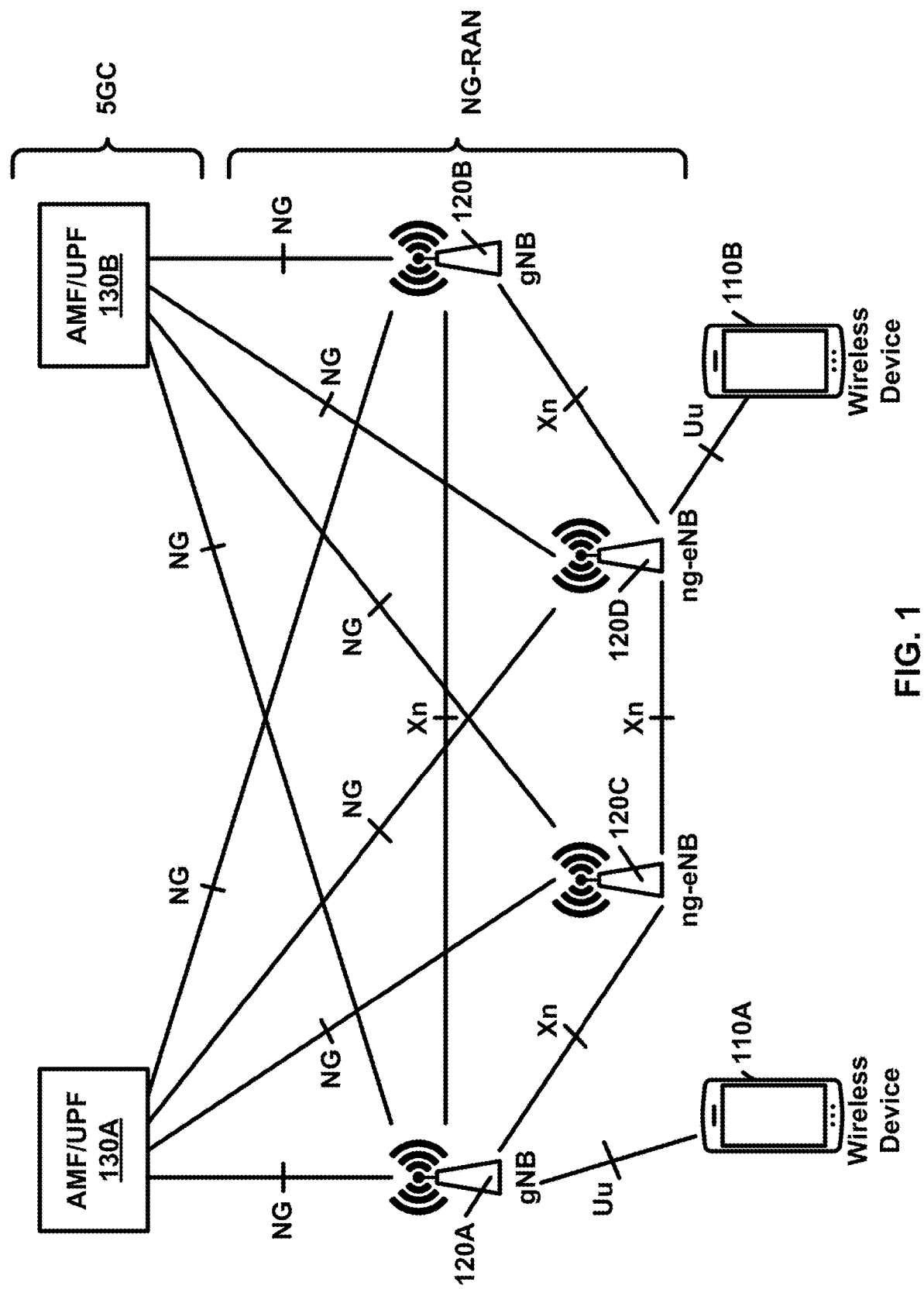
FIG. 1 shows an example radio access network (RAN) architecture.

The accompanying drawings and descriptions provide examples. It is to be understood that the examples shown in the drawings and/or described herein are non-exclusive and that there are other examples of how features shown and described may be practiced.

Examples are provided for operation of wireless communication systems which may be used in the technical field of multicarrier communication systems. More particularly, the technology described herein may relate to wireless communication systems in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., an gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
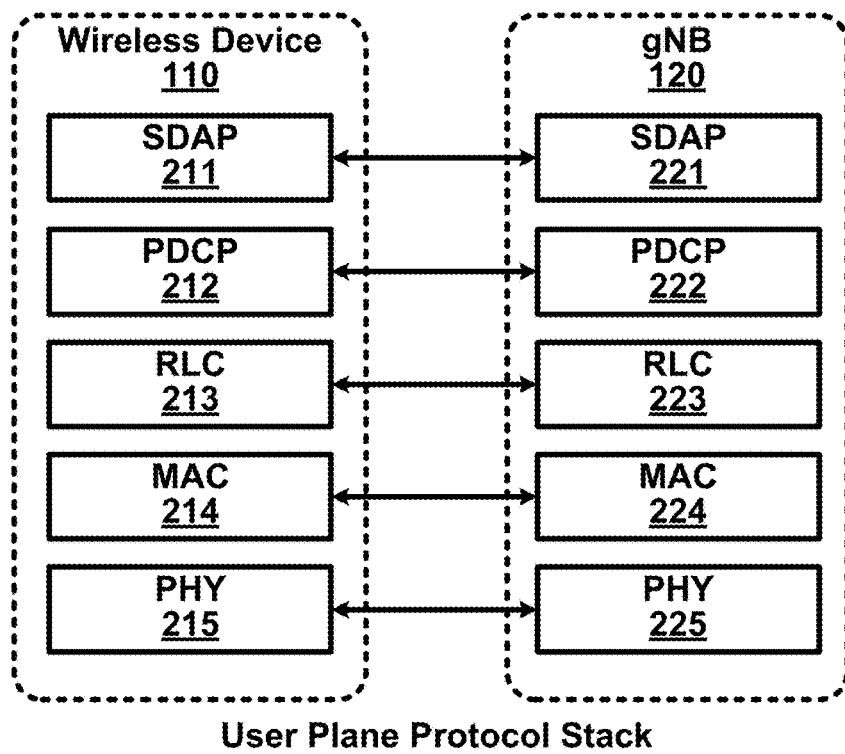
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Media Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
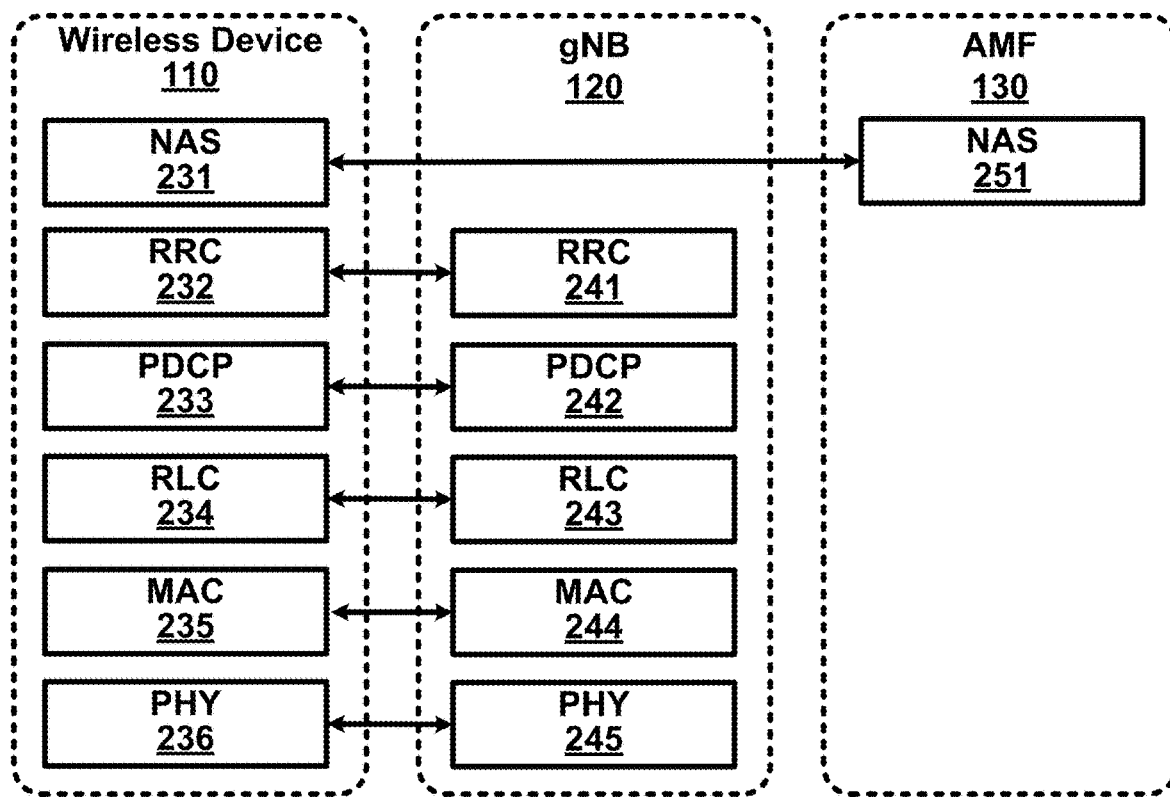
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MA CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
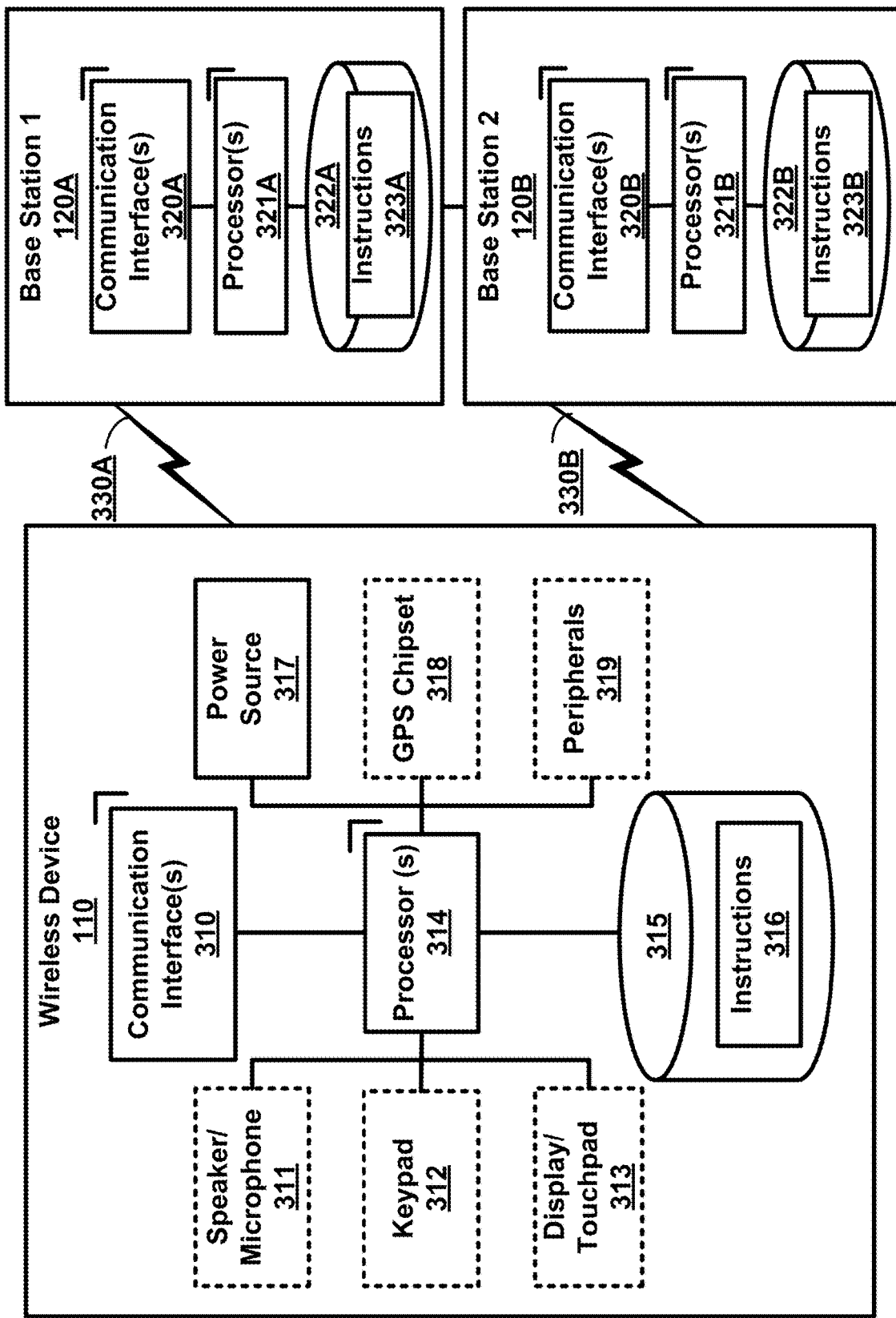
FIG. 3 shows an example wireless device and two base stations.

FIG. 3 shows an example of base stations (base station 1, 120A, and base station 2, 120B) and a wireless device 110.

The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC Idle state, an RRC_Inactive state, and/or an RRC_Connected state for a wireless device. In an RRC Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterinformationBlock and SystemInformationBlockType1). Another SI may be transmitted via SystemInformationBlockType2. For a wireless device in an RRC_Connected state, dedicated RRC signalling may be used for the request and delivery of the other SI. For the wireless device in the RRC Idle state and/or in the RRC_Inactive state, the request may trigger a random-access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., only static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to a E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. An CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by a OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
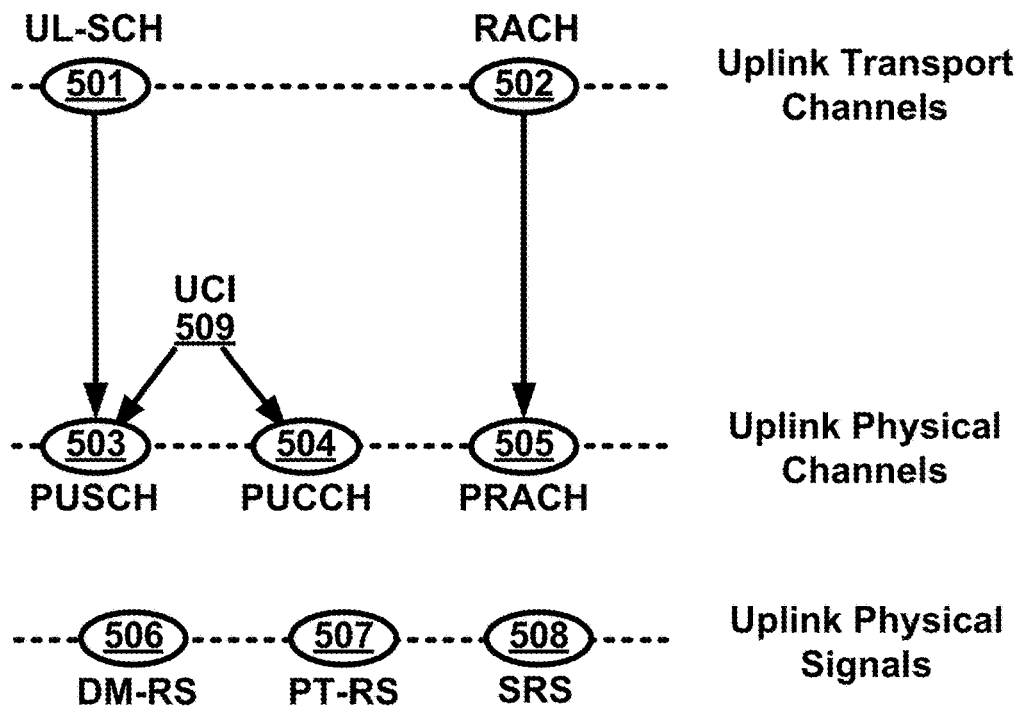
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be fewer than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
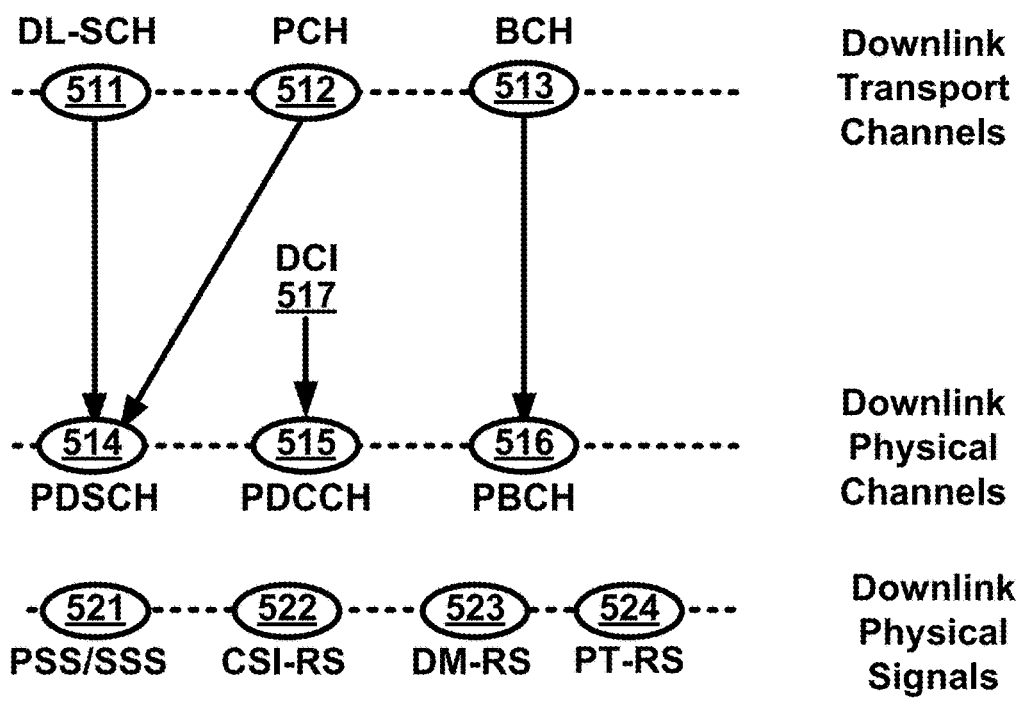
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
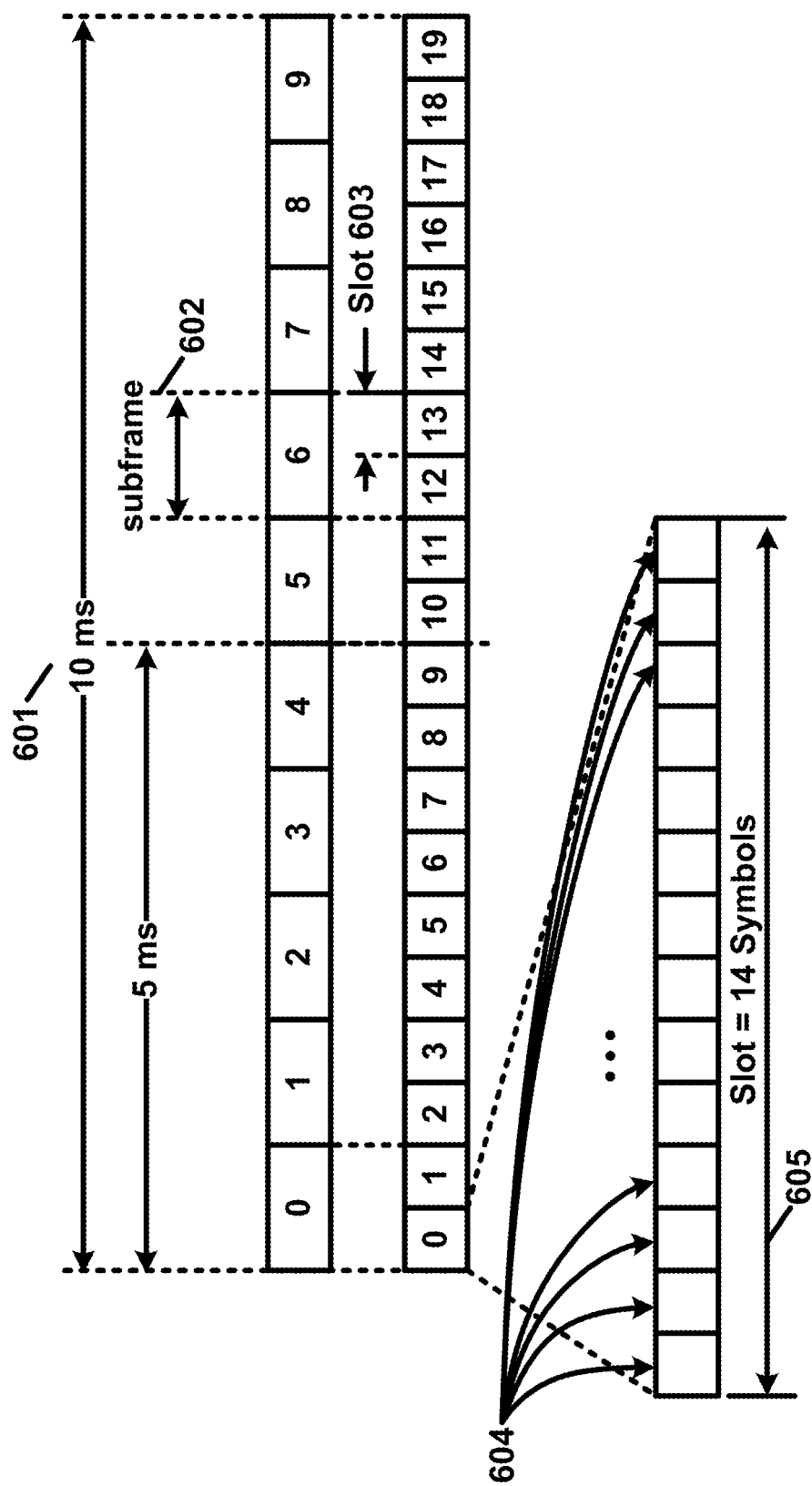
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
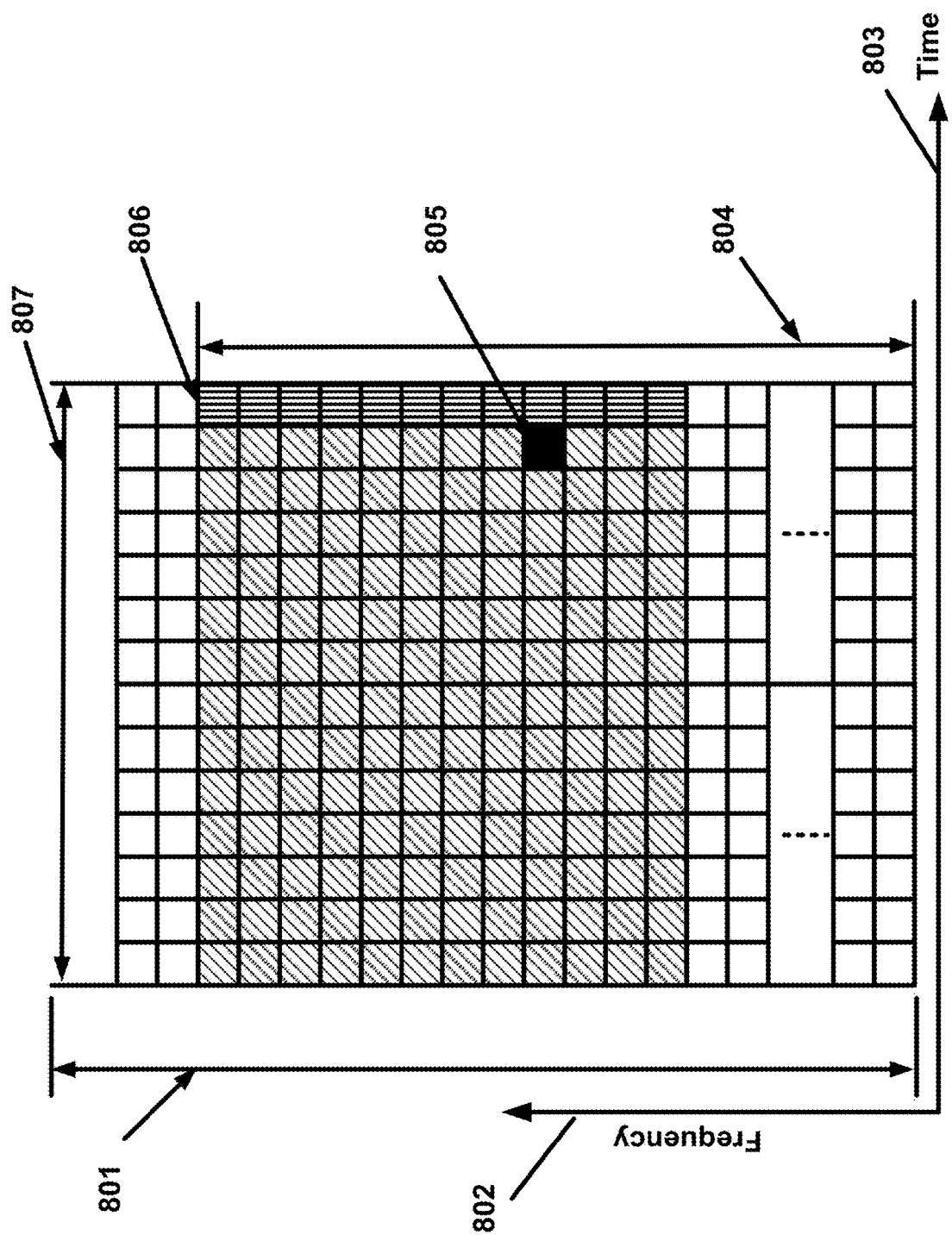
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

a base station may allocate Configured Scheduling (CS) resources for down link transmission to a wireless device. The base station may send (e.g., transmit) one or more RRC messages indicating a periodicity of the CS grant. The base station may send (e.g., transmit) a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) a DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) a DCI comprising a slot format indicator (SFI) indicating a slot format. The base station may send (e.g., transmit) a DCI comprising a preemption indication indicating the PRB(s) and/or OFDM symbol(s) in which a wireless device may assume no transmission is intended for the wireless device. The base station may send (e.g., transmit) a DCI for group power control of the PUCCH, the PUSCH, and/or an SRS. A DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may, based on a QCL assumption of one or more antenna ports, reduce signaling overhead and/or time used for channel estimation and/or for time and/or frequency synchronization. A first antenna port may be considered to be QCLed with a second antenna port if the wireless device derives radio channel properties of the first antenna port from a measurement on the second antenna port. Radio channel properties may comprise one or more of delay spread, Doppler spread, average received power, and/or received timing.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
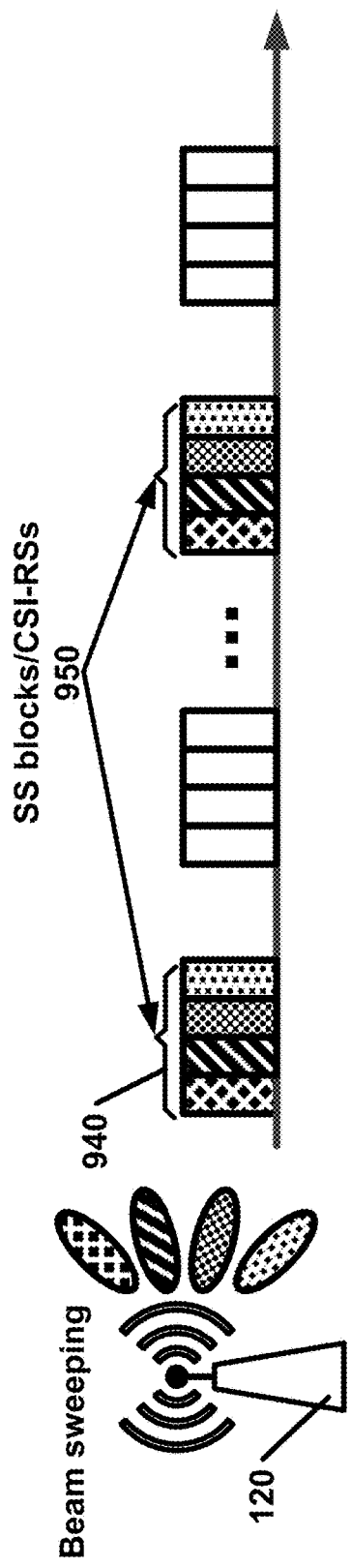
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
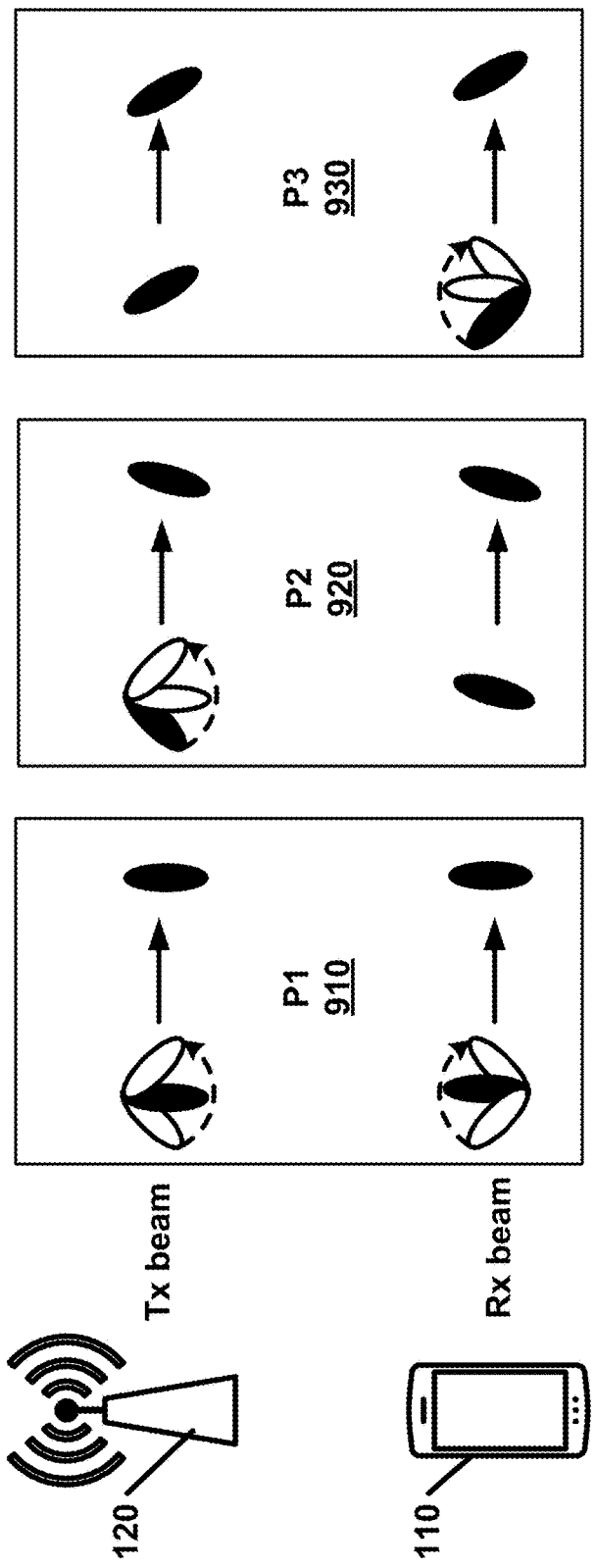
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
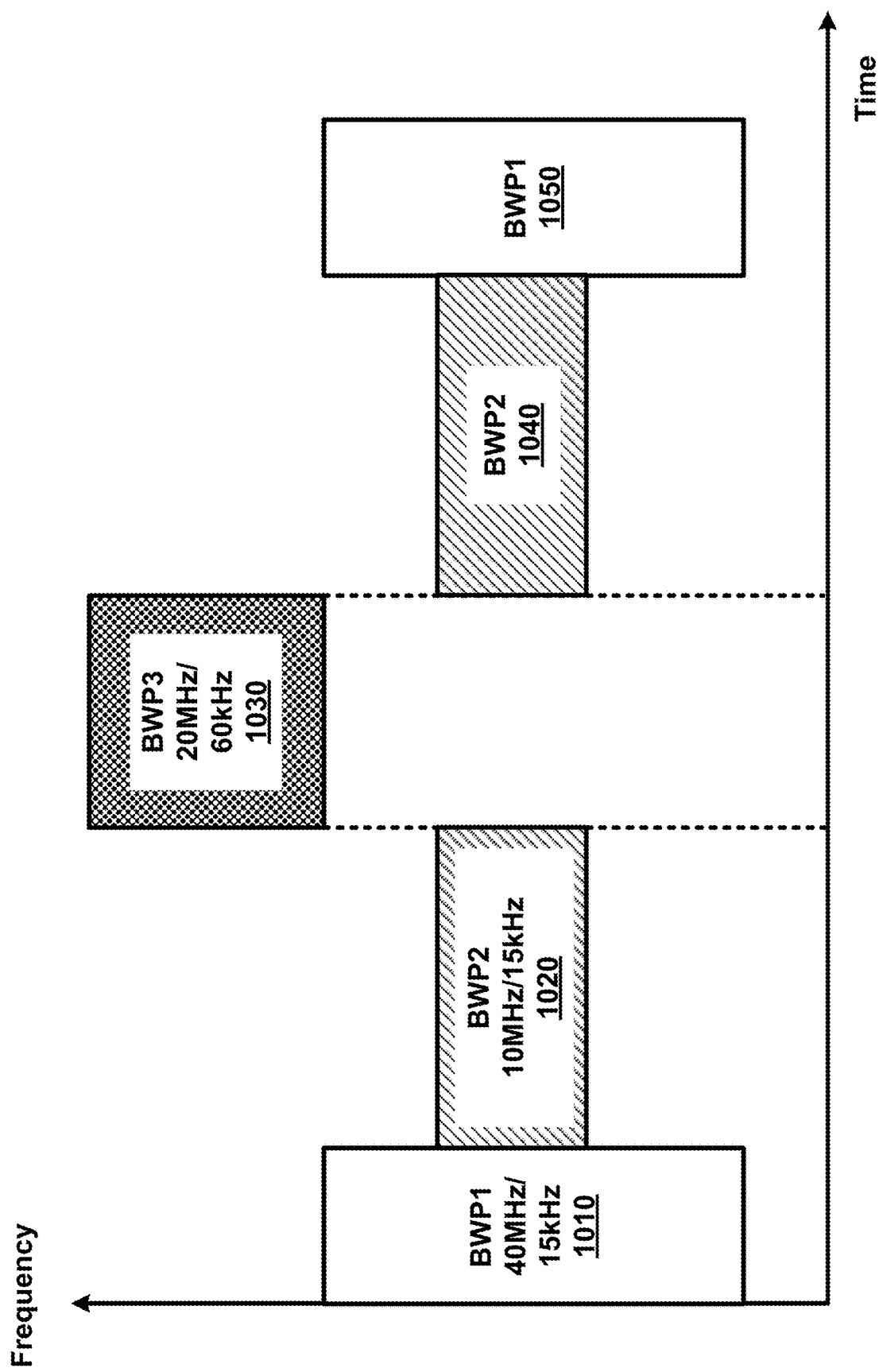
FIG. 10 shows an example of configured bandwidth parts (BWPs).

FIG. 10 shows example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

A DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects a DCI indicating an active DL BWP, other than a default DL BWP, for a paired spectrum operation, and/or if a wireless device detects a DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if a wireless device does not detect a DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving a DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving a DCI indicating BWP3 1030 as an active BWP. Switching an active BWP from BWP3 1030 to BWP2 1040 and/or from BWP2 1040 to BWP1 1050 may be after or in response to receiving a DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
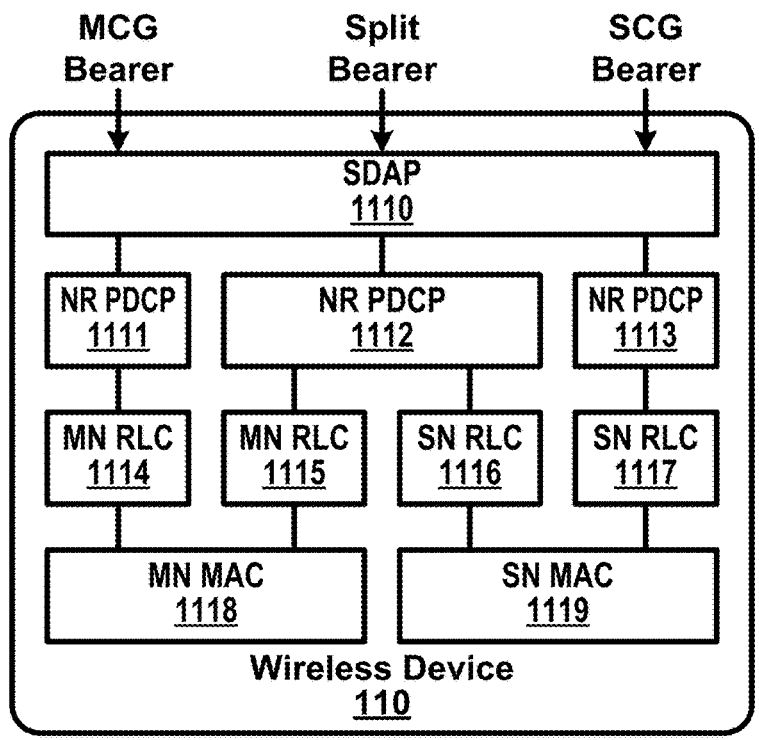
FIG. 11A and FIG. 11B show examples of multi connectivity.
Figure 11B:
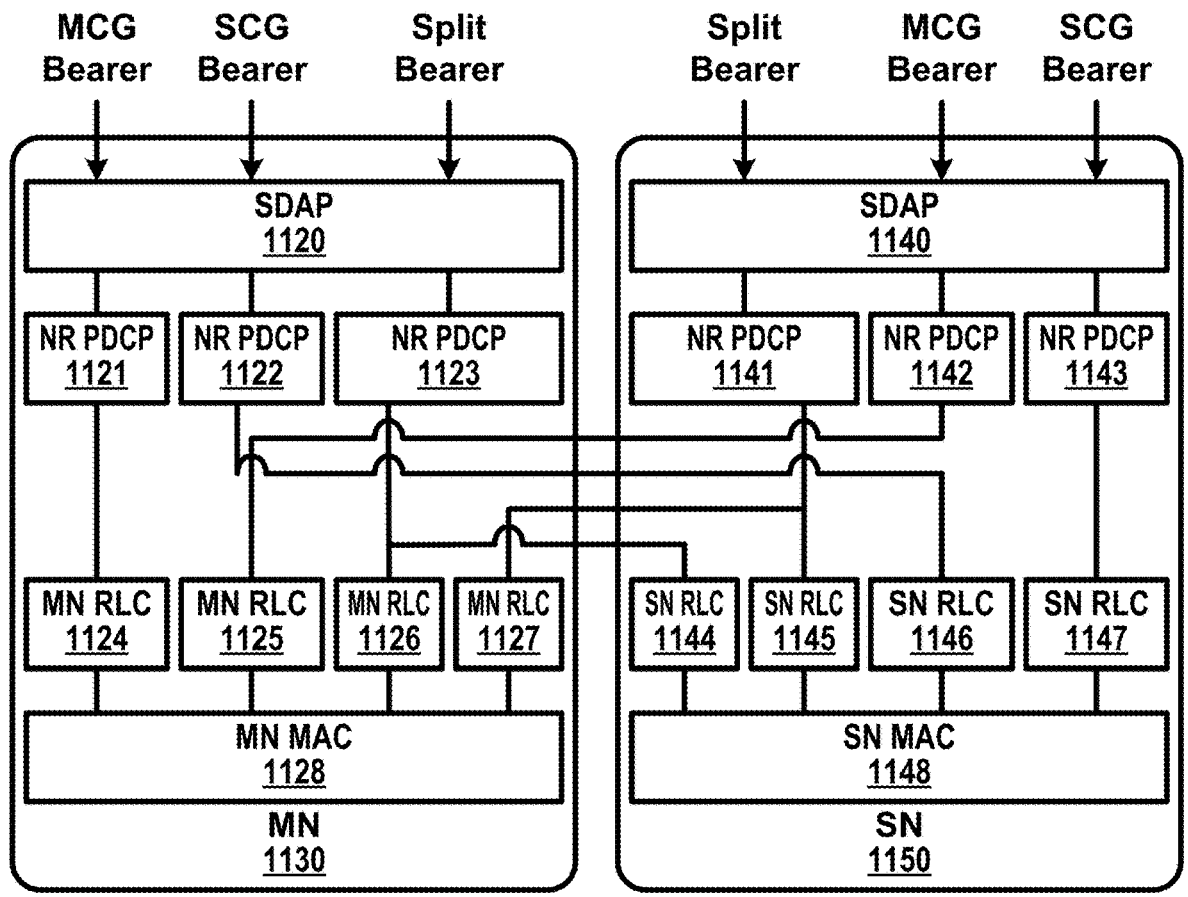

FIG. 11A and FIG. 11B show packet flows using a multi connectivity (e.g., dual connectivity, multi connectivity, tight interworking, and/or the like). FIG. 11A shows an example protocol structure of a wireless device 110 (e.g., UE) with CA and/or multi connectivity. FIG. 11B shows an example protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
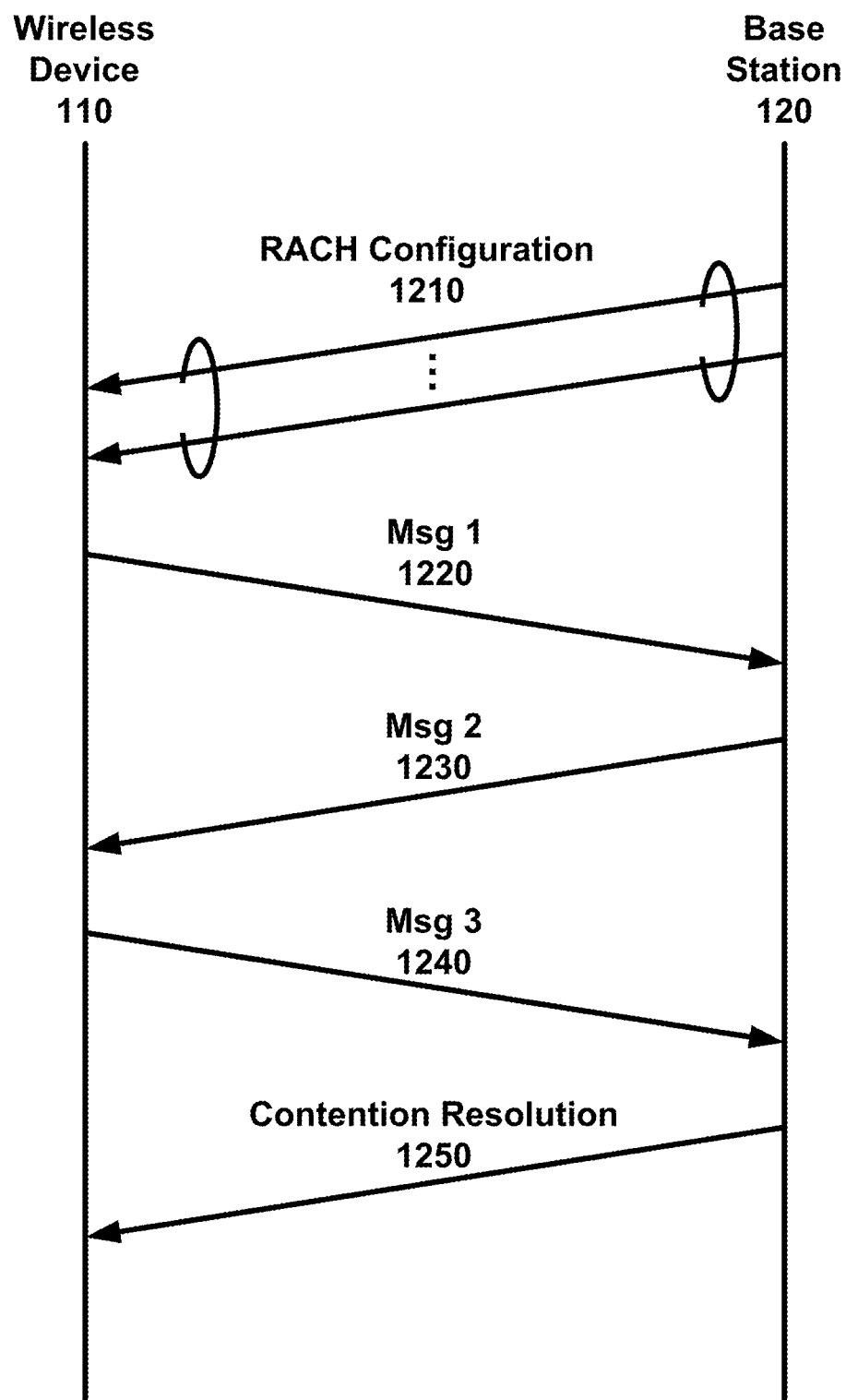
FIG. 12 shows an example of a random access procedure

FIG. 12 shows an example random access procedure. One or more events may trigger a random access procedure. For example, one or more events may be at least one of following: initial access from RRC IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise at least one of a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for beam failure recovery request and corresponding PRACH resource(s) (e.g., if any), a time window to monitor RA response(s), a time window to monitor response(s) on beam failure recovery request, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for beam failure recovery request associated with at least one of SS blocks and/or CSI-RSs. A wireless device may select a random access preamble index corresponding to a selected SS block or a CSI-RS from a set of one or more random access preambles for beam failure recovery request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine an PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For beam failure recovery request, the base station may configure the wireless device with a different time window (e.g., bfr-ResponseWindow) to monitor response on beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises only a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
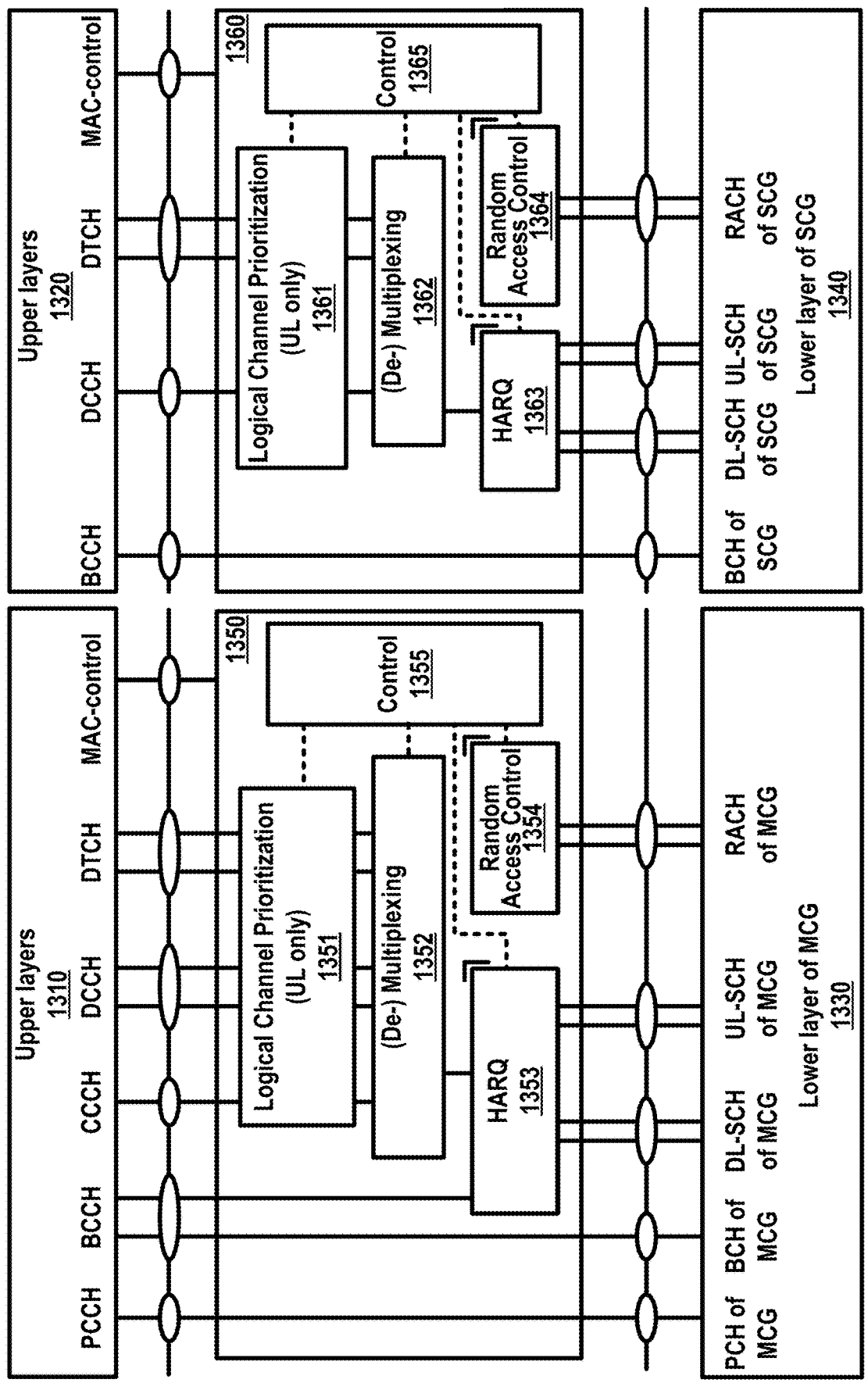
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels.

A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
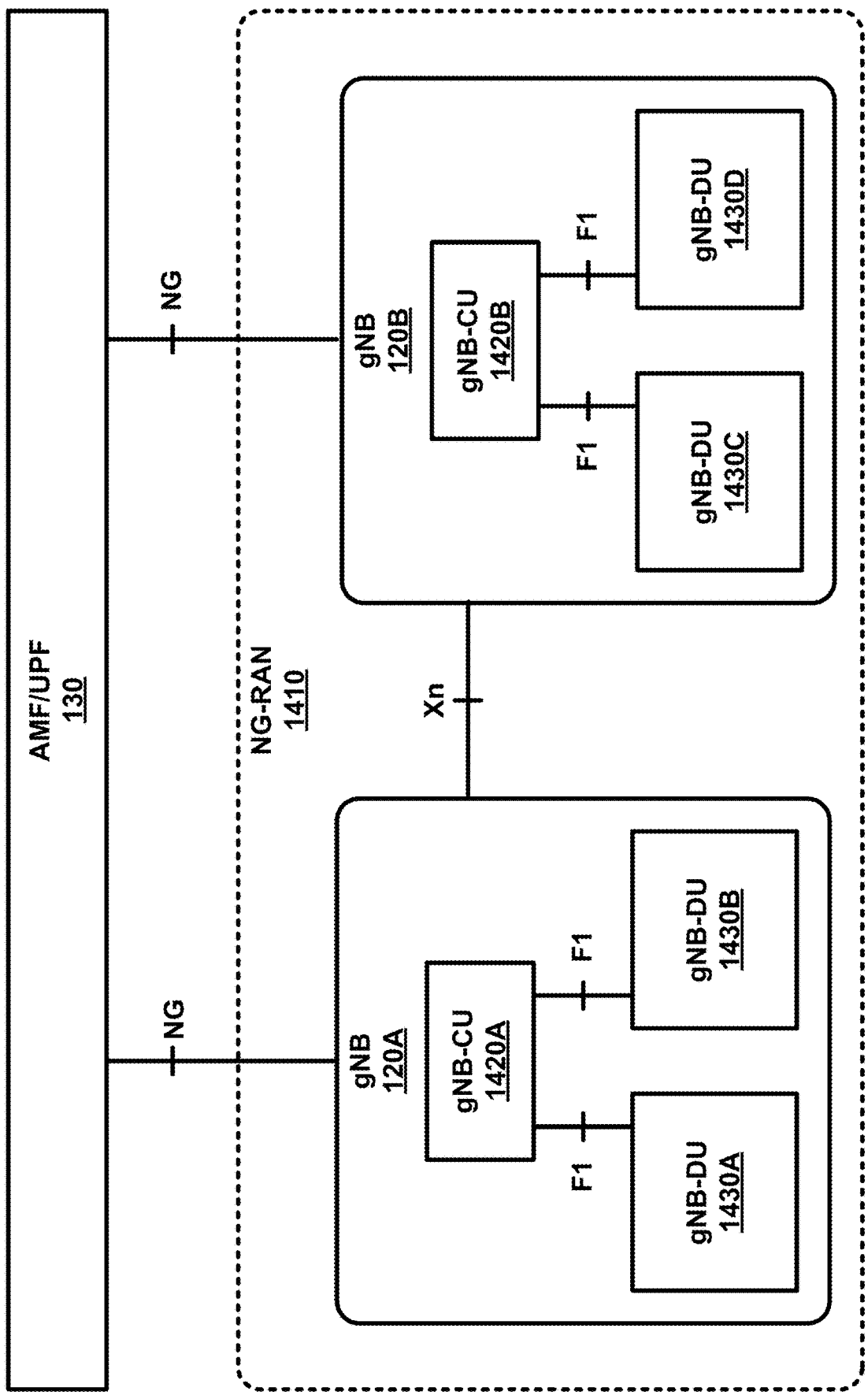
FIG. 14 shows an example RAN architecture.

FIG. 14 shows an example RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
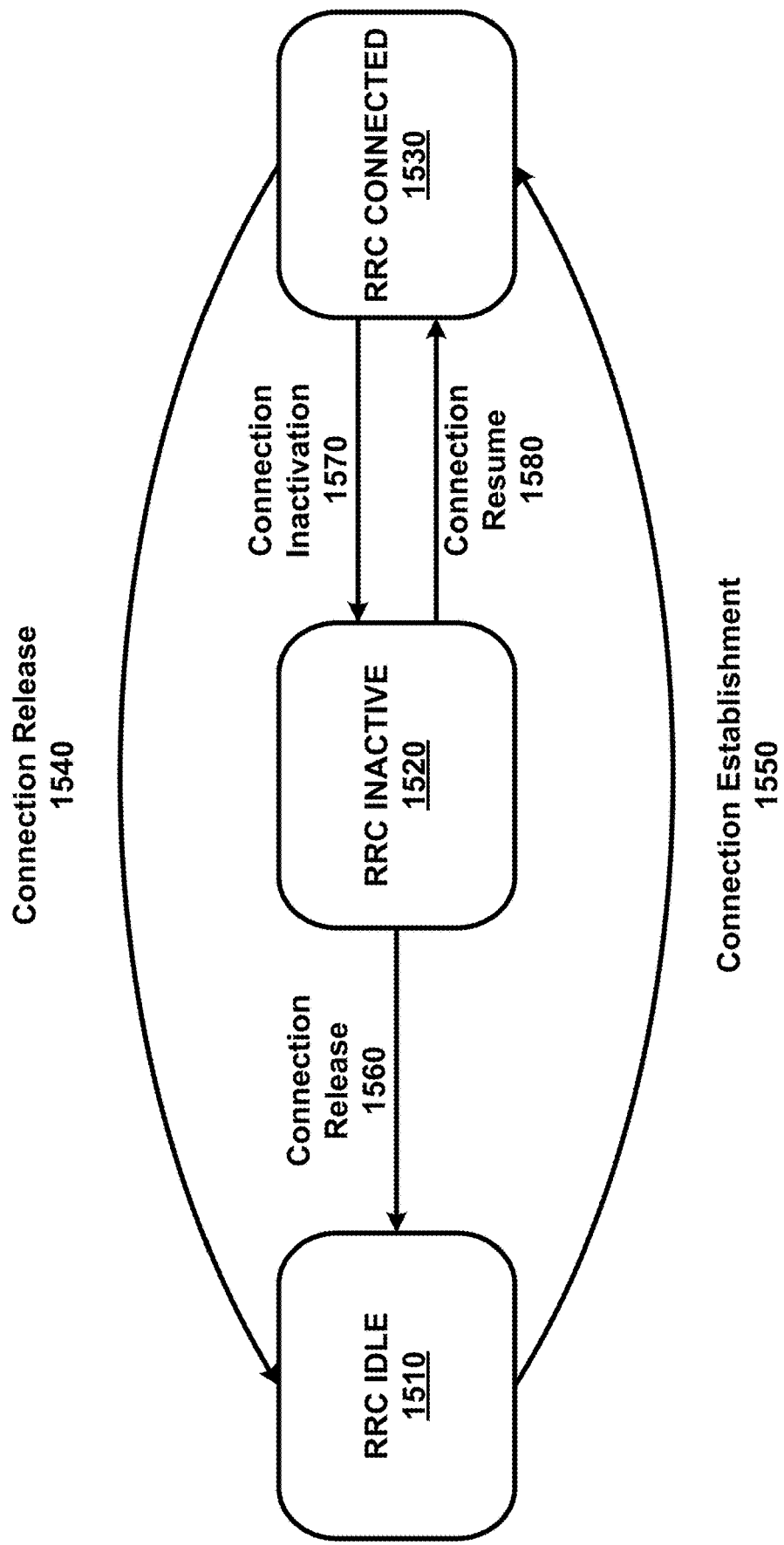
FIG. 15 shows example radio resource control (RRC) states.

FIG. 15 shows example RRC state transitions of a wireless device. A wireless device may be in at least one RRC state among an RRC connected state (e.g., RRC_Connected 1530, RRC_Connected, etc.), an RRC idle state (e.g., RRC Idle 1510, RRC Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2 stage or 2-step random access) and/or four messages (e.g., 4 stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station.

A wireless device may determine traffic pattern information associated with wireless communications. Traffic pattern information may comprise any type of traffic information associated with wireless communications of the wireless device. The wireless device may send the traffic pattern information to a base station. The base station may determine, based on the traffic pattern information, one or more configuration parameters for the wireless device. The base station may comprise at least one base station distributed unit (DU) (e.g., gNB-DU) and a base station central unit (CU) (e.g., gNB-CU). The wireless device may send, and a base station CU may receive (e.g., via a base station DU), traffic pattern information (e.g., traffic patterns of voice call, vehicle communication, sensor data, and/or the like) of the wireless device. The base station CU may send, and the base station DU may receive, the traffic pattern information. The base station CU and/or the base station DU may determine, based on the traffic pattern information, one or more configuration parameters (e.g., configured grant (CG) resources) for the wireless device. The base station DU may configure resources for the wireless device at a lower layer than the base station CU may configure resources for the wireless device. The one or more configuration parameters may comprise, for example, periodicity, time offset, and/or message size for resources. The base station DU may send the configuration parameters to the wireless device. The wireless device may configure resources based on the configuration parameters. The base station DU may send, to the wireless device, a message to activate one or more resources. After or in response to the message to activate one or more resources, the wireless device may activate the one or more resources based on the configuration parameters.

The wireless device may provide the traffic pattern information to the base station CU via a first radio resource control (RRC) message. The wireless device may send (e.g., transmit) the first RRC message to the base station CU via the base station DU. Based on the traffic pattern information, the base station DU may determine one or more configuration parameters for an uplink (e.g., wireless device-to-base station) and/or a sidelink (e.g., wireless device-to-another wireless device) associated with the wireless device. The configuration parameters may comprise semi-persistent scheduling (SPS) (e.g., configured scheduling (CS), grant free (GF) scheduling and/or configured grant (CG) scheduling, etc.) configuration parameters. The base station may send (e.g., transmit) the configuration parameters to the base station CU. The wireless device may receive the configuration parameters from the base station CU via a second RRC message. The wireless device may receive the second RRC message from the base station CU via the base station DU. The wireless device may send (e.g., transmit), to the base station DU, one or more transport blocks via resources indicated by the configuration parameters.

A base station CU may receive traffic pattern information from a wireless device. The base station CU may not provide the traffic pattern information to a base station DU, for example, in some systems such as a legacy system. The base station DU may not be able to evaluate actual requirements of the wireless device, for example, for determining radio resource configuration parameters (e.g., SPS resources and/or grant free resources) for a wireless device. The base station may not have sufficient information such as a traffic periodicity, a traffic timing offset, and/or a data size of the wireless device. By providing traffic pattern information to the base station (e.g., the base station DU and/or the base station CU), the base station (e.g., the base station DU and/or the base station CU) may be able to configure resource configuration parameters for traffic associated with the traffic pattern information to provide radio resource configuration parameters that are based on actual requirements of the wireless device and, in turn, to improve wireless communications (e.g., between the wireless device and the base station).

A base station, receiving one or more uplink packets from a wireless device in an RRC inactive state, may obtain (e.g., fetch) a wireless device context of the wireless device. The base station may obtain the wireless device context by transmitting a message (e.g., a retrieve UE context request message for the wireless device) to an anchor base station of the wireless device. The message may be based on at least one of an AS context identifier, an RNA identifier, a base station identifier, a resume identifier, and/or a cell identifier received from the wireless device. A base station may transmit, for example after or based on fetching a wireless device context, a path switch request for the wireless device to a core network entity (e.g. an AMF, an MME, and/or another entity). A core network entity may update a downlink tunnel endpoint identifier for one or more bearers established for the wireless device between a user plane core network entity (e.g., a UPF, an S-GW, and/or another entity) and a RAN node (e.g., the base station) by, for example, changing a downlink tunnel endpoint identifier from an address of the anchor base station to an address of the base station transmitting the path switch request.

A base station (e.g., a gNB) may communicate with a wireless device via a wireless network using one or more technologies (e.g., new radio (NR) technologies). The one or more radio technologies (e.g., NR) may comprise at least one of: multiple technologies related to a physical layer, multiple technologies related to a medium access control layer, and/or multiple technologies related to a radio resource control layer. The one or more radio technologies may be enhanced for improving performance of a wireless network. One or more such enhancements may increase system throughput and/or a rate of data transmission, may reduce battery consumption of a wireless device, may improve latency of data transmission between a base station (e.g., a gNB) and a wireless device, may improve network coverage of a wireless network, and/or may improve transmission efficiency of a wireless network.

A base station (e.g., a gNB) may transmit DCI via a PDCCH for at least one of: a scheduling assignment and/or a scheduling grant, a slot format notification, a pre-emption indication, and/or a power-control parameter. The DCI may, for example, comprise at least one of: an identifier of a DCI format, one or more downlink scheduling assignments, one or more uplink scheduling grants, a slot format indicator, a pre-emption indication, one or more power-control parameters for a PUCCH and/or a PUSCH, and/or one or more power-control parameters for an SRS.

A downlink scheduling assignment DCI may comprise, for example, parameters indicating at least one of: an identifier of a DCI format, a PDSCH resource indication, a transport format, HARQ information, control information related to multiple antenna schemes, and/or a command for power control of the PUCCH. An uplink scheduling grant DCI may comprise, for example, parameters indicating at least one of: an identifier of a DCI format, a PUSCH resource indication, a transport format, HARQ related information, and/or a power control command of the PUSCH.

Different types of control information may correspond to different DCI message sizes. A larger scheduling message may be used, for example, to support multiple beams, to support spatial multiplexing in the spatial domain, and/or to support noncontiguous allocation of RBs in the frequency domain. By comparison, a smaller scheduling message may be used, for example, in connection with an uplink grant allowing for frequency-contiguous allocation. A DCI may be categorized into different DCI formats. A DCI format may correspond to a certain message size and/or usage.

A wireless device may monitor, based on a common search space and/or a wireless device-specific search space, one or more PDCCHs for detecting one or more DCIs with one or more DCI formats. A wireless device may, for example, monitor a PDCCH based on a limited set of DCI formats to reduce power consumption. More power may be consumed at the wireless device if more DCI formats are to be detected.

Information in DCI formats for downlink scheduling may, for example, comprise at least one of: an identifier of a DCI format, a carrier indicator, an RB allocation, a time resource allocation, a bandwidth part indicator, a HARQ process number, one or more MCSs, one or more NDIs, one or more RVs, MIMO-related information, a Downlink Assignment Index (DAI), a TPC for a PUCCH, an SRS request, and/or padding. MIMO-related information may comprise, for example, at least one of: a PMI, precoding information, a transport block swap flag, a power offset between a PDSCH and an RS, an RS scrambling sequence, a number of layers, one or more antenna ports for a transmission, and/or a Transmission Configuration Indication (TCI). Information in DCI formats used for uplink scheduling may, for example, comprise at least one of: an identifier of a DCI format, a carrier indicator, a bandwidth part indication, a resource allocation type, an RB allocation, a time resource allocation, an MCS, an NDI, a phase rotation of the uplink DMRS, precoding information, a CSI request, an SRS request, an uplink index/DAI, a TPC for a PUSCH, and/or padding. A base station, (e.g., a gNB) may perform CRC scrambling for the DCI. The base station may perform the scrambling for the DCI, for example, before transmitting a DCI via a PDCCH. The base station may perform CRC scrambling by binarily adding multiple bits of at least one wireless device identifier (e.g., a C-RNTI, a CS-RNTI, a TPC-CS-RNTI, a TPC-PUCCH-RNTI, a TPC-PUSCH-RNTI, an SP CSI C-RNTI, and/or a TPC-SRS-RNTI) to CRC bits of the DCI. The wireless device may, in connection with detecting the DCI, check the CRC bits of the DCI. The wireless device may receive that DCI based on the CRC of that DCI being scrambled using a sequence of bits that is the same as the at least one wireless device identifier.

A base station (e.g., a gNB) may transmit one or more PDCCHs in one or more control resource sets CORESETs, for example, for supporting wide bandwidth operation. A base station (e.g., a gNB) may transmit one or more RRC messages comprising configuration parameters of one or more CORESETs. A CORESET may comprise at least one of: a first OFDM symbol, a number of consecutive OFDM symbols, a set of resource blocks, and/or a CCE-to-REG mapping. A base station (e.g., a gNB) may transmit a PDCCH in a dedicated CORESET for particular purpose, for example, for beam failure recovery confirmation. A wireless device may monitor a PDCCH for detecting one or more DCIs in one or more configured CORESETs, for example, to reduce power consumption.

A higher layer (e.g., an RRC) of a wireless device may detect radio link failure (RLF) based on one or more of: i)

physical layer problems based on a first timer and/or a counter mechanism, ii) a random-access problem indication from a MAC layer based on reaching a predetermined and/or maximum number RACH preamble transmissions, and/or iii) an indication from an RLC layer based on reaching a predetermined and/or maximum number of retransmissions.

Figure 16:
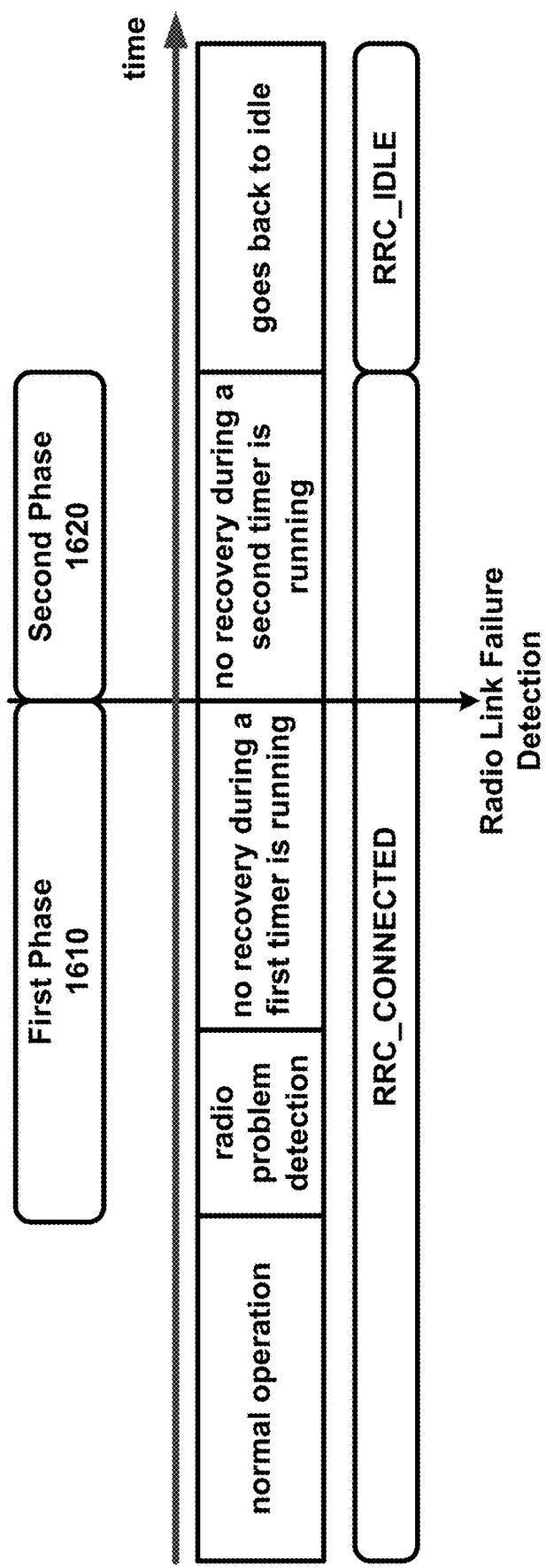
FIG. 16 is a shows an example of radio link failure (RLF).

FIG. 16 shows an example of RLF detection. RLF detection may, as shown in FIG. 16, comprise two phases. A first phase 1610 may start based on a radio problem indicated by a lower layer (e.g., a physical layer, a medium access layer). A wireless device may be in an RRC_CONNECTED mode during the first phase. A first timer may start based on an indication, from a lower layer (e.g., a physical layer, a MAC layer) to a higher layer (e.g., an RRC), of one or more radio problems. A wireless device may stop the first timer, for example, if the one or more radio problems are recovered before an expiry of the first timer. A wireless device may detect an RLF if, for example, a radio problem is not recovered before an expiry of the first timer.

A second phase 1620 may start if the wireless device detects an RLF (e.g., if a radio problem is not recovered before an expiry of the first timer in the first phase 1610) and/or a handover failure. A second timer may start based on starting the second phase 1620. A wireless device may stay in an RRC_CONNECTED mode, for example, if the second timer is running. A wireless device in the second phase 1620 may select a cell. A wireless device may initiate, for example, based on selecting that cell, an RRC connection re-establishment procedure. A wireless device may transition, for example, if the wireless device fails to select a cell before an expiry of the second timer, from the RRC_CONNECTED mode to the RRC IDLE mode. A wireless device may indicate to a base station, for example, if the RRC connection re-establishment procedure is successful, an availability of a stored RLF report. The wireless device may send a stored RLF report to a base station, for example, after or based on a request from the base station.

Figure 17:
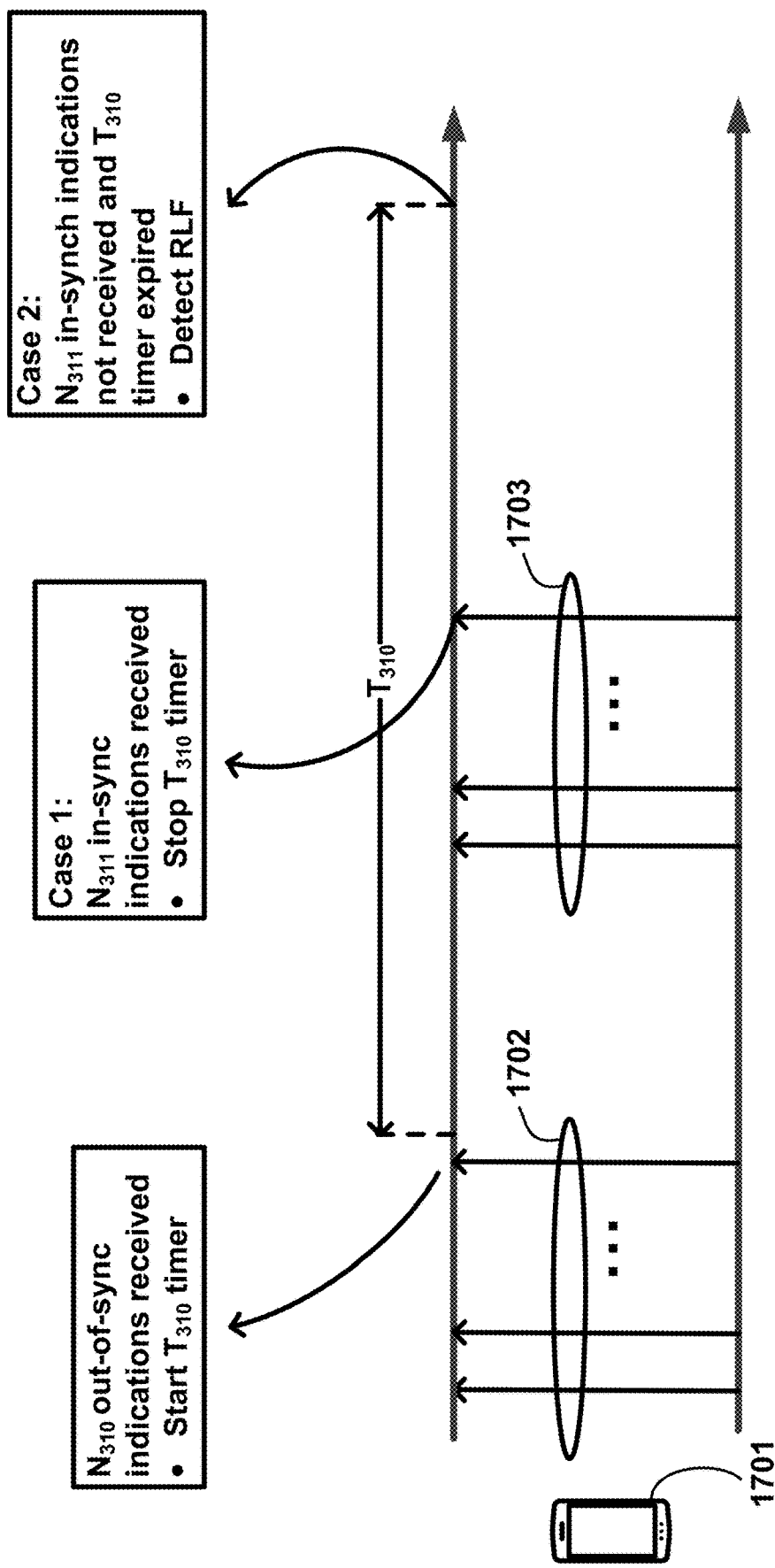
FIG. 17 is shows an example of an RLF based on a physical layer problem.

FIG. 17 is shows an example of an RLF detection based on a physical layer problem. The RLF detection may facilitate timely initiation of a radio link recovery procedure. An RLF detection may comprise performing downlink signal measurements by a physical layer of a wireless device. A wireless device 1701 may, for example, monitor quality (e.g., a block error rate (BLER)) of a DL based on one or more reference signals (RSs) (e.g., a CRS, a CSI-RS, and/or SS blocks). The wireless device 1701 may compare the quality of a DL against a first threshold (e.g., a $Q_{OUT}$ threshold) and/or a second threshold (e.g., a $Q_{IN}$ threshold). Based on one or more such comparisons of the quality of a DL, a physical layer of the wireless device 1701 may report an out-of-sync (OOS) or an in-sync (IS) indication to a higher layer (e.g., an RRC) of the wireless device 1701. A physical layer of the wireless device 1701 may, for example, report an OOS indication if the quality of a DL (e.g., a BLER) fails to satisfy (e.g., is lower than) the first threshold (e.g., $Q_{OUT}$ may be 10%). The physical layer of the wireless device 1701 may, for example, report an IS indication if the quality of a DL (e.g., a BLER) fails to satisfy (e.g., is higher than) the second threshold (e.g., $Q_{IN}$ may be 2%). If a first quantity of consecutive periodic OOS indications 1702 satisfies (e.g., if equal to (or higher than)) a first counter value (e.g. $N_{310}$), an RRC layer may start a first timer (e.g. $T_{310}$). A first counter value and/or a value of a first timer may be semi-statically configured in an RRC message.

A physical layer problem may be recovered, for example, if an RRC layer receives, from a lower (e.g., physical) layer, a second quantity of consecutive periodic IS indications 1703 that satisfies (e.g., is equal to) a second counter value (e.g. $N_{311}$) while a first timer (e.g. $T_{310}$) is running. Based on receiving the second quantity of consecutive IS indications, an RRC layer may stop the first timer. If an RRC layer does not receive a second quantity of consecutive IS indications from a lower (e.g., physical) layer (e.g. $N_{311}$) before an expiry of the first timer (e.g. $T_{310}$), the wireless device 1701 may determine an RLF.

A base station (e.g., a gNB) and/or a wireless device may have multiple antennas, for example, to support a transmission with high data rate (such as in an NR system). A wireless device may perform one or more beam management procedures, as shown in FIG. 9B, for example, if configured with multiple antennas.

A wireless device may perform a downlink beam management based on one or more CSI-RSs and/or one or more SS blocks. In a beam management procedure, a wireless device may measure a channel quality of a beam pair link. The beam pair link may comprise a transmitting beam from a base station and a receiving beam at the wireless device. A wireless device may measure the multiple beam pair links between the base station and the wireless device, for example, if the wireless device is configured with multiple beams associated with multiple CSI-RSs and/or SS blocks.

A wireless device may send (e.g., transmit) one or more beam management reports to a base station. The wireless device may indicate one or more beam pair quality parameters, for example, in a beam management report. The one or more beam pair quality parameters may comprise at least one or more beam identifications; RSRP; and/or PMI, CQI, and/or RI of at least a subset of configured multiple beams.

A base station and/or a wireless device may perform a downlink beam management procedure on one or multiple Transmission and Receiving Point (TRPs), such as shown in FIG. 9B. Based on a wireless device's beam management report, a base station may send (e.g., transmit), to the wireless device, a signal indicating that a new beam pair link is a serving beam. The base station may transmit PDCCH and/or PDSCH to the wireless device using the serving beam.

A wireless device and/or a base station may trigger a beam failure recovery mechanism. A wireless device may trigger a beam failure recovery request (BFRQ) procedure, for example, if at least a beam failure occurs. A beam failure may occur if a quality of beam pair link(s) of at least one PDCCH falls below a threshold. The threshold may comprise an RSRP value (e.g., −140 dbm, −110 dbm, or any other value) and/or an SINR value (e.g., −3 dB, −1 dB, or any other value), which may be configured in an RRC message.

Figure 18A:
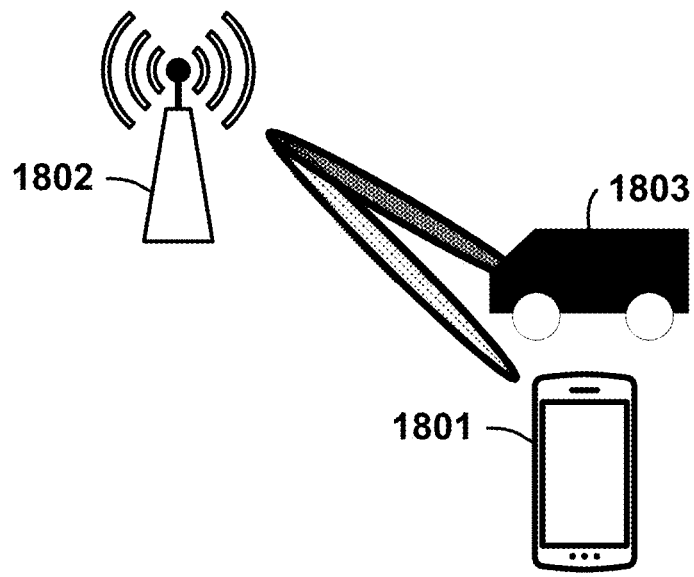
FIG. 18A and FIG. 18B show examples of a downlink beam failure.

FIG. 18A shows an example of a first beam failure event. A base station 1802 may send (e.g., transmit) a PDCCH from a transmission (Tx) beam to a receiving (Rx) beam of a wireless device 1801 from a TRP. The base station 1802 and the wireless device 1801 may start a beam failure recovery procedure on the TRP, for example, if the PDCCH on the beam pair link (e.g., between the Tx beam of the base station 1802 and the Rx beam of the wireless device 1801) have a lower-than-threshold RSRP and/or SINR value due to the beam pair link being blocked (e.g., by a moving vehicle 1803, a building, or any other obstruction).

Figure 18B:
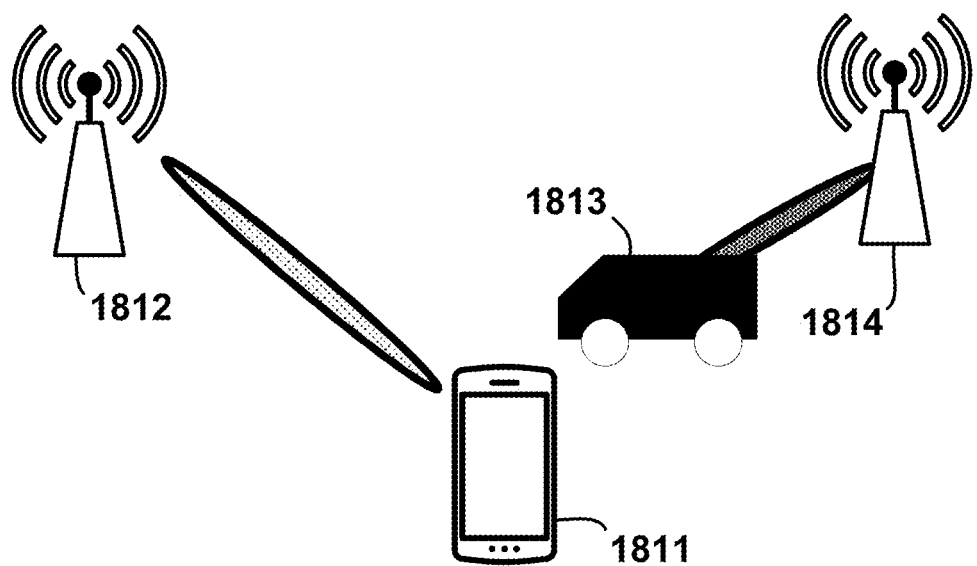

FIG. 18B shows an example of a second beam failure event. A base station 1810 may send (e.g., transmit) a PDCCH from a beam to a wireless device 1811 from a first TRP 1814. The base station 1802 and the wireless device 1811 may start a beam failure recovery procedure on a new beam on a second TRP 1812, for example, if the PDCCH on the beam is blocked (e.g., by a moving vehicle 2013, building, or any other obstruction).

A wireless device may measure a quality of beam pair links using one or more RSs. The one or more RSs may comprise one or more SS blocks and/or one or more CSI-RS resources. A CSI-RS resource may be determined by a CSI-RS resource index (CRI). A quality of beam pair links may be indicated by, for example, an RSRP value, a reference signal received quality (e.g., RSRQ) value, and/or a CSI (e.g., SINR) value measured on RS resources. A base station may indicate whether an RS resource, used for measuring beam pair link quality, is QCLed (Quasi-Co-Located) with DM-RSs of a PDCCH. The RS resource and the DM-RSs of the PDCCH may be QCLed, for example, if the channel characteristics from a transmission on an RS to a wireless device, and that from a transmission on a PDCCH to the wireless device, are similar or same under a configured criterion. The RS resource and the DM-RSs of the PDCCH may be QCLed, for example, if doppler shift and/or doppler shift of the channel from a transmission on an RS to a wireless device, and that from a transmission on a PDCCH to the wireless device, are the same.

A wireless device may monitor a PDCCH on M (e.g., 2, 4, 8) beam pair links simultaneously, where M≥1 and the value of M may depend at least on capability of the wireless device. Monitoring a PDCCH may comprise detecting a DCI via the PDCCH transmitted on common search spaces and/or wireless device specific search spaces. Monitoring multiple beam pair links may increase robustness against beam pair link blocking. A base station may send (e.g., transmit) one or more messages comprising parameters indicating a wireless device to monitor PDCCH on different beam pair link(s) in different OFDM symbols.

A base station may send (e.g., transmit) one or more RRC messages and/or MAC CEs comprising parameters indicating Rx beam setting of a wireless device for monitoring PDCCH on multiple beam pair links. A base station may send (e.g., transmit) an indication of a spatial QCL between DL RS antenna port(s) and DL RS antenna port(s) for demodulation of DL control channel. The indication may comprise a parameter in a MAC CE, an RRC message, a DCI, and/or any combinations of these signaling.

A base station may indicate spatial QCL parameters between DL RS antenna port(s) and DM-RS antenna port(s) of DL data channel, for example, for reception of data packet on a PDSCH. A base station may send (e.g., transmit) DCI comprising parameters indicating the RS antenna port(s) are QCLed with DM-RS antenna port(s).

A wireless device may measure a beam pair link quality based on CSI-RSs QCLed with DM-RS for PDCCH, for example, if a base station sends (e.g., transmits) a signal indicating QCL parameters between CSI-RS and DM-RS for PDCCH. The wireless device may start a BFR procedure, for example, if multiple contiguous beam failures occur.

A wireless device may send (e.g., transmit) a BFRQ signal on an uplink physical channel to a base station, for example, if starting a BFR procedure. The base station may send (e.g., transmit) a DCI via a PDCCH in a CORESET, for example, after or in response to receiving the BFRQ signal on the uplink physical channel. The wireless device may determine that the BFR procedure is successfully completed, for example, after or in response to receiving the DCI via the PDCCH in the CORESET.

A base station may send (e.g., transmit) one or more messages comprising configuration parameters of an uplink physical channel, or signal, for transmitting a beam failure recovery request. The uplink physical channel or signal may be based on one of: a contention-free PRACH (e.g., BFR-PRACH), which may be a resource orthogonal to resources of other PRACH transmissions; a PUCCH (e.g., BFR-PUCCH); and/or a contention-based PRACH resource (e.g., CF-PRACH). Combinations of these candidate signals and/or channels may be configured by the base station. A wireless device may autonomously select a first resource for transmitting the BFRQ signal, for example, if the wireless device is configured with multiple resources for a BFRQ signal. The wireless device may select a BFR-PRACH resource for transmitting a BFRQ signal, for example, if the wireless device is configured with the BFR-PRACH resource, a BFR-PUCCH resource, and/or a CF-PRACH resource. The base station may send (e.g., transmit) a message to the wireless device indicating a resource for transmitting the BFRQ signal, for example, if the wireless device is configured with a BFR-PRACH resource, a BFR-PUCCH resource, and/or a CF-PRACH resource.

A base station may send (e.g., transmit) a response to a wireless device, for example, after receiving one or more BFRQ signals. The response may comprise the CRI associated with the candidate beam that the wireless device may indicate in the one or multiple BFRQ signals. A base station and/or a wireless device may perform one or more beam management procedures, for example, if the base station and/or the wireless device are configured with multiple beams (e.g., in a system such as in an NR system). The wireless device may perform a BFR procedure, for example, if one or more beam pair links between the base station and the wireless device fail.

Figure 19:
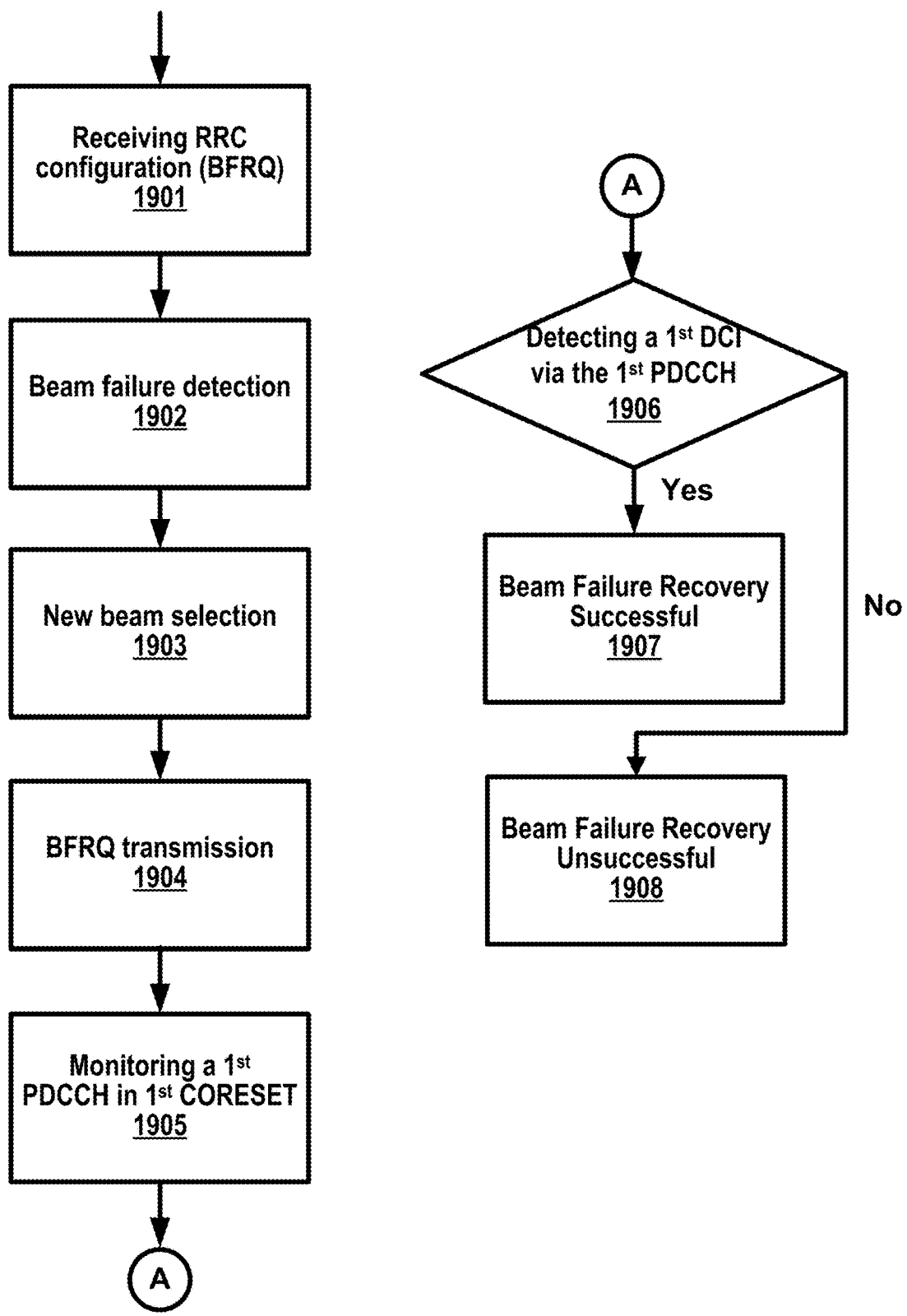
FIG. 19 shows example beam failure recovery (BFR) procedures for a primary cell.

FIG. 19 shows an example of beam failure recovery (BFR) procedures. The BFR procedures shown in FIG. 19 may be for a primary cell. At step 1901, a wireless device may receive one or more messages (e.g., RRC messages) comprising one or more BFRQ parameters. At step 1902, the wireless device may detect a beam failure according to one or more BFRQ parameters, for example, the one or more BFRQ parameters received at step 1901. The wireless device may start a first timer, for example, after or in response to detecting the beam failure. At step 1903, the wireless device may select a candidate beam (e.g., based on a received power of downlink reference signal such as SSB, CSI-RS, and/or DMRS), for example, after or in response to detecting the beam failure. At step 1904, the wireless device may send (e.g., transmit) a first BFRQ signal to a base station, for example, after or in response to the selecting of the candidate beam (e.g., downlink reference signal such as SSB, CSI-RS, and/or DMRS). The wireless device may start a response window, for example, after or in response to sending (e.g., transmitting) the first BFRQ signal. The response window may be a timer with a value configured (or determined) by the base station. At step 1905, the wireless device may monitor a PDCCH in a first CORESET, for example, if the response window is running. The wireless device may monitor the PDCCH for a BFRQ response (e.g., downlink control information) from the base station. The first CORESET may be associated with the BFR procedure. The wireless device may monitor the PDCCH in the first CORESET, for example, in condition of sending (e.g., transmitting) the first BFRQ signal. At step 1906, the wireless device may receive a first DCI via the PDCCH in the first CORESET, for example, during the response window. At step 1907, the wireless device may determine that the BFR procedure is successfully completed, for example, after or in response to receiving the first DCI via the PDCCH in the first CORESET. At step 1907, the wireless device may also determine that the BFR procedure is successfully completed, for example, before the response window expires. The wireless device may stop the first timer and/or stop the response window, for example, after or in response to the BFR procedure being successfully completed.

The wireless device may, before the first timer expires, for example, perform one or more actions comprising at least one of: a BFRQ signal transmission; starting the response window; or monitoring the PDCCH. The wireless device may perform one or more of said actions, for example, if the response window expires and/or the wireless device does not receive the DCI. The wireless device may repeat one or more of said actions, for example, until the BFR procedure successfully is completed and/or the first timer expires.

At step 1908, the wireless device may declare (and/or indicate) a BFR procedure failure, for example, if the first timer expires and/or the wireless device does not receive the DCI. A wireless device may declare (and/or indicate) a BFR procedure failure, for example, if a number of transmissions of BFRQ signals is greater than a semi-statically configured number. The base station may determine this number in the beam failure recovery configuration parameters sent to the wireless device. The wireless device may receive, from the base station, one or more configuration parameters comprising the configured number, for example, the maximum number of BFRQ transmission.

The wireless device may trigger a BFR procedure, for example, if a number of beam failure instances (e.g. contiguous beam failure instances) are detected. A beam failure instance may occur, for example, if a quality of a beam pair link is lower than a semi-statically configured threshold. The base station may determine this threshold (value) in the beam failure recovery configuration parameters sent to the wireless device. The wireless device may receive, from the base station, one or more configuration parameters comprising the configured threshold, for example, the value of the threshold used for beam failure detection. A beam failure instance may occur, for example, if the RSRP value and/or the SINR value of a beam pair link is lower than a first threshold value. A beam failure instance may also occur, for example, if the BLER of the beam pair link is higher than a second threshold value. Sporadic beam failure instance may not necessarily trigger a BFR procedure. Examples described herein provide methods and systems for triggering a BFR procedure, for example, triggering a BFR procedure in a NR system.

A wireless device may receive, from a base station, one or more RRC messages comprising one or more configuration parameters of a BFR procedure. The one or more configuration parameters of the BFR procedure may comprise at least a first threshold for beam failure detection; at least a second threshold for selecting a beam(s); and/or a first CORESET associated with the BFR procedure. The first CORESET may comprise one or more RBs in the frequency domain and/or a symbol in the time domain.

The first CORESET may be associated with the BFR procedure. The wireless device may monitor at least a first PDCCH in the first CORESET, for example, after or in response to sending (e.g., transmitting) a BFRQ signal indicating the beam failure. The wireless device may not monitor the first PDCCH in the first CORESET, for example, after or in response to not sending (e.g., transmitting) the BFRQ signal. A base station may not send (e.g., transmit) a PDCCH in the first CORESET, for example, if the base station does not receive the BFRQ signal on an uplink resource. The base station may send (e.g., transmit) a PDCCH in a second CORESET, for example, if the base station does not receive the BFRQ signal. The wireless device may monitor a PDCCH in a second CORESET, for example, before the BFR procedure is triggered. The second CORESET may be different from the first CORESET.

The one or more configuration parameters of the BFR procedure may indicate a first set of RSs for beam failure detection. Additionally, or alternatively, the one or more configuration parameters of the BFR procedure may indicate one or more PRACH resources associated with a second set of RSs (beams) for candidate beam selection. The one or more PRACH resources may comprise at least one of: one or more preambles, one or more time resources, and/or one or more frequency resources. Each RS of the second set of RSs may be associated with a preamble, a time resource, and/or a frequency resource of at least one of the one or more PRACH resources.

The one or more configuration parameters of the BFR procedure may indicate one or more PUCCH resources or scheduling request (SR) resources associated with a third set of RSs (beams). The one or more PUCCH resources or SR resources may comprise at least one of: a time allocation; a frequency allocation; a cyclic shift; an orthogonal cover code; and/or a spatial setting. One or more RSs of the third set of RSs may be associated with each of the one or more PUCCH or SR resources.

The first set of RSs may comprise one or more first CSI-RSs or one or more first SS blocks (SSBs). The second set of RSs may comprise one or more second CSI-RSs or one or more second SSBs. The third set of RSs may comprise one or more third CSI-RSs or one or more third SSBs. A BFRQ signal may comprise a PRACH preamble sent (e.g., transmitted) via a time or frequency resource of a PRACH resource. A BFRQ signal may comprise a PUCCH or SR resource sent (e.g., transmitted) on a PUCCH or SR resource.

The one or more configuration parameters of the BFR procedure may comprise at least a first value indicating a number of beam failure instances that may trigger the BFR procedure; a second value of a second timer indicating a duration of time after which the BFR procedure may be triggered; a third value indicating a number of BFRQ signal transmissions; a fourth value of a fourth timer indicating a duration of time at (e.g., during) which the wireless device may receive a response from a base station; and/or a fifth value of a fifth timer indicating a duration of time after which the wireless device may declare (or indicate) a BFR procedure failure.

The wireless device (e.g., a physical layer of the wireless device) may measure the first set of RSs. The physical layer of the wireless device may indicate one or more beam failure instances and/or one or more beam non-failure instances periodically to the MAC entity of the wireless device, for example, based on the first threshold (e.g., the first threshold for beam failure detection). The physical layer of the wireless device may indicate a beam failure instance, for example, if the measured quality (e.g., RSRP or SINR) of at least one of the first set of RSs is lower than the first threshold (e.g., the first threshold for beam failure detection). The physical layer of the wireless device may indicate a beam non-failure instance, for example, if the measured quality (e.g., RSRP or SINR) of at least one of the first set of RSs is equal to or higher than the first threshold (e.g., the first threshold for beam failure detection). The periodicity of the indication (e.g., the indication of the beam failure or non-failure instance) may be a value, for example, a value configured or determined by the base station. The periodicity of the indication may be the same as the periodicity of transmission of the first set of RSs.

The MAC entity of the wireless device may set an instance counter (e.g., increment the instance counter by one), for example, after or in response to receiving a first beam failure indication from the physical layer. The MAC entity may increment the instance counter (e.g., increment the instance counter by one), for example, after or in response to receiving a contiguous second beam failure indication. The MAC entity may reset the instance counter (e.g., zero), for example, after or in response to receiving a third beam non-failure indication. The wireless device may receive a non-failure indication, which indicates that no beam failure has been detected and/or that the downlink control channels are of a sufficient quality (e.g., above a threshold quality).

The MAC entity may start the second timer associated with the second value (e.g., the value indicating the duration of time after which the BFR procedure may be triggered), for example, after or in response to receiving a first beam failure indication from the physical layer of the wireless device. The MAC entity may restart the second timer, for example, after or in response to receiving a second beam non-failure indication from the physical layer of the wireless device. The MAC entity may not trigger the BFR procedure, for example, if the second timer expires and the instance counter indicates a value smaller than the first value (e.g., the number of beam failure instances that may trigger the BFR procedure). The MAC entity may reset the instance counter (e.g., reset the instance counter to zero), for example, if the second timer expires and/or the instance counter indicates a value smaller than the first value (e.g., the number of beam failure instances that may trigger the BFR procedure). The MAC entity may also reset the second timer, for example, if the second timer expires and/or the instance counter indicates a value smaller than the first value (e.g., the number of beam failure instances that may trigger the BFR procedure). The MAC entity may trigger a BFR procedure, for example, if the instance counter indicates a value equal to or greater than the first value (e.g., the number of beam failure instances that may trigger the BFR procedure). The MAC entity may also trigger a BFR procedure, for example, if the MAC entity receives the first value (e.g., the number of beam failure instances that may trigger the BFR procedure) from the physical layer.

The MAC entity may perform at least one of: resetting the instance counter (e.g., resetting the instance counter to zero); resetting the second timer; and/or indicating to the physical layer to stop beam failure instance indication. The MAC entity may perform at least one of said actions, for example, after or in response to triggering the BFR procedure. The MAC entity may ignore the periodic beam failure instance indication, for example, after or in response to triggering the BFR procedure.

The MAC entity may start the fifth timer associated with the fifth value (e.g., the value indicating the duration of time after which the wireless device may declare or indicate a BFR procedure failure), for example, after or in response to triggering the BFR procedure. The MAC entity may request the physical layer of the wireless device to indicate a beam and/or the quality of the beam, for example, after or in response to starting the fifth timer. The physical layer of the wireless device may measure at least one of the second set of RSs. The physical layer of the wireless device may select a beam based on the second threshold. The beam may be determined by a CSI-RS resource index or an SS blocks index. The physical layer of the wireless device may select a beam, for example, if the measured quality (e.g., RSRP or SINR) of an RS associated with the beam is greater than the second threshold. The physical layer of the wireless device may not necessarily indicate the beam to the MAC entity periodically. Alternatively, the physical layer of the wireless device may indicate the beam to the MAC entity, for example, after or in response to receiving the request from the MAC entity.

The physical layer of the wireless device may indicate a beam to the MAC entity periodically, for example, after or in response to indicating a beam failure instance. The MAC entity may instruct the physical layer of the wireless device to send (e.g., transmit) a BFRQ signal promptly, since the MAC entity may have the beam available, for example, after or in response to triggering a BFR procedure.

The MAC entity may select a BFRQ signal based on the beam (e.g., the beam indicated by the physical layer as a candidate beam) and instruct the physical layer to send (e.g., transmit) the BFRQ signal to a base station, for example, if the fifth timer is running. Additionally, or alternatively, the MAC entity may select a BFRQ signal based on the beam and instruct the physical layer to send (e.g., transmit) the BFRQ signal to a base station, for example, after or in response to receiving the indication of the beam from the physical layer. The BFRQ signal may be, to a base station, an indication of one or more candidate beams that the wireless device prefers. One or more different types of BFRQ signals may be implemented. The BFRQ signal may be a PRACH preamble associated with the candidate beam. The BFRQ signal may be a PUCCH or SR signal associated with the candidate beam (e.g., the association may be semi-statically configured). The BFRQ signal may be any type of indication of the candidate beam (e.g., a beam index of at least one candidate beam).

The wireless device may start monitoring a PDCCH for receiving a DCI, at least in the first CORESET, after a time period since sending (e.g., transmitting) the BFRQ signal. The time period may be a fixed period (e.g., four slots), or a value determined by an RRC message. The wireless device may start the fourth timer with a fourth value (e.g., the value indicating the duration of time during which the wireless device may receive a response from the base station), for example, after or in response to the time period since sending (e.g., transmitting) the BFRQ signal. The wireless device may monitor the PDCCH in the first CORESET, for example, if the fourth timer is running.

The wireless device may receive a DCI via the PDCCH at least in the first CORESET if the fourth timer is running. The wireless device may consider the BFR procedure successfully completed in response to receiving the DCI via the PDCCH at least in the first CORESET, for example, if the fourth timer is running. The wireless device may stop the fourth timer and/or stop the fifth timer, for example, after or in response to the BFR procedure being successfully completed. The wireless device may keep monitoring the PDCCH in the first CORESET until receiving an indication for QCL parameters of a second PDCCH in a second CORESET, for example, after or in response to the BFR procedure is successfully completed.

The wireless device may set a BFRQ transmission counter to a value (e.g., set the BFRQ counter to one, or any other value) in response to the fourth timer expiring. The wireless device may perform one or more actions comprising at least one of: sending (e.g., transmitting) the BFRQ signal; starting the fourth timer; monitoring the PDCCH; and/or incrementing the BFRQ transmission counter (e.g., incrementing the BFRQ transmission counter by one). The wireless device may perform the one or more actions, for example, after or in response to the fourth timer expiring. The wireless device may repeat the one or more actions, for example, until the BFR procedure is successfully completed or the fifth timer expires. The wireless device may determine (or indicate) the BFR procedure failure, for example, after or in response to the fifth timer expiring.

A power headroom report (PHR) procedure may be used for providing a base station (e.g., a gNB) with information, for one or more activated cells, about a difference between a wireless device maximum transmit power and an estimated power for transmission (e.g., for an UL-SCH), and/or with information about a difference between a wireless device maximum power and an estimated power for UL-SCH and PUCCH transmission on a cell and/or a PUCCH SCell. An RRC layer (e.g., at a gNB and/or a network) may, for example control a PHR and may transmit one or more messages comprising PHR configuration parameters (e.g., phr-PeriodicTimer, phr-ProhibitTimer, phr-Tx-PowerFactor-Change, phr-Type2PCell, phr-Type2OtherCell, phr-Mode-OtherCG, and/or multiplePHR).

A wireless device may, for example, trigger a PHR based on a PHR periodic timer (e.g., phr-PeriodicTimer) being expired. A wireless device may also or alternatively trigger a PHR based on a PHR prohibit timer (e.g., phr-Prohibit-Timer) that is expired and/or has been expired, with a path loss change that has been higher than a PHR pathloss change threshold (e.g., phr-Tx-PowerFactorChange, in dB), for at least one activated cell of a MAC entity usable as a pathloss reference, for a time period. That time period may be, for example, a period since a last transmission of a PHR, in the MAC entity usable as the pathloss reference, when that MAC entity had UL resources for new transmission. A wireless device may also or alternatively trigger a PHR based on configuration or reconfiguration of a PHR functionality by upper layers, which may not be used to disable the function. A wireless device may also or alternatively trigger a PHR based on an activation, of an SCell of a MAC entity with a configured uplink, and/or an addition of the PSCell (e.g., a PSCell may be newly added and/or changed). A wireless device may also or alternatively trigger a PHR based on a PHR prohibit timer (e.g., phr-ProhibitTimer) that is expired and/or has been expired, and the following additional conditions also being met: (i) a MAC entity has UL resources for a new transmission, (ii) for at least one activated cell of the MAC entity with a configured uplink, there may be UL resources allocated for transmission or there may be a PUCCH transmission on the cell, and (iii) a required power backoff due to power management for the cell may have changed, more than a PHR pathloss change threshold (e.g., phr-Tx-PowerFactorChange dB), since a last transmission of a PHR at a time that the MAC entity had UL resources allocated for transmission or PUCCH transmission on the cell.

A wireless device may, for example, if the wireless device has UL resources allocated for a new transmission, start a PHR periodic timer if a first UL resource is firstly allocated for a new transmission since a last MAC reset. A wireless device may transmit, for example, if a PHR procedure determines that at least one PHR has been triggered and not cancelled, and if allocated UL resources accommodate at least one PHR (e.g., a MAC CE for the PHR which the MAC entity is configured to transmit, plus its subheader, as a result of logical channel prioritization), at least one PHR to a base station (e.g., a gNB). A PHR procedure and/or a PHR format may depend, for example on whether a base station (e.g., a gNB) configures a wireless device with a single entry PHR format or a multiple entry PHR format.

If a base station (e.g., a gNB) configures a wireless device with a multiple entry PHR format (e.g., by transmitting an RRC configuration parameter indicating the multiple entry PHR format (e.g., multiplePHR)), the wireless device may determine, for a non-SUL carrier of at least one cell of one or more activated cells with configured uplink(s) associated with the wireless device, a first value of a first type power headroom (PH) (e.g., Type 1 PH determined based on PUSCH transmission) or a third type PH (e.g., Type 3 PH determined based on SRS transmission). A wireless device may determine, for example, if the wireless device has UL resources allocated for a transmission on the at least one cell, or if one or more other cells of the one or more activated cells have UL resources allocated for transmission on the at least one cell and PHR configuration parameters transmitted for indicating a PHR mode of other cell group indicates a real value (e.g., phr-ModeOtherCG is set to a real by an RRC) of a first type PH (introduced later in this specification) or a third type PH (introduced later in this specification), a second value corresponding to $P_{CMAX,c}$ (introduced later in this specification) and transmit the first value and the second value via corresponding one or more fields in a PHR.

If a PHR configuration parameter transmitted to a wireless device from a base station (e.g., a gNB) indicates a second type PH (introduced later in this specification) for a PCell (e.g., if an RRC parameter, phr-Type2PCell, is configured), a wireless device may, for example determine a first value of the second type PH of the PCell and determine a second value corresponding to $P_{CMAX, c}$. The wireless device may transmit the first value and the second value via one or more corresponding fields in a PHR.

A wireless device may, for example, if a PHR configuration parameter transmitted to the wireless device from a base station (e.g., a gNB) indicates a second type PH (e.g., if an RRC parameter, phr-Type2OtherCell, is configured), and a PUCCH SCell is configured, determine a first value of the second type PH of the PUCCH SCell and determine a second value corresponding to $P_{CMAX, c}$. The wireless device may transmit the first value and the second value via one or more corresponding fields in a PHR. A wireless device may, for example, if a PHR configuration parameter transmitted to the wireless device from a base station (e.g., a gNB) indicates a second type PH (e.g., if an RRC parameter, phr-Type2OtherCell is configured) and a PUCCH SCell is not configured (e.g., if another cell group is configured), determine a first value of the second type PH of the SpCell and determine a second value corresponding to $P_{CMAX, c}$. The wireless device may transmit the first value and the second value via one or more corresponding fields in a PHR.

A wireless device may trigger a multiplexing and assembly procedure for generating and transmitting a PHR (e.g., in a form of a PHR MAC CE). The PHR may comprise a first value of a first type PH, a second type PH, and/or a third type PH of at least one cell. The PHR may comprise a second value, corresponding to $P_{CMAX, c}$, for example, based on a configured serving cell index (e.g., ServCellIndex) and/or configured PUCCH(s) for the wireless device. A wireless device may, for example, based on transmitting a PHR, start or restart a PHR periodic timer (e.g., periodicPHR-Timer) and/or a PHR prohibit timer (e.g., prohibitPHR-Timer). A wireless device may, for example, based on transmitting a PHR, cancel one or more triggered PHRs.

If a base station (e.g., a gNB) configures a wireless device with a single entry PHR format (e.g., by transmitting a PHR configuration parameter indicating the single entry PHR format, and/or by not transmitting a PHR configuration parameter indicating a multiple entry PHR format (e.g., if multiplePHR is absent)), the wireless device may, for example, determine a first value, of a first type PH or of a third type PH, for a corresponding uplink carrier of a cell (e.g., of a PCell). The wireless device may, for example, determine a second value corresponding to $P_{CMAX, c}$. The wireless device may, for example, based on determining the first value and the second value, transmit a PHR to a base station (e.g., a gNB). The PHR may comprise one or more fields indicating the first value and the second value. A wireless device may trigger a multiplexing and assembly procedure for generating and transmitting a PHR MAC CE comprising a value of a first type PH or of a third type PH. A wireless device may, for example, based on transmitting a PHR, start or restart a PHR periodic timer (e.g., periodicPHR-Timer) and/or a PHR prohibit timer (e.g., prohibitPHR-Timer). A wireless device may, for example, based on transmitting a PHR, cancel one or more triggered PHRs.

If it is determined, in a PHR procedure, that at least one PHR has been triggered and not cancelled, and if allocated UL resources accommodate at least one PHR (e.g., a MAC CE for the PHR that the MAC entity is configured to transmit, plus its subheader, based on logical channel prioritization), a wireless device may transmit at least one PHR to a base station (e.g., a gNB). A PHR procedure and a PHR format may depend, for example, on whether a base station (e.g., a gNB) configures a wireless device with a single entry PHR format or a multiple entry PHR format, and/or on whether one of one or more activated cells (e.g., a PCell, a PSCell, and/or an SCell) associated with the PHR procedure has an SUL carrier.

If, for one or more activated cells with configured uplink(s) associated with a wireless device, a base station (e.g., a gNB) configures a wireless device with a multiple entry PHR format for non-SUL and SUL carriers (e.g., by transmitting an RRC configuration parameter indicating the multiple entry PHR format (e.g., SULmultiplePHR)), the wireless device may determine a first value and a second value. The first value may be of a first type PH for a non-SUL carrier (e.g., the wireless device may determine the first value of the first type PH for a non-SUL carrier if an SUL carrier is not configured). The second value may be of a third type PH for an SUL carrier of at least one cell of the one or more activated cells. A wireless device may determine a third value corresponding to $P_{CMAX,c}$, if, for example, the wireless device has UL resources allocated for a transmission on the at least one cell, or if one or more other cells of the one or more activated cells have UL resources allocated for transmission on the at least one cell and one or more PHR configuration parameters transmitted for indicating a PHR mode of other cell group indicates a first real value (e.g., if phr-ModeOtherCG is set to a real by an RRC) of a first type PH and/or a second real value of a third type PH (e.g., if SRS transmission exists and/or is scheduled). The wireless device may transmit the first value (and/or the second value) and the third value via one or more corresponding fields in a PHR. If a PHR configuration parameter transmitted to a wireless device from base station (e.g., a gNB) indicates a second type PH for a PCell (e.g., an RRC parameter phr-Type2PCell is configured), the wireless device may determine a first value of the second type PH of the PCell and determine a second value corresponding to $P_{CMAX, c}$. The wireless device may transmit the first value and the second value via one or more corresponding fields in a PHR. If a PHR configuration parameter transmitted to a wireless device from a base station (e.g., a gNB) indicates a second type PH (e.g., if an RRC parameter phr-Type2OtherCell is configured) and a PUCCH SCell is configured, the wireless device may determine a first value of the second type PH of the PUCCH SCell and determine a second value corresponding to $P_{CMAX, c}$. The wireless device may and transmit the first value and the second value via one or more corresponding fields in a PHR. If a PHR configuration parameter transmitted to a wireless device from a base station (e.g., a gNB) indicates a second type PH, (e.g., if an RRC parameter phr-Type2OtherCell is configured) and a PUCCH SCell is not configured (e.g., if another cell group is configured), the wireless device may determine a first value of the second type PH of the SpCell and determine a second value corresponding to $P_{CMAX, c}$. The wireless device may transmit the first value and the second value via one or more corresponding fields in a PHR. A wireless device may trigger a multiplexing and assembly procedure for generating and transmitting, based on a configured serving cell index (e.g., ServCellIndex) and/or PUCCH(s) for the wireless device, a PHR (e.g., in a form of PHR MAC CE) comprising a first value of a first type PH, of a second type of PH, and/or of a third type PH of at least one cell and a second value corresponding to $P_{CMAX, c}$. A wireless device may, for example, based on transmitting a PHR, start or restart a PHR periodic timer (e.g., periodicPHR-Timer) and/or a PHR prohibit timer (e.g., prohibitPHR-Timer). A wireless device may, for example, based on transmitting a PHR, cancel one or more triggered PHRs.

If a base station (e.g., a gNB) configures a wireless device with a single entry PHR format for non-SUL and SUL carriers (e.g., by transmitting a PHR configuration parameter indicating the single entry PHR format for non-SUL and SUL carriers, and/or by not transmitting a PHR configuration parameter indicating a multiple entry PHR format (e.g., if multiplePHR or SUL1multiplePHR is absent)), the wireless device may determine a first value and a second value. The first value may be of a first type PH for a non-SUL carrier (e.g., if an SUL carrier is not configured, the wireless device may determine a first value of a first type PH for a non-SUL carrier). The second value may be of a third type PH for an SUL carrier of at least one cell of one or more activated cells. A wireless device may determine a third value of $P_{CMAX,f,c}$ corresponding to the first type PH for an uplink carrier (e.g. an SUL or a non-SUL carrier). A wireless device may determine a fourth value of $P_{CMAX,f,c}$ corresponding to the third type PH for an uplink carrier (e.g. an SUL or a non-SUL carrier) if, for example, there is a UL resource allocated for a transmission of an SRS. The wireless device may, for example, based on determining the first value and the second value, transmit a PHR comprising the first value and the second value to a base station (e.g., a gNB). The wireless device may, for example, trigger a multiplexing and assembly procedure for generating and transmitting a PHR MAC CE comprising a value of a first type PH or a third type PH. A wireless device may, for example, based on transmitting a PHR, start or restart a PHR periodic timer (e.g., periodicPHR-Timer) and/or a PHR prohibit timer (e.g., prohibitPHR-Timer). A wireless device may, for example, based on transmitting a PHR, cancel one or more triggered PHRs.

Figure 20A:
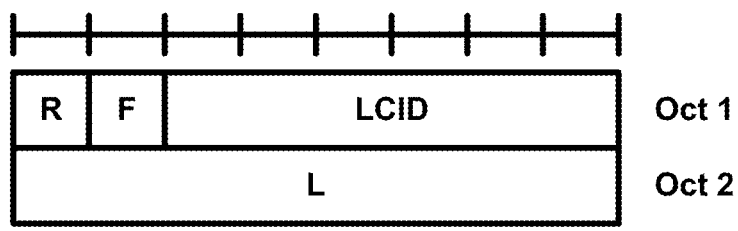
FIG. 20A, FIG. 20B and FIG. 20C show examples of a MAC subheader.
Figure 20B:
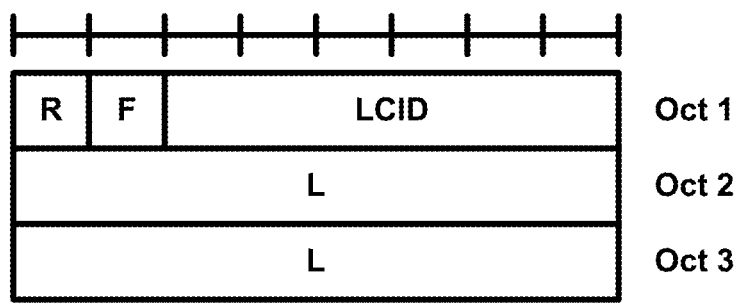
Figure 20C:
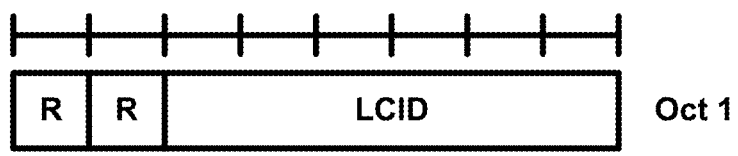
Figure 21A:
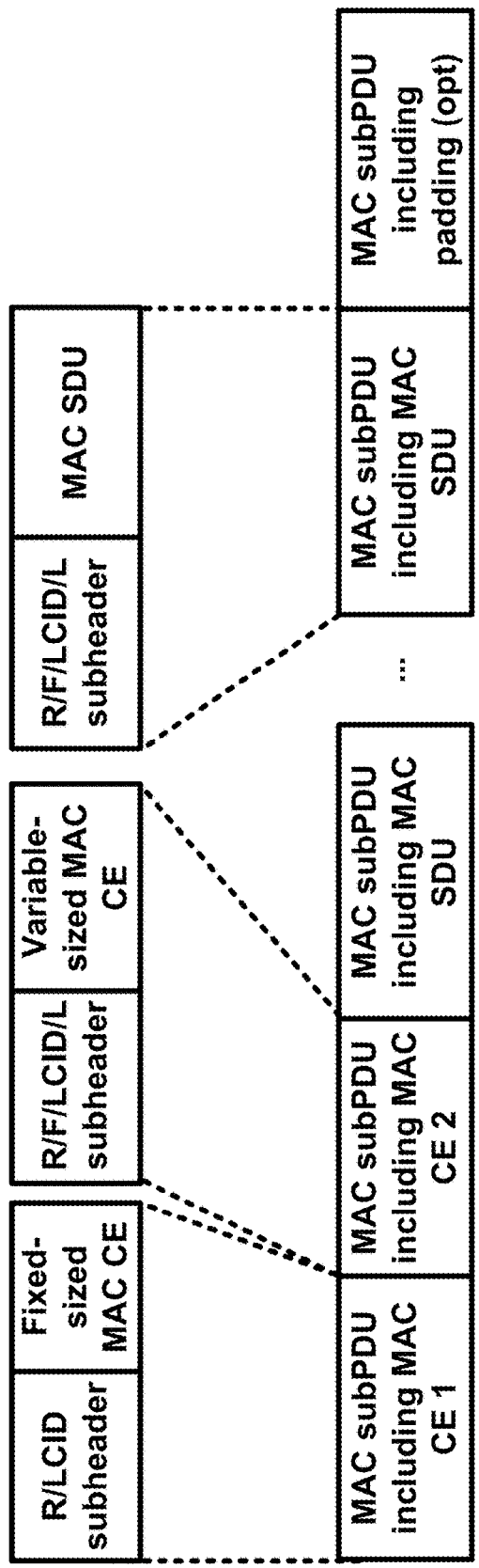
FIG. 21A and FIG. 21B show examples of uplink (UL) and downlink (DL) MAC protocol data units (PDUs).
Figure 21B:
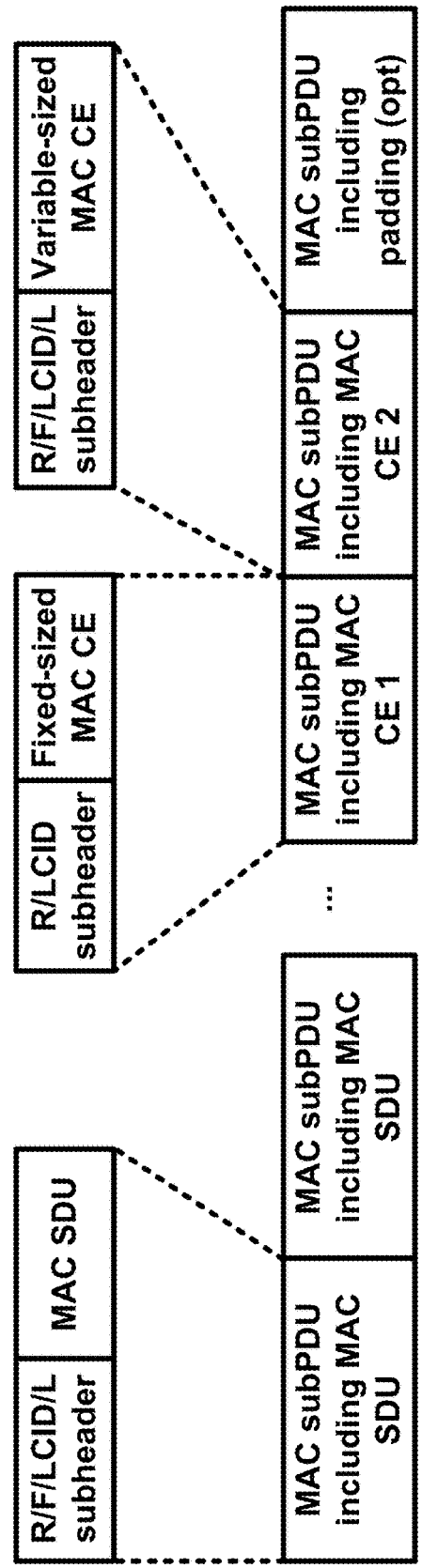

A MAC CE may be transmitted as a part of a MAC PDU. A MAC PDU may, for example, be a bit string that may be byte aligned based on any length (e.g., 8 bits). The MAC PDU may comprise at least one of: at least one MAC subheader, at least one MAC SDU, or at least one MAC CE. FIG. 20A, FIG. 20B, and FIG. 20C show examples of MAC subheaders. FIG. 20A, FIG. 20B, and FIG. 20C may be respective examples of a first type of R/F/LCID/L MAC subheader with 8-bit L field, a second type of R/F/LCID/L MAC subheader with 16-bit L field, and an R/LCID MAC subheader. FIG. 21A and FIG. 21B show examples of MAC PDU for a DL MAC PDU (e.g., FIG. 21A) and for an UL MAC PDU (e.g., FIG. 21B). A bit order of one or more parameter fields within a MAC PDU may be represented with the first and most significant bit in the leftmost bit and the last and least significant bit in the rightmost bit.

A MAC SDU may be a bit string that may be byte aligned based on any length (e.g., 8 bits). A MAC PDU may comprise a MAC SDU from the first bit onward. A MAC CE may be a bit string that may be byte aligned based on any length (e.g., 8 bits). A MAC subheader may be a bit string that may be byte aligned based on any length (e.g., 8 bits). A MAC subheader may be placed in front of a corresponding MAC SDU, a corresponding MAC CE, or corresponding padding. A wireless device may ignore a value of the reserved bits in downlink MAC PDUs.

A MAC PDU may comprise one or more MAC subPDUs. At least one of the one or more MAC subPDUs may comprise at least one of the following: a MAC subheader only (including padding), a MAC subheader and a MAC SDU, a MAC subheader and a MAC CE, or a MAC subheader and padding.

MAC SDUs may be of variable sizes. A MAC subheader may correspond to either a MAC SDU, a MAC CE, or padding. A MAC subheader may comprise at least four header fields R/F/LCID/L. A MAC subheader for a fixed sized MAC CE and padding may comprise at least two header fields R/LCID.

One or more MAC CEs may be placed together. One or more DL MAC subPDU(s) comprising one or more MAC CE(s) may be placed before a MAC subPDU comprising a MAC SDU, and before a MAC subPDU comprising padding, as shown in FIG. 21A.

One or more UL MAC subPDU(s) comprising one or more MAC CE(s) may be placed after one or more MAC subPDU(s) comprising a MAC SDU (e.g., after all the MAC subPDU(s) in the MAC PDU comprising a MAC SDU), and before a MAC subPDU in the MAC PDU comprising padding, as shown in FIG. 21B. The size of padding may be zero.

A PHR MAC CE may comprise one or more fields. The one or more fields may comprise at least one of an R field, and E field, a P field, a V field, a PH field, and/or a $P_{CMAX,c}$ field. An R field may indicate a reserved bit that may be set to 0.

An E field may indicate an extension bit. For a first type PH, an extension bit may be the same as a reserved bit. For a third type PH, an extension bit may indicate if the third type PH value is based on a real transmission or a reference format. For example, E=0 may indicate real transmission on an SRS and E=1 may indicate that an SRS reference format is used.

A PH field may indicate a PH level. The PH level may be represented with 6 bits. FIG. 22A shows examples of reported PH values (e.g., values of a PH field) and corresponding PH levels. As shown in FIG. 22A, a measured value corresponding to each of the corresponding PH levels shown as a PH field value may be predefined. A $P_{CMAX,c}$ field may indicate a value of $P_{CMAX,c}$ used for a calculation of a preceding PH field. FIG. 22B shows example of reported $P_{CMAX,c}$ field values and corresponding nominal UE transmit power levels. As shown in FIG. 22B, $P_{CMAX,c}$ field values corresponding to nominal UE transmit power levels may be predefined.

Figure 23A:
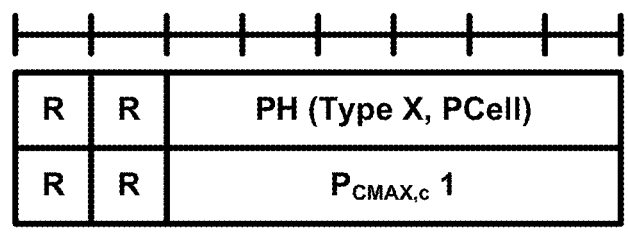
FIG. 23A and FIG. 23B show examples of a single entry PHR MAC control element (CE) and of a supplementary uplink (SUL) single entry PHR MAC CE.

FIG. 23A shows an example of a single entry PHR MAC CE. A single entry PHR MAC CE may be identified by a MAC PDU subheader with an LCID. FIG. 24 shows examples of one or more LCIDs assigned for UL-SCH. As shown in FIG. 24, for example, LCID=111001 may indicate a single entry PHR MAC CE. As shown FIG. 23A, a single entry PHR MAC CE may comprise two octets comprising one or more fields (e.g., R, PH, and/or $P_{CMAX,c}$). For a format of a PHR MAC CE for an SUL carrier, PHs for two UL (non-SUL and SUL) carriers for a same (serving) cell may be stacked based on an UL carrier index.

Figure 23B:
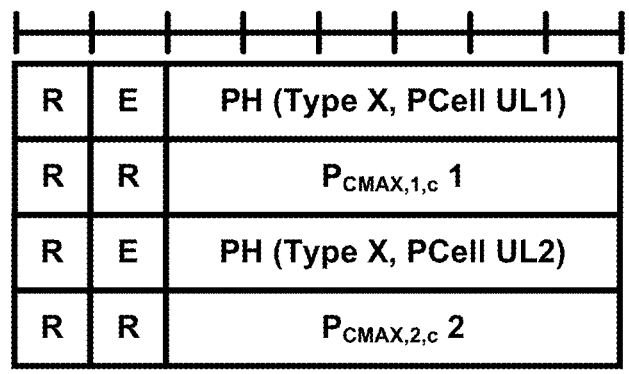

FIG. 23B shows an example of an SUL single entry PHR MAC CE. An SUL single entry PHR MAC CE may be identified by a MAC PDU subheader with an LCID. For example, and as shown in FIG. 24, LCID=110110 may indicate a SUL single entry PHR MAC CE. As shown FIG. 23B, an SUL single entry PHR MAC CE may comprise two octets comprising one or more fields (e.g., R, E, PH, and/or $P_{CMAX,c}$). As shown FIG. 23B, a PH (e.g., PH(Type X, PCell UL1)) for a first carrier (a non-SUL carrier or an SUL carrier) may be placed first in an SUL single entry PHR MAC CE, and may be followed a PH (e.g., PH(Type X, PCell UL2)) for a second carrier (an SUL carrier or a non-SUL carrier). For example, Type X, X=1, 2, or 3, in FIG. 23A and FIG. 23B may be Type 1 PH, Type 2 PH, and/or Type 3 PH. The wireless device may determine a type (e.g., X) of PH based on a type of scheduled transmission. The wireless device may determine Type 1 PH, for example, if PUSCH transmission is scheduled. The wireless device may determine Type 2 PH, for example, if PUSCH and PUCCH transmissions are scheduled in a same slot. The wireless device may determine Type 3 PH, for example, if SRS transmissions are scheduled.

Figure 25:
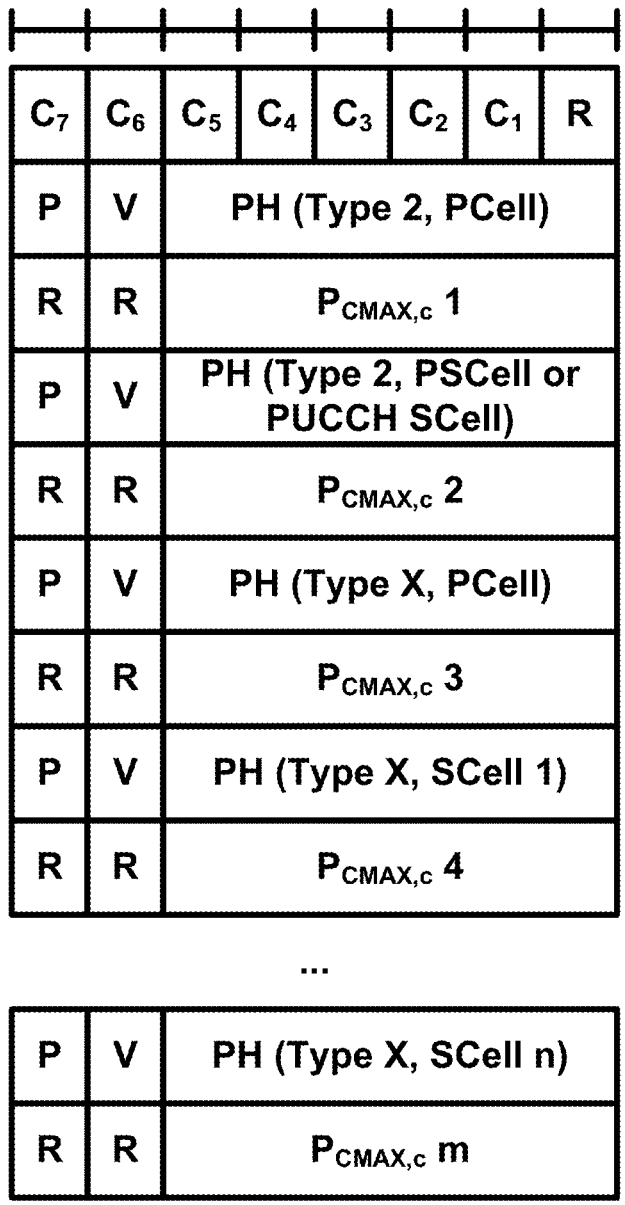
FIG. 25 shows an example of a multiple entry PHR MAC CE.

FIG. 25 and FIG. 26 show examples of multiple entry PHR MAC CEs. FIG. 25 shows an example multiple entry PHR MAC CE for 8 cells. FIG. 26 shows an example multiple entry PHR MAC CE for 32 cells. A multiple entry PHR MAC CE may be identified by a MAC PDU subheader with an LCID. For example, and as shown in FIG. 24, LCID=111000 may indicate a multiple entry PHR MAC CE. A multiple entry PHR MAC CE may comprise a bitmap, a second type PH field (e.g., PH (Type 2, PCell) or PH (Type 2, PSCell or PUCCH SCell) in FIG. 25 and FIG. 26) and/or an octet comprising an associated $P_{CMAX,c}$ field (if reported) for a PCell, a second type PH field and an octet comprising an associated $P_{CMAX,c}$ field (if reported) for either a PSCell or PUCCH SCell, and a first type PH field (e.g., Type 1 PH in FIG. 25, and FIG. 26) and an octet comprising an associated $P_{CMAX,c}$ field (if reported) for a PCell. A multiple entry PHR MAC CE may further comprise, e.g., in ascending order based on a serving cell index (e.g., ServCellIndex), one or more first type PH fields and/or third type PH fields (e.g., Type X in FIG. 25 and FIG. 26) and octets comprising an associated $P_{CMAX,c}$ fields (if reported) for SCells indicated in the bitmap. A presence of a second type PH field for a PCell may be configured by an RRC parameter (e.g., phr-Type2PCell). A presence of a second type PH field for either a PSCell or for a PUCCH SCell may be configured by an RRC parameter (e.g., phr-Type2OtherCell). A single octet bitmap may be used for indicating a presence of PH per SCell if the highest SCell index (e.g., SCellIndex) of an SCell with configured uplink may be less than 8. If the highest SCell index (e.g., SCellIndex) of an SCell with configured uplink is not less than 8, four octets may be used. A wireless device may determine whether a PH value for an activated cell is based on real transmission or on a reference format based on downlink control information that may have been received within a time period. The time period may comprise a time period up to and including a PDCCH occasion in which a first UL grant is received after a PHR has been triggered.

A multiple entry PHR MAC CE may comprise one or more fields. As shown in FIG. 25 and FIG. 26, a $C_i$ field may indicate a presence of a PH field for an SCell with an SCell index (e.g., SCellIndex) i. A $C_i$ field set to 1 may indicate that a PH field for the SCell with the SCell index (e.g., SCellIndex) i is reported, and a $C_i$ field set to 0 may indicate that a PH field for the SCell index (e.g., SCellIndex) i is not reported. As also shown in in FIG. 25 and FIG. 26, a field V may indicate if a PH value is based on a real transmission or on a reference format. For a first type PH, V=0 may indicate real transmission on a PUSCH, and V=1 may indicate that a PUSCH reference format is used. For a second type PH, V=0 may indicate real transmission on a PUCCH, and V=1 may indicate that a PUCCH reference format is used. For a third type PH, V=0 may indicate real transmission on an SRS and V=1 may indicate that an SRS reference format is used. For a first type PH, a second type PH, and a third type PH, V=0 may indicate a presence of an octet comprising an associated $P_{CMAX,c}$ field, and V=1 may indicate that an octet comprising an associated $P_{CMAX,c}$ field is absent. A field PH may indicate a power headroom level, and a length of the field may be 6 bits. A reported PH field value may, as shown in FIG. 22A, correspond to a predefined level in dB. As further shown in FIG. 25 and FIG. 26, a field P may indicate whether a wireless device may apply power backoff due to power management. A wireless device may set P=1 if a corresponding $P_{CMAX,c}$ field may have had a different value if no power backoff due to power management had been applied. As also shown in FIG. 25 and FIG. 26, a field $P_{CMAX,c}$ may, if present, indicate $P_{CMAX,c}$ or $\tilde{P}_{CMAX,c}$ (as described in this specification) used for calculation of a preceding PH field. A reported $P_{CMAX,c}$ field value may, as shown in FIG. 22B, correspond to a predefined nominal UE transmit power level (e.g., in dB).

FIG. 27 and FIG. 28 show examples of one or more SUL multiple entry PHR MAC CEs. FIG. 27 shows an example SUL multiple entry PHR MAC CE for 8 cells. FIG. 28 shows an example SUL multiple entry PHR MAC CE for 32 cells. An SUL multiple entry PHR MAC CE may be identified by a MAC PDU subheader with an LCID. For example, and as shown in FIG. 24, LCID=110101 may indicate an SUL multiple entry PHR MAC CE. An SUL multiple entry PHR MAC CE may comprise a bitmap, a second type PH field and an octet comprising an associated $P_{CMAX,c}$ field (if reported) for a PCell, a second type PH field and an octet comprising an associated $P_{CMAX,c}$ field (if reported) for either PSCell or PUCCH SCell, and a first type PH or a third type PH field and an octet comprising an associated $P_{CMAX,c}$ or $P_{CMAX,f,c}$ field (if reported) for a PCell. An SUL multiple entry PHR MAC CE may further comprise, e.g., in ascending order based on a serving cell index (e.g., ServCellIndex), one or more first type PH and/or third type PH fields (e.g., Type X in FIG. 27 and FIG. 28) and octets comprising an associated $P_{CMAX,c}$ or $P_{CMAX,f,c}$ fields (if reported) for SCells indicated in a bitmap. For a cell configured with an SUL carrier, a PH for a first uplink (e.g., non-SUL or SUL) carrier may be placed first and may be followed by a PH for a second uplink (e.g., SUL or non-SUL) carrier. A presence of a second type PH field for a PCell may be configured by an RRC parameter (e.g., phr-Type2PCell). A presence second type PH field for either a PSCell or for a PUCCH SCell may be configured by an RRC parameter (e.g., phr-Type2OtherCell). A single octet bitmap may be used for indicating a presence of PH per SCell if a highest SCell index (e.g., SCellIndex) of SCell with configured uplink is less than 8, as shown in FIG. 27. Four octets may be used, as shown in FIG. 28, if a highest SCell index (e.g., SCellIndex) of SCell with configured uplink is not less than 8. A wireless device may determine whether a PH value for an activated cell is based on real transmission or a reference format based on downlink control information that may have been received within a time period. The time period may comprise a time period up to and including a PDCCH occasion in which a first UL grant is received after a PHR has been triggered.

An SUL multiple entry PHR MAC CE may comprise one or more fields. As shown in FIG. 27 and FIG. 28, a field, $C_i$, may indicate a presence of a PH field for an SCell with an SCell index (e.g., SCellIndex) i. A field $C_i$ set to 1 may indicate that a PH field for an SCell with an SCell index (e.g., SCellIndex) i is reported. A field $C_i$ set to 0 may indicate that a PH field for an SCell with an SCell index (e.g., SCellIndex) i is not reported. A field R may indicate a reserved bit and may set to 0. A field V may indicate if a PH value is based on a real transmission or a reference format. For a first type PH, V=0 may indicate real transmission on a PUSCH and V=1 may indicate that a PUSCH reference format is used. For a second type PH, V=0 may indicate real transmission on a PUCCH and V=1 may indicate that a PUCCH reference format is used. For a third type PH, V=0 may indicate real transmission on an SRS and V=1 may indicate that an SRS reference format is used. For a first type PH, a second type PH, and a third type PH, V=0 may indicate a presence of a octet comprising an associated $P_{CMAX,c}$ field, and V=1 may indicate that an octet comprising an associated $P_{CMAX,c}$ field is omitted. A field PH may indicate a power headroom level, and a length of the field may be 6 bits. A reported PH field value may, as shown in FIG. 22A, correspond to a predefined level in dB. A field P may indicate whether a wireless device applies power backoff due to power management. A wireless device may set P=1 if a corresponding $P_{CMAX,c}$ field may have had a different value if no power backoff due to power management had been applied. A field $P_{CMAX,c}$ or $P_{CMAX,f,c}$ may, if present, indicate the $P_{CMAX,c}$ or $\tilde{P}_{CMAX,f,c}$ used for calculation of a preceding PH field. A reported $P_{CMAX,c}$ field value may, as shown in FIG. 22B, correspond to a predefined nominal UE transmit power level in dB.

There may be one or more PH types. A wireless device may calculate a first type PH, a second type PH, and/or a third type PH depending, for example, on one or more PHR configuration parameters and/or on whether there is a scheduled PUSCH, PUCCH, and/or SRS transmission. A first type PH may indicate a PH assuming a PUSCH transmission on a carrier. A second type PH may indicate a PH determined based on assuming a parallel transmission of a PUSCH and a PUCCH. A third type PH may indicate a PH determined based on assuming an SRS transmission without a PUSCH and/or a PUCCH.

A PH need not be a measure of a difference between an allowed maximum (e.g., per carrier) transmit power (e.g., $P_{CMAC,c}$ or $P_{CMAC,f,c}$) and an actual (or virtual) carrier transmit power. A PH may, for example, be a measure of a difference between an allowed maximum (e.g., per carrier) transmit power (e.g., $P_{CMAC,c}$ or $P_{CMAC,f,c}$) and a transmit power that may have been used assuming no upper limit on the transmit power. A PH value may be negative. A negative PH may indicate a (e.g., per carrier) transmit power that may be limited by an allowed maximum (e.g., per carrier) transmit power (e.g., $P_{CMAC,c}$ or $P_{CMAC,f,c}$), for example, at a time of PH is determination and/or reporting.

If a wireless device transmits a PUSCH in a PUSCH transmission period i on a carrier f of a serving cell c, the wireless device may determine a power headroom for a first type PH as $$PH_{type1,f,c}(i,j,q_d,l) = P_{CMAX,f,c}(i) - \{P_{O\_PUSCH,f,c}(j) + 10 \log_{10}(2^\mu \cdot M_{RB,f,c}^{PUSCH}(i)) + \alpha_{f,c}(j) \cdot PL_{f,c} + \Delta_{TF,f,c}(i) + f_{f,c}(i,l)\} \text{ [dB]}$$

where $P_{CMAX,f,c}(i)$, $P_{O\_PUSCH,f,c}(i)$, $M_{RB,f,c}^{PUSCH}(i)$, $\alpha_{f,c}(j)$, $PL_{f,c}(q_d)$, $\Delta_{TF,f,c}(i)$ and $f_{f,c}(i,l)$ are described elsewhere in this specification. The value for j is determined based on a type of UL grant and/or transmission (e.g., PRACH, PUSCH with or without UL grant) and is also described elsewhere in this specification. A first type PH determined based on a PUSCH transmission may be referred to as a first type real PH.

For a PH to be reported for a transmission period i in which a PUSCH is not scheduled, resource size may set to a minimum possible resource assignment (e.g., $2^\mu \cdot M_{RB,f,c}^{PUSCH} = 1$) and/or an offset associated with an MCS (e.g., $\Delta_{TF,f,c}(i)$) may be set to zero. If a wireless device does not transmit a PUSCH in a PUSCH transmission period i on a carrier f of a serving cell c, the wireless device may determine a power headroom for a first type PH as $$PH_{type1,f,c}(i,j,q_d,l) = \tilde{P}_{CMAX,f,c}(i) - \{P_{O\_PUSCH,f,c}(j) + \alpha_{f,c}(j) + \alpha_{f,c}(j) \cdot PL_{f,c}(q_d) + f_{f,c}(i,l)\} \text{ [dB]}$$

where $\tilde{P}_{CMAX,f,c}(i)$ may be determined assuming a PUSCH transmission in a PUSCH transmission period i, and assuming maximum power reduction (MPR)=0 dB, additional MPR (A-MPR)=0 dB, power management MPR (P-MPR)= 0 dB, and $\Delta T_C$ (e.g., an offset to determine a bound of $P_{CMAC,c}$ and/or $P_{CMAC,f,c}$)=0 dB. MPR, A-MPR, P-MPR and $\Delta T_C$ may be predefined. A first type PH determined without a PUSCH transmission may be referred to as a first type virtual PH. If a wireless device transmits a PUSCH with a PUCCH in a transmission period i, a wireless device may determine a first type PH by replacing $P_{CMAX,f,c}(i)$ in a calculation of a first type real PH with $\tilde{P}_{CMAX,f,c}(i)$.

If a wireless device transmits a PUSCH simultaneous with a PUCCH in at least a portion of a PUSCH transmission period i on a carrier f of a serving cell c, the wireless device may determine a power headroom for a second type PH as $$PH_{type2,f,c}(i,j,q_d,l) = P_{CMAC,f,c}(i) - 10\log_{10}\left(10^{\frac{P_{O_{PUSCH},f,c}(j)+10\log_{10}(2^\mu \cdot M_{RB,f,c}^{PUSCH}(i))+\alpha_{f,c}(j)\cdot PL_{f,c}(q_d)+\Delta_{TF,f,c}(i)+f_{f,c}(i,l)}{10}}+10^{\frac{P_{O_{PUCCH},f,c}(j)+PL_{f,c}(q_d)+\Delta_{F_{PUCCH}}(F)+\Delta_{TF,f,c}(i)+g_{f,c}(i,l)}{10}}\right) \text{ [dB]}$$

where the parameters of the above equation are described elsewhere this specification.

If a wireless device transmits a PUSCH without a PUCCH in a transmission period i, the wireless device may determine a power headroom for a second type PH as $$PH_{type2,f,c}(i,j,q_d,l) = P_{CMAC,f,c}(i) - \log_{10}\left(10\left(\frac{P_{O\_PUSCH,f,c}(j)+10\log_{10}(2^\mu \cdot M_{RB,f,c}^{PUSCH}(i))+\alpha_{f,c}(j)\cdot PL_{f,c}(q_d)+\Delta_{TF,f,c}(i)+f_{f,c}(i,l)}{10}+10\right)+(P_{O\_PUCCH,f,c}(j)+PL_{f,c}(q_d)+g_{f,c}(i,l))/10\right) \text{ [dB]}$$

If a wireless device transmits a PUCCH without a PUSCH in a transmission period i for a cell, the wireless device may determine a power headroom for a second type PH as $$PH_{type2,f,c}(i,j,q_d,l) = P_{CMAC,f,c}(i) - 10\log_{10}\left(10(P_{O\_PUSCH,f,c}(j)+\alpha_{f,c}(j)\cdot PL_{f,c}(q_d)+f_{f,c}(i,l))/10 + 10\left(\frac{P_{O\_PUCCH,f,c}(j)+PL_{f,c}(q_d)+\Delta_{F\_PUCCH}(F)+\Delta_{TF,f,c}(i)+g_{f,c}(i,l)}{10}\right)\right) \text{ [dB]}$$

If a wireless device does not transmit a PUCCH or a PUSCH in a transmission period i for a cell, the wireless device may determine a power headroom for a second type PH as $$PH_{type2,f,c}(i,j,q_d,l) = \tilde{P}_{CMAC,f,c}(i) - 10\log_{10}\left(\frac{10(P_{O\_PUSCH,f,c}(j)+\alpha_{f,c}(j)\cdot PL_{f,c}(q_d)+f_{f,c}(i,l))/10 +}{10(P_{O\_PUCCH,f,c}(j)+PL_{f,c}(q_d)+g_{f,c}(i,l))/10}\right) \text{ [dB]}$$

If a wireless device is unable to determine whether there is a PUCCH transmission corresponding to one or more PDSCH transmissions, or if the wireless device is unable to determine which PUCCH resource is used in a transmission period i for a cell, a second type PH may still be determined. If (i) in connection with an (E)PDCCH detection, a first PUCCH format with channel selection and an RRC parameter indicating simultaneous transmission of a PUCCH and a PUSCH (e.g., simultaneousPUCCH-PUSCH) are configured for a wireless device, or if (ii) in connection with the (E)PDCCH detection, the first PUCCH format with channel selection is used for HARQ-ACK feedback for the wireless device configured with a second PUCCH format and an RRC parameter indicating simultaneous transmission of a PUCCH and a PUSCH (e.g., simultaneousPUCCH-PUSCH) are configured, a wireless device may determine a second type PH as $$PH_{type2,f,c}(i,j,q_d,l) = P_{CMAC,f,c}(i) - 10\log_{10}\left(10^{\frac{P_{O\_PUSCH,f,c}(j)+10\log_{10}(2^\mu \cdot M_{RB,f,c}^{PUSCH}(i))+\alpha_{f,c}(j)\cdot PL_{f,c}(q_d)+\Delta_{TF,f,c}(i)+f_{f,c}(i,l)}{10}}+10\right) \text{ [dB]}$$

If a wireless device transmits an SRS in a SRS transmission period i on a carrier f of a serving cell c and the wireless device is not configured for PUSCH transmissions on carrier f of serving cell c, the wireless device may determine a power headroom for a third type PH as $$PH_{type3,f,c}(i,q_s,l) = P_{CMAX,f,c}(i) - \{P_{O\_SRS,f,c}(q_s)+10\log_{10}(2^\mu M_{SRS,f,c}(i))+\alpha_{SRS,f,c}(q_s)\cdot PL_{f,c}(q_s)+h_{f,c}(i,l)\} \text{ [dB]}$$

where $P_{CMAX,f,c}(i)$, $P_{O\_SRS,f,c}(q_s)$, $M_{SRS,f,c}(i)$, $\alpha_{SRS,f,c}(q_s)$, $PL_{f,c}(q_s)$ and $h_{f,c}(i,l)$ are described elsewhere in this specification.

If a wireless device does not transmit an SRS in an SRS transmission period for a carrier f of a serving cell c, and the wireless device is not configured for PUSCH transmissions on carrier f of serving cell c, the wireless device may determine power headroom for a Type 3 report as $$PH_{type3,f,c}(i,q_s,l) = \tilde{P}_{CMAX,f,c}(i) - \{P_{O\_SRS,f,c}(q_{s0})+\alpha_{SRS,f,c}(q_{s0})\cdot PL_{f,c}(q_{s0})+h_{f,c}(i,l)\} \text{ [dB]}$$

where $q_{s0}$ is a SRS resource set provided to the wireless device by higher layers and $P_{O\_SRS,f,c}(q_{s0})$, $\alpha_{SRS,f,c}(q_{s0})$, $PL_{f,c}(q_{s0})$ and $h_{f,c}(i,l)$ are described elsewhere in in this specification. $\tilde{P}_{CMAX,f,c}(i)$ may be computed based on the requirements and/or parameters predefined and/or configured by a base station and by assuming an SRS transmission in an SRS transmission period i, and by assuming MPR=0 dB, A-MPR=0 dB, P-MPR=0 dB and $\Delta T_C$=0 dB. MPR, A-MPR, P-MPR and $\Delta T_C$ may be predefined. A wireless device may use $\tilde{P}_{CMAX,f,c}(i)$ instead of $P_{CMAX,f,c}(i)$ in a third type PH. A third type PH determined without an SRS transmission may be referred to as a first type virtual PH.

A base station (e.g., a gNB) may transmit a DCI to a wireless device to inform the wireless device of DL and/or UL transmission information. The DL and/or UL transmission information may indicate, for example, at least one of following: scheduling of a PUSCH, scheduling of a PDSCH, a slot (mini-slot, and/or subframe) format, and/or TPC commands for PUSCH, PUCCH, and/or SRS transmission. The DCI may comprise at least one of: a carrier indicator, an identifier for DCI formats, one or more downlink scheduling assignments, one or more uplink scheduling grants, one or more power-control commands (TPCs), one or more slot format indicators, and/or one or more pre-emption indications.

DL and/or UL transmission information may comprise one or more parameters (or fields) indicating one or more of: a frequency domain and/or a time domain resource assignment, a frequency hopping flag, a modulation and coding scheme (MCS), a new data indicator (NDI), a redundancy version (RV), a HARQ process number, a TPC command for PUSCH and/or PUCCH, an UL and/or SUL indicator, a bandwidth part (BWP) indicator, a VRB-to-PRB mapping, a downlink assignment index, an n-th downlink assignment index (where n>0), an SRS resource indicator, precoding information and a number of layers, antenna ports, a CSI request, CBG transmission information, a PTRS-DMRS association, a beta-offset indicator, a DMRS sequence initialization, a PUCCH resource indicator, a PDSCH-to-HARQ_feeback timing indicator, a PRB bundling size indicator, a rate matching indicator, a ZP CSI-RS trigger, a transmission configuration indication, an SRS request, CBG flushing out information, one or more identifiers for DCI formats, one or more slot format indicators, one or more pre-emption indications, one or more TPC command numbers, one or more block numbers, a PDSCH resource indication, a transport format, HARQ related information, control information related to multiple antenna schemes, a command for power control of the PUCCH used for transmission of ACK/NACK in response to downlink scheduling assignments, and/or a power control command of the PUSCH.

DCI may have one or more formats or types. Message sizes of the one or more formats may be the same or may be different. A plurality of DCI having the same message format (and/or size) may comprise the same control information or may comprise different control information. A plurality of DCI having different message formats (and/or sizes) may comprise the same control information or may comprise different control information. For example, supporting spatial multiplexing with noncontiguous allocation of RBs in the frequency domain may require a larger size of scheduling message in comparison to an uplink grant allowing for frequency-contiguous allocation. The DCI may be categorized into different DCI formats, wherein a format corresponds to a certain message size and/or usage.

FIG. 29 shows an example of one or more DCI formats. DCI format 0 may be used for an uplink scheduling grant. A DCI format 4 may be used for an uplink scheduling grant with spatial multiplexing. A DCI format 6-0A and/or a DCI format 6-0B may be used for an uplink scheduling grant for one or more eMTC devices. A DCI format 1C may be used for a special purpose compact assignment. A DCI format 1A may be used for contiguous allocation(s) only. A DCI format 1B may be used for a codebook-based beamforming using CRS. A DCI format 1D may be used for MU-MIMO using CRS. A DCI format 1 may be used for flexible allocations. A DCI format 2A may be used for an open-loop spatial multiplexing using CRS. A DCI format 2B may be used for a dual-layer transmission using DM-RS (TM8). A DCI format 2C and/or a DCI format 2D may be used for a multi-layer transmission using DM-RS (TM9). A DCI format 2 may be used for a closed-loop spatial multiplexing using CRS. A DCI format 6-1A and/or a DCI format 6-1B may be used for a downlink scheduling grant for one or more eMTC devices. A DCI format 3 and/or a DCI format 3A may be used for power control command(s). A DCI format 5 may be used for a sidelink operation. A DCI format 6-2 may be used for paging/direct indication for one or more eMTC devices. Any other DCI format for any other use, or combinations of uses, may be implemented.

FIG. 30 is an example of one or more DCI formats. DCI format 0_0 may be used for scheduling of a PUSCH in one cell. For example, the DCI format 0_0 may comprise one or more fields indicating at least one of the following: identifier for DCI formats (e.g., 1 bit); frequency domain resource assignment (e.g., N bits variable with UL BWP N_RB); time domain resource assignment (e.g., X bits the bitwidth may be associated with the row indexes in pusch_allocationList in RRC); frequency hopping flag (e.g., 1 bit); modulation and coding scheme (e.g., 5 bits); new data indicator (e.g., 1 bit); redundancy version (e.g., 2 bits); HARQ process number (e.g., 4 bits); TPC command for scheduled PUSCH (e.g., 2 bits); and/or UL/SUL indicator (e.g., 0 may indicate wireless devices not configured with SUL in the cell, and 1 may indicate wireless devices configured with SUL in the cell; zeros may be appended to format 0_0 until the payload size equals that of format 1_0, for example, if the number of information bits in format 0_0 is less than the payload size of format 1_0 for scheduling the same serving cell.

DCI format 0_1 may be used for the scheduling of a PUSCH in one cell. The DCI format 0_1 may comprise one or more fields indicating at least one of the following: carrier indicator (e.g., 0 or 3 bits); identifier for DCI formats (e.g., 1 bit); bandwidth part indicator (e.g., 0, 1, or 2 bits—the bitwidth for this field may be determined based on the higher layer parameter BandwidthPart-Config for the PUSCH); frequency domain resource assignment (e.g., the bitwidth may be variable with a resource allocation type; time domain resource assignment (e.g., X bits—the bitwidth may be associated with the row indexes in pusch_allocationList in RRC); VRB-to-PRB mapping (e.g., 0 or 1 bit; for example, applicable to resource allocation type 1 (e.g., 0 bit) if only resource allocation type 0 is configured and 1 bit otherwise); frequency hopping flag (e.g., 0 or 1 bit, for example, applicable to resource allocation type 1 (e.g., 0 bit) if only resource allocation type 0 is configured and 1 bit otherwise); modulation and coding scheme (e.g., 5 bits); new data indicator (e.g., 1 bit); redundancy version (e.g., 2 bits); HARQ process number (e.g., 4 bits); 1st downlink assignment index (e.g., 1 bit for semi-static HARQ-ACK codebook, and 2 bits for dynamic HARQ-ACK codebook with single HARQ-ACK codebook); 2nd downlink assignment index (e.g., 2 bits for dynamic HARQ-ACK codebook with two HARQ-ACK sub-codebooks, and 0 bit otherwise); TPC command for a scheduled PUSCH (e.g., 2 bits); SRS resource indicator (e.g., variable bits that may be determined by RRC_Parameter_SRS-SetUse); precoding information and number of layers (e.g., 0, 2, 3, 4, 5, or 6 bits); antenna ports (e.g., 2, 3, 4, or 5 bits); SRS request (e.g., 2 bits); CSI request (e.g., 0, 1, 2, 3, 4, 5, or 6 bits determined by higher layer parameter ReportTriggerSize); CBG transmission information (e.g., 0, 2, 4, 6, or 8 bits determined by higher layer parameter maxCodeBlockGroupsPerTransportBlock for PUSCH); PTRS-DMRS association (e.g., 0 or 2 bits); beta_offset indicator (e.g., 0 bit if the higher layer parameter dynamic in uci-on-PUSCH is not configured; otherwise 2 bits); DMRS sequence initialization (e.g., 0 or 1 bit); and/or UL/SUL indicator (e.g., 0 bit for wireless devices not configured with SUL in the cell, and 1 bit for wireless devices configured with SUL in the cell).

DCI format 1_0 may be used for the scheduling of a PDSCH in one DL cell. The DCI format 1_0 may comprise one or more fields indicating at least one of the following: an identifier for DCI formats (e.g., 1 bit); frequency domain resource assignment (e.g., variable with DL BWP N_RB); time domain resource assignment (e.g., X bits—The bitwidth may be associated with the row indexes in pusch_allocationList in RRC); VRB-to-PRB mapping (e.g., 1 bit); modulation and coding scheme (e.g., 5 bits); new data indicator (e.g., 1 bit); redundancy version (e.g., 2 bits); HARQ process number (e.g., 4 bits); downlink assignment index (e.g., 2 bits); TPC command for a scheduled PUCCH (e.g., 2 bits); PUCCH resource indicator (e.g., 2 or 3 bits); or PDSCH-to-HARQ_feedback timing indicator (e.g., 3 bits). The DCI format 1_0 may comprise one or more different fields, one or more different bitwidths, and/or one or more different values for one or more fields, for example, if the DCI format 1_0 is with CRC scrambled by different types of RNTI.

DCI format 1_1 may be used for the scheduling of a PDSCH in one cell. The DCI format 1_1 may comprise one or more fields indicating at least one of the following: carrier indicator (e.g., 0 or 3 bits); identifier for DCI formats (e.g., 1 bit); bandwidth part indicator (e.g., 0, 1, or 2 bits; the bitwidth for this field may be determined according to the higher layer parameter BandwidthPart-Config for the PDSCH); frequency domain resource assignment (e.g., variable bits with a resource allocation type); time domain resource assignment (e.g., 1, 2, 3, or 4 bits the bitwidth may be associated with the row indexes in pusch_allocationList in RRC); VRB-to-PRB mapping (e.g., applicable to resource allocation type 1 (e.g., 0 bit) if only resource allocation type 0 is configured, and 1 bit otherwise); PRB bundling size indicator (e.g., 0 bit if the higher layer parameter PRB bundling OFF or 1 bit if the higher layer parameter PRB bundling ON); rate matching indicator (0, 1, or 2 bits); and/or ZP CSI-RS trigger (0, 1, or 2 bits). The DCI format 1_1 may comprise one or more other fields (e.g., one or more additional fields). For example, for transport block 1, the DCI format 1_1 may comprise modulation and coding scheme (e.g., 5 bits), new data indicator (e.g., 1 bit), redundancy version (e.g., 2 bits). For transport block 2, the DCI format 1_1 may comprise modulation and coding scheme (e.g., 5 bits), new data indicator (e.g., 1 bit), redundancy version (e.g., 2 bits). The DCI format 1_1 may comprise HARQ process number (e.g., 4 bits); downlink assignment index (e.g., 0, 2, or 4 bits); TPC command for scheduled PUCCH (e.g., 2 bits); PUCCH resource indicator (e.g., 2 or 3 bits); PDSCH-to-HARQ_feedback timing indicator (e.g., 0, 1, 2, or 3 bits); antenna port(s) (e.g., 1, 2, 3, 4, 5, or 6 bits the number of CDM groups without data of values 1, 2, and 3 may refer to CDM groups {0}, {0,1}, and {0, 1,2} respectively); transmission configuration indication (e.g., 0 or 3 bits); SRS request (e.g., 2 or 3 bits); CBG transmission information (e.g., 0, 2, 4, 6, or 8 bits); CBG flushing out information (e.g., 0 or 1 bit); and/or DMRS sequence initialization (e.g., 1 bit).

DCI format 2_0 may be used for notifying the slot format. The DCI format 2_0 may comprise one or more fields indicating at least one of the following: an identifier for DCI formats (e.g., 1 bit); and/or one or more slot format indicator (e.g., slot format indicator 1, slot format indicator 2, . . . , slot format indicator N). The size of DCI format 2_0 may be configurable by higher layers. For example, the bit size of the slot format indicator field may be determined by an RRC message.

DCI format 2_1 may be used for notifying the PRB(s) and OFDM symbol(s) where a wireless device may assume no transmission is intended for the wireless device. The DCI format 2_1 may comprise one or more fields indicating at least one of the following: an identifier for DCI formats (e.g., 1 bit); and/or one or more pre-emption indication (e.g., pre-emption indication 1, pre-emption indication 2, . . . , pre-emption indication N). The size of DCI format 2_1 may be configurable by higher layers, and a pre-emption indication may be 14 bits.

DCI format 2_2 may be used for the transmission of TPC commands for PUCCH and PUSCH. The DCI format 2_2 may comprise one or more fields indicating at least one of the following: an identifier for DCI formats (e.g., 1 bit); and/or one or more TPC command numbers (e.g., TPC command number 1, TPC command number 2, . . . , TPC command number N). The index to the TPC command number for a cell may be determined by one or more parameters provided by higher layers, and a TPC command number may be 2 bits.

DCI format 2_3 may be used for the transmission of a group of TPC commands for SRS transmissions by one or more wireless devices. Along with a TPC command, an SRS request may also be transmitted. The DCI format 2_3 may comprise one or more fields indicating at least one of the following: an identifier for DCI formats (e.g., 1 bit); and/or one or more block numbers (e.g., block number 1, block number 2, . . . , block number B). The starting position of a block may be determined by the parameter startingBitOfFormat2_3 provided by higher layers for the wireless device configured with the block. For a UL without PUCCH and PUSCH or a UL on which the SRS power control is not tied with PUSCH power control, one block may be configured for the wireless device by higher layers, with the following fields defined for the block: an SRS request (e.g., 0 or 2 bits), and/or TPC command number (e.g., 2 bits).

One or more DCI formats for downlink scheduling may be organized into different groups based on the presence or absence of one or more fields. The one or more fields may vary between DCI formats. For example, the one or more fields may indicate at least one of: resource information (e.g., carrier indicator, RB allocation, etc.); HARQ process number; MCS, NDI, and a first RV (e.g., RV for the first TB); MCS, NDI, and a second RV (e.g., RV for the second TB); MIMO related information (e.g., at least one of: PMI, precoding information, transport block swap flag, power offset between PDSCH and reference signal, reference-signal scrambling sequence, number of layers, and/or antenna ports for the transmission); PDSCH resource-element mapping and QCI; downlink assignment index (DAI); TPC for PUCCH; SRS request for triggering SRS transmission; ACK/NACK offset; DCI format indication used to distinguish one or more DCI formats from each other (e.g., between DCI 0 and DCI 1A); any combination thereof; and/or padding.

One or more DCI formats for uplink scheduling may be organized into different groups with the presence or absence of one or more fields. The one or more fields may vary between DCI formats. For example, the one or more fields may indicate at least one of: resource information (e.g., carrier indicator, resource allocation type, RB allocation, etc.); MCS and a first NDI (e.g., NDI for the first TB); MCS and a second NDI (e.g., NDI for the second TB); phase rotation of the uplink DM-RS; precoding information; CSI request for requesting an aperiodic CSI report; SRS request used to trigger aperiodic SRS transmission based on one or more settings semi-statically configured, predefined, and/or preconfigured; uplink index/DAI; TPC for PUSCH; DCI format indication used to distinguish one or more DCI formats from each other (e.g., between DCI 0 and DCI 1A); any combination thereof; and/or padding.

A wireless device may monitor for one or more PDCCHs to detect one or more DCIs. The one or more PDCCHs may be associated with a common search space (CSS) and/or a device-specific search space (e.g., UE-specific search space (USS)). A wireless device may monitor for one or more PDCCHs comprising one or more DCI formats. A power consumption at a wireless device may increase as the number of DCI formats used for PDCCH monitoring increases. Monitoring for a PDCCH associated with a limited number of DCI formats may save power consumption. For example, a first DCI format may be used for an eMTC wireless device. If a type of a wireless device is not eMTC, the wireless device may not monitor for a PDCCH at least with the first DCI, for example, to save power consumption.

A base station may transmit one or more PDCCHs in different control resource sets, for example, to support wide bandwidth operation (e.g., in an NR system). A base station may transmit one or more RRC messages comprising configuration parameters of one or more control resource sets. The one or more control resource sets may comprise at least one of: a first OFDM symbol (e.g., CORESET_StartSymbol); a number of consecutive OFDM symbols (e.g., CORESET_NumSymbol); a set of resource blocks (e.g., CORESET_RBSet); a CCE-to-REG mapping (e.g., CORESET_mapping); and/or a REG bundle size for interleaved CCE-to-REG mapping (e.g., CORESET_REG_bundle). A wireless device may monitor for a PDCCH for to detect at least one DCI, for example, based on configured control resource sets.

A wireless device may monitor for at least one set of one or more PDCCH candidates in one or more control resource sets, on at least one active DL BWP on one or more activated serving cells according to corresponding search spaces. The monitoring may imply and/or comprise decoding of at least one of the one or more PDCCH candidates according to the monitored DCI formats.

A wireless device may be configured by higher layer parameter SSB-periodicity-serving-cell a periodicity of half frames for transmission of SS/PBCH blocks in a serving cell. A wireless device may receive a PDCCH by excluding REs corresponding to SS/PBCH block indexes indicated by SSB-transmitted-SIB1, for example, if the wireless device has received SSB-transmitted-SIB1 and has not received SSB-transmitted and if REs for the PDCCH reception overlap with REs corresponding to SS/PBCH block indexes indicated by SSB-transmitted-SIB1. A wireless device may receive a PDCCH by excluding REs corresponding to SS/PBCH block indexes indicated by SSB-transmitted, for example, if the wireless device has received SSB-transmitted and if REs for the PDCCH reception overlap with REs corresponding to SS/PBCH block indexes indicated by SSB-transmitted.

A wireless device may transmit, in a device capability parameter (e.g., UE-NR-Capability), an indication for a number of PDCCH candidates that the wireless device may monitor per slot (mini-slot, and/or subframe), for example, if the wireless device is configured for carrier aggregation operation over more than one or more cells. The wireless device may transmit the indication, for example, based on a carrier aggregation capability for a wireless device being larger than a threshold. The device capability parameter may comprise one or more parameters indicating the carrier aggregation capability. A wireless device may not be configured with a number of PDCCH candidates to monitor per slot (mini-slot, and/or subframe) that is larger than a second threshold (e.g., the second threshold may indicate a maximum number), for example, if the wireless device is configured for carrier aggregation operation over more than one cell.

One or more power control mechanisms may be used for transmitting one or more wireless signals. Some example parameters may be used for the one or more power control mechanisms. One or more example power control processes may be implemented in technologies such as LTE, LTE Advanced, New Radio (e.g., 5G), and/or any other technologies. A radio technology may have its own specific parameters. Various power control mechanisms may be similarly or differently implemented in different radio systems. For example, a radio system may enhance physical layer power control mechanisms, for example, if some layer 2 parameters are taken into account.

For a downlink power control, a base station (or other devices) may determine the Energy Per Resource Element (EPRE). The term resource element energy may denote the energy prior to CP insertion. The term resource element energy may denote the average energy taken over all constellation points for the modulation scheme used. For an uplink power control, a wireless device and/or a base station (or other devices) may determine the average power over an SC-FDMA symbol in which the physical channel may be transmitted.

A wireless device may follow the procedures for PUSCH and SRS, for example, if the wireless device is configured with an LAA SCell for uplink transmissions. It may be assumed that a frame structure type 1 for the LAA SCell is used unless stated otherwise.

For a PUSCH, the transmit power $\hat{P}_{PUSCH,c}(i)$ may be first scaled by the ratio of the number of antennas ports with a non-zero PUSCH transmission to the number of configured antenna ports for the transmission scheme. The resulting scaled power may be split equally across the antenna ports on which the non-zero PUSCH is transmitted. For a PUCCH or SRS, the transmit power $\hat{P}_{PUCCH}(i)$, or $\hat{P}_{SRS,c}(i)$ may be split equally across the configured antenna ports for the PUCCH or SRS. $\hat{P}_{PUSCH,c}(i)$ $\hat{P}_{PUCCH}(i)$, and $\hat{P}_{SRS,c}(i)$ may be the linear values of $P_{PUSCH,c}(i)$ $P_{PUCCH}(i)$, and $P_{SRS,c}(i)$ respectively, $P_{PUSCH,f,c}(i)$ $P_{PUCCH,f,c}(i)$, and $P_{SRS,f,c}(i)$ may be the transmit power of a PUSCH, PUCCH, SRS on carrier f of a cell c, respectively. $\hat{P}_{PUSCH,f,c}(i)$ $\hat{P}_{PUCCH,f,c}(i)$, and $\hat{P}_{SRS,f,c}(i)$ may be the linear values of $P_{PUSCH,f,c}(i)$ $P_{PUCCH,f,c}(i)$, and $P_{SRS,f,c}(i)$, respectively. $P_{PUSCH,c}(i)$ $P_{PUCCH}(i)$, and $P_{SRS,c}(i)$ may be interchangeable with $P_{PUSCH,f,c}(i)$ $P_{PUCCH,f,c}(i)$, and $P_{SRS,f,c}(i)$, respectively, for example, if the cell c has a single carrier and/or if no confusion exists on a carrier index. $\hat{P}_{PUSCH,c}(i)$ $\hat{P}_{PUCCH,c}(i)$, and $\hat{P}_{SRS,c}(i)$ may be interchangeable with $\hat{P}_{PUSCH,f,c}(i)$ $\hat{P}_{PUCCH,f,c}(i)$, and $\hat{P}_{SRS,f,c}(i)$, respectively, for example, if the cell c has a single carrier and/or if no confusion exists on a carrier index. A cell wide overload indicator (OI) and a High Interference Indicator (HIT) to control UL interference may be parameters in a specification (e.g., in LTE and/or NR technologies specifications).

A wireless device may follow the procedures for both MCG and SCG, for example, if the wireless device is configured with an SCG. If the procedures are used for an MCG, the terms "secondary cell," "secondary cells," "serving cell," and "serving cells," may refer to secondary cell, secondary cells, serving cell, serving cells belonging to the MCG, respectively. The term 'primary cell' may refer to the PCell of the MCG. If the procedures are used for an SCG, the terms "secondary cell," "secondary cells," "serving cell," and "serving cells" may refer to secondary cell, secondary cells (not including PSCell), serving cell, serving cells belonging to the SCG, respectively. The term "primary cell" may refer to the PSCell of the SCG.

A wireless device may follow the procedures for a primary PUCCH group, a secondary PUCCH group, or both the primary PUCCH group and the secondary PUCCH group, for example, if the wireless device is configured with a PUCCH-SCell. If the procedures are used for primary a PUCCH group, the terms "secondary cell," "secondary cells," "serving cell," and "serving cells," may refer to secondary cell, secondary cells, serving cell, serving cells belonging to the primary PUCCH group, respectively. If the procedures are used for secondary a PUCCH group, the terms "secondary cell," "secondary cells," "serving cell," and "serving cells" may refer to secondary cell, secondary cells, serving cell, serving cells belonging to the secondary PUCCH group, respectively.

A wireless device's transmit power $P_{PUSCH,c}(i)$ for a PUSCH transmission in subframe (TTI, slot, and/or mini-slot) i for the serving cell c may be given by $$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm],$$

for example, if the wireless device transmits the PUSCH without a simultaneous PUCCH on a carrier f of the serving cell c.

A wireless device transmit power $P_{PUSCH,c}(i)$ for a PUSCH transmission in subframe (TTI, slot, and/or mini-slot) i for the serving cell c may be given by $$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm],$$

for example, if the wireless device transmits the PUSCH simultaneous with a PUCCH on a carrier f of the serving cell c and/or the PUSCH transmission at least partially overlaps with the PUCCH transmission.

A wireless device may assume that the wireless device's transmit power $P_{PUSCH,c}(i)$ for the PUSCH transmission in subframe (TTI, slot, and/or mini-slot) i for the serving cell c may be computed by $P_{PUSCH,c}(i) = \min\{P_{CMAX,c}(i), P_{O\_PUSCH,c}(1) + \alpha_c(1) \cdot PL_c + f_c(i)\}$ [dBm], for example, if the wireless device is not transmitting PUSCH for the serving cell c, for the accumulation of TPC command received with a DCI (e.g., DCI format 3/3A and/or format 2_2) for the PUSCH. One or more example parameters for $P_{PUSCH,c}$ are described below.

$P_{CMAX,c}(i)$ may be the configured transmit power, of the wireless device, in a subframe (TTI, slot, and/or mini-slot) i for a serving cell c, and $\hat{P}_{CMAX,c}(i)$ may be the linear value of $P_{CMAX,c}(i)$. The wireless device may assume $P_{CMAX,c}(i)$, for example, if the wireless device transmits a PUCCH without a PUSCH in the subframe (TTI, slot, and/or mini-slot) i for the serving cell c, for the accumulation of a TPC command received with a DCI format (e.g., DCI format 3/3A and/or format 2_2) for the PUSCH. The wireless device may determine $P_{CMAX,c}(i)$ assuming MPR=0 dB, A-MPR=0 dB, P-MPR=0 dB and $\Delta T_C$=0 dB, for example, if the wireless device does not transmit a PUCCH and a PUSCH in a subframe (TTI, slot, and/or mini-slot) i for the serving cell c, for the accumulation of TPC command received with a DCI format (e.g., DCI format 3/3A or format 2_2) for the PUSCH. The MPR, A-MPR, P-MPR and $\Delta T_C$ may be pre-defined in a specification (e.g., in specifications for LTE, NR, and/or any other technologies).

$\hat{P}_{PUCCH}(i)$ may be the linear value of $P_{PUCCH}(i)$. $M_{PUSCH,c}(i)$ may be the bandwidth of the PUSCH resource assignment expressed in a number of resource blocks valid for a subframe (TTI, slot, and/or mini-slot) i and a serving cell c. $M_{PUSCH,c}(i)$ may be provided by an uplink grant transmitted by the base station.

If, for example, the wireless device is configured with a higher layer parameter (e.g., UplinkPowerControlDedicated) for a serving cell c and if, for example, a subframe (TTI, slot, and/or mini-slot) i belongs to an uplink power control subframe (TTI, slot, and/or mini-slot) set 2 as indicated by the higher layer parameter (e.g., SubframeSet), if j=0, the wireless device may set $P_{O\_PUSCH,c}(0) = P_{O\_UE\_PUSCH,c,2}(0) + P_{O\_NOMINAL\_PUSCH,c,2}(0)$, where j=0 may be used for PUSCH (re)transmissions corresponding to a semi-persistent (configured and/or grant-free) grant. $P_{O\_UE\_PUSCH,c,2}(0)$ and $P_{O\_NOMINAL\_PUSCH,c,2}(0)$ may be the parameters provided by higher layers, for example, p0-UE-PUSCH-Persistent-SubframeSet2 and p0-NominalPUSCH-Persistent-SubframeSet2, for each serving cell c.

if j=1, the wireless device may set $P_{O\_PUSCH,c}(1) = P_{O\_UE\_PUSCH,c,2}(1) P_{O\_NOMINAL\_PUSCH,c,2}(1)$, where j=1 may be used for PUSCH (re)transmissions corresponding to a dynamic scheduled grant. $P_{O\_UE\_PUSCH,c,2}(1)$ and $P_{O\_NOMINAL\_PUSCH,c,2}(1)$ may be the parameters provided by higher layers, for example, p0-UE-PUSCH-SubframeSet2 and p0-NominalPUSCH-SubframeSet2 respectively, for the serving cell c.

if j=2, the wireless device may set $P_{O\_PUSCH,c}(2) = P_{O\_UE\_PUSCH,c}(2) + P_{O\_NOMINAL\_PUSCH,c}(2)$ where $P_{O\_UE\_PUSCH,c}(2)=0$ and $P_{O\_NOMINAL\_PUSCH,c}(2) = P_{O\_PRE} + \Delta_{PREAMBLE\_Msg3}$, where the parameter preambleInitialReceivedTargetPower ($P_{O\_PRE}$) and $\Delta_{PREAMBLE\_Msg3}$ may be signalled from higher layers for the serving cell c, where j=2 may be used for PUSCH (re)transmissions corresponding to the random access response grant. Otherwise, $P_{O\_PUSCH,c}(i)$ may be a parameter comprising the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for the serving cell c. For PUSCH (re)transmissions corresponding to a semi-persistent (configured and/or grant-free) grant, for example, j=0; for PUSCH (re)transmissions corresponding to a dynamic scheduled grant, for example, j=1; and for PUSCH (re)transmissions corresponding to the random access response grant, for example, j=2. $P_{O\_UE\_PUSCH,c}(2)=0$ and $P_{O\_NOMINAL\_PUSCH,c}(2) = P_{O\_PRE} + \Delta_{PREAMBLE\_Msg3}$, where the parameter preambleInitialReceivedTargetPower ($P_{O\_PRE}$) and $\Delta_{PREAMBLE\_Msg3}$ may be signalled from higher layers for serving cell c.

If, for example, the wireless device is configured with a higher layer parameter (e.g., UplinkPowerControlDedicated) for serving cell c, and if, for example, a subframe (TTI, slot, and/or mini-slot) i belongs to an uplink power control subframe (TTI, slot, and/or mini-slot) set 2 as indicated by the higher layer parameter (e.g., tpc-Subframe-Set), For j=0 or 1, the wireless device may set $\alpha_c(j)=\alpha_{c,2} \in \{0, 0.4, 0.5, 0.6, 0.7, 0.8, 0.9, 1\}$. $\alpha_{c,2}$ may be the parameter alpha-SubframeSet2-r12 provided by higher layers for each serving cell c.

For j=2, the wireless device may set $\alpha_c(j)=1$.

Otherwise, for j=0 or 1, $\alpha_c \in \{0, 0.4, 0.5, 0.6, 0.7, 0.8, 0.9, 1\}$ may be a 3-bit parameter provided by higher layers for the serving cell c. For j=2, the wireless device may set $\alpha_c(j)=1$.

$PL_c$ may be the downlink path loss estimate calculated in the wireless device for the serving cell c (e.g., in dB) and $PL_c$=referenceSignalPower higher layer filtered RSRP, where referenceSignalPower may be provided by higher layers and RSRP may be defined for the reference serving cell and the higher layer filter configuration may be defined for the reference serving cell. For the uplink of the primary cell, the primary cell may be used as the reference serving cell for determining referenceSignalPower and higher layer filtered RSRP, for example, if the serving cell c belongs to a TAG containing the primary cell. For the uplink of the secondary cell, the serving cell configured by the higher layer parameter pathlossReferenceLinking may be used as the reference serving cell for determining referenceSignalPower and higher layer filtered RSRP. For the uplink of the PSCell, the PSCell may be used as the reference serving cell for determining referenceSignalPower and higher layer filtered RSRP, for example, if the serving cell c belongs to a TAG containing the PSCell. For the uplink of the secondary cell other than PSCell, the serving cell configured by the higher layer parameter pathlossReferenceLinking may be used as the reference serving cell for determining referenceSignalPower and higher layer filtered RSRP, for example, if the serving cell c belongs to a TAG containing the PSCell. Serving cell c may be used as the reference serving cell for determining referenceSignalPower and higher layer filtered RSRP, for example, if the serving cell c belongs to a TAG not containing the primary cell or PSCell. The downlink path loss may be calculated by measuring one or more reference signals (e.g., CSI-RSs and/or synchronization signals transmitted from the base station).

A wireless device may set $\Delta_{TF,c}(i)=10 \log_{10}((2^{BPRE \cdot K_S}-1) \cdot \beta_{offset}^{PUSCH})$ for $K_S$=1.25 and 0 for $K_S$=0 where $K_S$ may be given by the parameter (e.g., deltaMCS-Enabled) provided by higher layers for each serving cell c. BPRE and $\beta_{offset}^{PUSCH}$, for each serving cell c, may be computed as below. $K_S$=0 may be for transmission mode 2.

BPRE=$O_{CQI}/N_{RE}$ may be for control data sent via a PUSCH without UL-SCH data and $$\sum_{r=0}^{C-1} K_r/N_{RE}$$

for other cases. C may be the number of code blocks, $K_r$ may be the size for code block r, $O_{CQI}$ may be the number of CQI/PMI bits including CRC bits and $N_{RE}$ may be the number of resource elements determined as $N_{RE}=M_{sc}^{PUSCH-initial} \cdot N_{symb}^{PUSCH-initial}$, where C, $K_r$, $M_{sc}^{PUSCH-initial}$ and $N_{symb}^{PUSCH-initial}$ may be pre-defined in a specification (e.g., the specifications for LTE, NR, and/or any other technology).

$\beta_{offset}^{PUSCH}=\beta_{offset}^{CQI}$, which may be for control data sent via a PUSCH without UL-SCH data and 1 for other cases.

$\delta_{PUSCH,c}$ may be a correction value (e.g., one or more correction values described herein), which may be a TPC command, and/or may be included in a PDCCH/EPDCCH with a DCI format (e.g., DCI format 0/0A/0B/4/4A/4B in LTE and/or DCI format 0_0/0_1 in NR) or in an MPDCCH with a DCI format (e.g., 6-0A) for a serving cell c or jointly coded with other TPC commands in a PDCCH/MPDCCH with a DCI format (e.g., DCI format 3/3A in LTE and/or DCI format 2_2 in NR) of which CRC parity bits may be scrambled with a group RNTI (e.g., TPC-PUSCH-RNTI). The current PUSCH power control adjustment state for serving cell c may be given by $f_{c,2}(i)$, and the wireless device may use $f_{c,2}(i)$ instead of $f_c(c)$ to determine $P_{PUSCH,c}(i)$, for example, if the wireless device is configured with a higher layer parameter (e.g., UplinkPowerControlDedicated) for the serving cell c and if a subframe (TTI, slot, and/or mini-slot) i belongs to an uplink power control subframe (e.g., TTI, slot, and/or mini-slot) set 2 as indicated by the higher layer parameter (e.g., tpc-SubframeSet). Otherwise, the current PUSCH power control adjustment state for the serving cell c may be given by $f_c(i)$. $f_{c,2}(i)$ and $f_c(i)$ may be defined by:

$f_c(i)$, $f_c(i)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$ for example, if accumulation may be enabled based on the parameter (e.g., Accumulation-enabled) provided by higher layers and/or if the TPC command $\delta_{PUSCH,c}$ may be included in a PDCCH/EPDCCH with a DCI format (e.g., DCI format 0 in LTE and/or DCI format 0_0 in NR) or in an MPDCCH with a DCI format (e.g., DCI format 6-0A) for the serving cell c where the CRC may be scrambled by the Temporary C-RNTI. $\delta_{PUSCH,c}(i-K_{PUSCH})$ may be signaled on a PDCCH/EPDCCH with a DCI format (e.g., DCI format 0/0A/0B/4/4A/4B in LTE and/or DCI format 0_0/0_1 in NR) or an MPDCCH with a DCI format (e.g., 6-0A) or a PDCCH/MPDCCH with a DCI format (e.g., DCI format 3/3A in LTE and/or DCI format 2_2 in NR) on subframe (TTI, slot, and/or mini-slot) $i-K_{PUSCH}$, and where $f_c(0)$ may be the first value after reset of accumulation.

For a wireless device (e.g., a band-limited (BL)/coverage enhancement (CE) wireless device configured with CEModeA), a subframe (TTI, slot, and/or mini-slot) $i-K_{PUSCH}$ may be the last subframe (TTI, slot, and/or mini-slot) in which the MPDCCH with a DCI format (e.g., 6-0A) or MPDCCH with a DCI format (e.g., 3/3A) may be transmitted.

The value of $K_{PUSCH}$ may be, for FDD or FDD-TDD and serving cell frame structure type 1, $K_{PUSCH}=4$; for TDD, if the wireless device is configured with more than one serving cell and the TDD UL/DL configuration of at least two configured serving cells are not the same, or if the wireless device is configured with the parameter (e.g., EIMTA-MainConfigServCell) for at least one serving cell, or for FDD-TDD and serving cell frame structure type 2, the "TDD UL/DL configuration" may refer to the UL-reference UL/DL configuration for the serving cell c; for a TDD UL/DL configurations (e.g., configuration 1-6 in LTE), $K_{PUSCH}$ may be given in a predefined table in a specification (e.g., LTE and/or NR specifications); for a TDD UL/DL configuration (e.g., configuration 0 in LTE), for example, if the PUSCH transmission in a first subframe (TTI, slot, and/or mini-slot) or a second subframe (TTI, slot, and/or mini-slot) (e.g., 7) may be scheduled with a PDCCH/

EPDCCH of a DCI format (e.g., 0/4), or an MPDCCH of a DCI format (e.g., DCI format 6-0A in LTE), in which the least significant bit (LSB) of the UL index may be set to 1, $K_{PUSCH}=7$, and for all other PUSCH transmissions, $K_{PUSCH}$ may be given in a predefined table (e.g., in LTE and/or NR specifications);

for TDD UL/DL configurations 0-5 and a wireless device configured with higher layer parameter symPUSCH-UpPts for the serving cell c, $K_{PUSCH}$ may be predefined (e.g., in LTE and/or NR specifications);

for TDD UL/DL configuration 6 and a wireless device configured with higher layer parameter symPUSCH-UpPts for the serving cell c, for example, if the PUSCH transmission in subframe 2 or 7 is scheduled with a PDCCH/EPDCCH of DCI format 0/4 in which the LSB of the UL index is set to 1, $K_{PUSCH}=6$. For all other PUSCH transmissions, $K_{PUSCH}$ may be predefined (e.g., in LTE and/or NR specifications); for a serving cell with frame structure type 3; for an uplink DCI format (e.g., DCI format 0A/0B/4A/4B in LTE), with PUSCH trigger A set to 0, $K_{PUSCH}$ may be equal to k+l, where k and/may be pre-defined in a specification (e.g., in LTE and/or NR technologies specifications); for an uplink DCI format (e.g., DCI format 0A/0B/4A/4B in LTE), with PUSCH trigger A set to 1 and upon the detection of PDCCH with DCI CRC scrambled by CC-RNTI and with 'PUSCH trigger B' field set to, '1', $K_{PUSCH}$, PUSCH may equal to p+k+l, where p, k and l may be pre-defined in a specification (e.g., in LTE and/or NR technologies specifications). For example, if a wireless device detected multiple TPC commands in subframe (TTI, slot, and/or mini-slot) i–$K_{PUSCH}$ the wireless device may use the TPC command in the PDCCH/EPDCCH with a DCI format (e.g., DCI format 0A/0B/4A/4B in LTE), which may schedule a PUSCH transmission in a subframe (TTI, slot, and/or mini-slot) i.

For a serving cell c and a wireless device (e.g., a non-BL/CE wireless device), the wireless device may attempt to decode a PDCCH/EPDCCH of a DCI format (e.g., DCI format 0/0A/0B/4/4A/4B in LTE) with the wireless device's C-RNTI or a DCI format (e.g., DCI format 0 in LTE and/or DCI format 0_0/0_1 in NR), for SPS (or configured grant type1, and/or configured grant type 2) C-RNTI and a PDCCH of a DCI format (e.g., DCI format 3/3A in LTE and/or DCI format 2_2 in NR) with this wireless device's RNIT (e.g., TPC-PUSCH-RNTI) in every subframe (TTI, slot, and/or mini-slot) except if in DRX or if the serving cell c is deactivated.

For a serving cell c and a wireless device (e.g., a BL/CE wireless device configured with CEModeA), the wireless device may attempt to decode an MPDCCH of a DCI format (e.g., DCI format 6-0A in LTE) with the wireless device's C-RNTI or SPS (OR configured grant type1, and/or configured grant type 2) C-RNTI and an MPDCCH of a DCI format (e.g., DCI format 3/3A in LTE and/or DCI format 2_2 in NR) with this wireless device's RNTI (e.g., TPC-PUSCH-RNTI) in particular downlink subframes (e.g., every BL/CE downlink subframe (TTI, slot, and/or mini-slot)) except if in DRX.

For a wireless device (e.g., a non-BL/CE wireless), the wireless device may use the $\delta_{PUSCH,c}$ provided in a DCI format (e.g., a DCI format 0/0A/0B/4/4A/4B in LTE and/or DCI format 0_0/0_1 in NR), for example, if a DCI format (e.g., a DCI format 0/0A/0B/4/4A/4B in LTE and/or a DCI format 0_0/0_1 in NR) for a serving cell c and a DCI format (e.g., DCI format 3/3A in LTE and/or DCI format 2_2 in NR) are both detected in the same subframe (TTI, slot, and/or mini-slot).

For a wireless device (e.g., a BL/CE wireless device configured with CEModeA), the wireless device may use the $\delta_{PUSCH,c}$ provided in the first DCI format (e.g., 6-0A), for example, if a first DCI format (e.g., 6-0A) for a serving cell c and a second DCI (e.g., DCI format 3/3A) are both detected in the same subframe.

$\delta_{PUSCH,c}$ may be 0 dB for a subframe (TTI, slot, and/or mini-slot), for example, where no TPC command is decoded for a serving cell c or if DRX occurs or i is not an uplink subframe (TTI, slot, and/or mini-slot) in TDD or FDD-TDD and the serving cell c frame structure type 2.

$\delta_{PUSCH,c}$ may be 0 dB, for example, if the subframe (TTI, slot, and/or mini-slot) i is not the first subframe (TTI, slot, and/or mini-slot) scheduled by a PDCCH/EPDCCH of DCI format 0B/4B.

The $\delta_{PUSCH,c}$ dB accumulated values signaled on a PDCCH/EPDCCH with a DCI format (e.g., DCI format 0/0A/0B/4/4A/4B in LTE and/or DCI format 0_0/0_1 in NR) or an MPDCCH with a DCI format (e.g., DCI format 6-0A) may be given in a predefined table. $\delta_{PUSCH,c}$ may be 0 dB, for example, if the PDCCH/EPDCCH with a DCI format (e.g., DCI format 0 in LTE) and/or the MPDCCH with a DCI format (e.g., DCI format 6-0A in LTE) are validated as an SPS (or configured grant Type 2) activation or release PDCCH/EPDCCH/MPDCCH.

The $\delta_{PUSCH,c}$ dB accumulated values signaled on PDCCH/MPDCCH with a DCI format (e.g., DCI format 3/3A) may be one of SET1 given in a predefined table (e.g., shown in FIG. 21) or SET2 given in a predefined table as determined by the parameter (e.g., TPC-Index) provided by higher layers.

Positive TPC commands for a serving cell c may not be accumulated, for example, if the wireless device has reached $P_{CMAX,c}(i)$ for the serving cell c. Negative TPC commands may not be accumulated, for example, if the wireless device has reached minimum power.

If the wireless device is not configured with a higher layer parameter (e.g., UplinkPowerControlDedicated) for a serving cell c, the wireless device may reset accumulation for the serving cell c, for example, if $P_{O\_UE\_PUSCH,c}$ value is changed by higher layers and/or if the wireless device receives random access response message for the serving cell c.

If the wireless device is configured with a higher layer parameter (e.g., UplinkPowerControlDedicated) for a serving cell c, the wireless may reset accumulation corresponding to $f_c(*)$ for the serving cell c, for example, if $P_{O\_UE\_PUSCH,c}$ value has been changed by higher layers, or if the wireless device receives random access response message for the serving cell c. If the wireless device is configured with a higher layer parameter (e.g., UplinkPowerControlDedicated) for a serving cell c, the wireless device may reset accumulation corresponding to $f_{c,2}(*)$ for the serving cell c, for example, if $P_{O\_UE\_PUSCH,c,2}$ value has been changed by higher layers.

If the wireless device is configured with higher layer parameter (e.g., UplinkPowerControlDedicated) for a serving cell c and/or if a subframe (TTI, slot, and/or mini-slot) i belongs to an uplink power control subframe (TTI, slot, and/or mini-slot) set 2 as indicated by the higher layer parameter (e.g., tpc-SubframeSet), the wireless device may set $f_c(i)=f_c(i-1)$. If the wireless device is configured with higher layer parameter (e.g., UplinkPowerControlDedicated) for a serving cell c and/or if a subframe (TTI, slot, and/or mini-slot) i does not belong to uplink power control subframe (TTI, slot, and/or mini-slot) set 2 as indicated by the higher layer parameter (e.g., tpc-SubframeSet), the wireless device may set $f_{c,2}(i)=f_{c,2}(i-1)$.

The wireless device may set $f_c(i)+\delta_{PUSCH,c}(i-K_{PUSCH})$ and $f_{c,2}(i)=\delta_{PUSCH,c}(i-K_{PUSCH})$, for example, if accumulation is not enabled for a serving cell c based on the parameter (e.g., Accumulation-enabled) provided by higher layers. $\delta_{PUSCH,c}(i-K_{PUSCH})$ may be signaled on a PDCCH/EPDCCH with a DCI (e.g., DCI format 0/0A/0B/4/4A/4B) or an MPDCCH with a DCI (e.g., DCI format 6-0A) for the serving cell c on a subframe (TTI, slot, and/or mini-slot) $i-K_{PUSCH}$. For a wireless device (e.g., a BL/CE UE configured with CEModeA), the subframe (TTI, slot, and/or mini-slot) $i-K_{PUSCH}$ may be the last subframe (TTI, slot, and/or mini-slot) in which the MPDCCH with DCI format 6-0A or MPDCCH with DCI format 3/3A may be transmitted.

With respect to the value of $K_{PUSCH}$, for FDD or FDD-TDD and serving cell frame structure type 1, the wireless device may set $K_{PUSCH}=4$. For TDD, if the wireless device is configured with more than one serving cell and the TDD UL/DL configuration of at least two configured serving cells are not the same, or if the wireless device is configured with a particular parameter (e.g., EIMTA-MainConfigServCell) for at least one serving cell, or FDD-TDD and serving cell frame structure type 2, the "TDD UL/DL configuration" may refer to the UL-reference UL/DL configuration for serving cell c. For one or more TDD UL/DL configurations (e.g., configurations 1-6), $K_{PUSCH}$ may be predefined;

for TDD UL/DL configuration 0, if the PUSCH transmission in subframe (TTI, slot, and/or mini-slot) 2 or 7 is scheduled with a PDCCH/EPDCCH of a DCI (e.g., DCI format 0/4) or an MPDCCH with a DCI (e.g., DCI format 6-0A) in which the LSB of the UL index is set to 1, the wireless device may set $K_{PUSCH}=7$, and for all other PUSCH transmissions, $K_{PUSCH}$ may be predefined.

For an unlicensed band, for example, a serving cell with frame structure type 3 may be configured. For an uplink DCI format (e.g., 0A/4A) with PUSCH trigger A set to 0, $K_{PUSCH}$ may be equal to k+l. k and l may be pre-defined in a specification (e.g., in LTE and/or NR technologies specifications).

For an uplink DCI format (e.g., 0B/4B) with PUSCH trigger A set to 0, $K_{PUSCH}$ may be equal to k+l+i' with $i'=\text{mod}(n_{HARQ\_ID}^i-n_{HARQ\_ID}N_{HARQ})$ niHARQ_ID may be HARQ process number in a subframe (TTI, slot, and/or mini-slot) i, and k, l, nHARQ_ID and NHARQ may be pre-defined in a specification (e.g., in LTE and/or NR technologies specifications). For an uplink DCI format (e.g., 0A/4A) with PUSCH trigger A set to 1 and upon the detection of PDCCH with DCI CRC scrambled by CC-RNTI and with 'PUSCH trigger B' field set to '1', $K_{PUSCH}$ may be equal to p+k+l p, k and l may be pre-defined in a specification (e.g., in LTE, NR, and/or any other technologies specifications). For an uplink DCI format (e.g., 0B/4B) with PUSCH trigger A set to 1 and upon the detection of a PDCCH with a DCI CRC scrambled by CC-RNTI and with 'PUSCH trigger B' field set to '1', $K_{PUSCH}$ may be equal to p+k+l+i' with $i'=\text{mod}(n_{HARQ\_ID}^i-n_{HARQ\_ID}N_{HARQ})$ n'$_{HARQ\_ID}$ may be an HARQ process number in a subframe (TTI, slot, and/or mini-slot) i, and p, k, l, $n_{HARQ\_ID}$ and $N_{HARQ}$ may be pre-defined in a specification (e.g., in LTE and/or NR technologies specifications).

A wireless device may use a TPC command in a PDCCH/EPDCCH with a DCI (e.g., DCI format 0A/0B/4/4A/4B) which may schedule a PUSCH transmission in a subframe (TTI, slot, and/or mini-slot) i, for example, if the wireless device detected multiple TPC commands in subframe (TTI, slot, and/or mini-slot) 1 $K_{PUSCH}$.

The $\delta_{PUSCH,c}$ dB absolute values signaled on a PDCCH/EPDCCH with a DCI (e.g., DCI format 0/0A/0B/4/4A/4B) or an MPDCCH with a DCI (e.g., DCI format 6-0A) may be predefined. $\delta_{PUSCH,c}$ may be 0 dB, for example, if the PDCCH/EPDCCH with a DCI (e.g., DCI format 0, DCI format 0_0, DCI format 0_1, DCI format 1_1, DCI format 1_0, DCI format 2_0, DCI format 2_1, DCI format 2_2) or an MPDCCH with DCI format 6-0A may be validated as an SPS (or configured grant type1, and/or configured grant type 2) activation or release PDCCH/EPDCCH/MPDCCH.

For a wireless device (e.g., a non-BL/CE wireless device), the wireless device may set $f_c(i)=f_c(i-1)$ and $f_{c,2}(i)=f_{c,2}(i-1)$ for a subframe (TTI, slot, and/or mini-slot) where, for example, no PDCCH/EPDCCH with a DCI format (e.g., DCI format 0/0A/0B/4/4A/4B) is decoded for a serving cell c or where, for example, DRX occurs or i is not an uplink subframe (TTI, slot, and/or mini-slot) in TDD or FDD-TDD and serving cell c frame structure type 2.

For a wireless device (e.g., a BL/CE wireless device configured with CEModeA), the wireless device may set $f_c(i)=f_c(i-1)$ and $f_{c,2}(i)=f_{c,2}(i-1)$ for a subframe (TTI, slot, and/or mini-slot) where, for example, no MPDCCH with DCI format 6-0A is decoded for a serving cell c or where, for example, DRX occurs or i is not an uplink subframe (TTI, slot, and/or mini-slot) in TDD.

A wireless device may set $f_c(i)=f_c(i-1)$, for example, if the wireless device is configured with higher layer parameter (e.g., UplinkPowerControlDedicated) for a serving cell c and if a subframe (TTI, slot, and/or mini-slot) i belongs to an uplink power control subframe (TTI, slot, and/or mini-slot) set 2 as indicated by the higher layer parameter (e.g., tpc-SubframeSet). The wireless device may set $f_{c,2}(i)=f_{c,2}(i-1)$, for example, if the wireless device is configured with a higher layer parameter (e.g., UplinkPowerControlDedicated) for a serving cell c and if a subframe (TTI, slot, and/or mini-slot) i does not belong to an uplink power control subframe (TTI, slot, and/or mini-slot) set 2 as indicated by the higher layer parameter tpc-SubframeSet.

For both types of $f_c(*)$ (accumulation or current absolute), the first value may be set as follows:

$f_c$ may be zero, for example, if $P_{O\_UE\_PUSCH,c}$ value is changed by higher layers and a serving cell c is the primary cell, or if $P_{O\_UE\_PUSCH,c}$ value is received by higher layers and the serving cell c is a Secondary cell; Else, The wireless device may set $f_c(0)=\Delta P_{rampup,c}+\delta_{msg2,c}$, for example, if the wireless device receives the random access response message for a serving cell c $\delta_{msg2,c}$ may be the TPC command indicated in the random access response corresponding to the random access preamble transmitted in the and serving cell c, $$\Delta P_{rampup,c} = \min\left[\left\{\max\left(0, P_{CMAX,c} - \left(\begin{array}{c}10\log_{10}(M_{PUSCH,c}(0)) + \\ P_{O\_PUSCH,c}(2) + \delta_{msg2} + \\ \alpha_c(2) \cdot PL + \Delta_{TF,c}(0)\end{array}\right)\right)\right\}, \Delta P_{rampuprequested,c}\right]$$

and $\Delta P_{rampuprequested,c}$ may be provided by higher layers and may correspond to the total power ramp-up requested by higher layers from the first to the last preamble in the serving cell c, $M_{PUSCH,c}(0)$ may be the bandwidth of the PUSCH resource assignment expressed in number of resource blocks valid for the subframe (TTI, slot, and/or mini-slot) of first PUSCH transmission in the serving cell c, and $\Delta TF,c(0)$ may be the power adjustment of first PUSCH transmission in the serving cell c.

The wireless device may set $f_{c,2}(0)=0$, for example, if $P_{O\_UE\_PUSCH,c,2}$ value is received by higher layers for a serving cell c.

The setting of the wireless device transmit power $P_{PUCCH}$ for the physical uplink control channel (PUCCH) transmission in a subframe (TTI, slot, and/or mini-slot) i for a serving cell c may be defined by $$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{array}\right\}[dBm],$$

for example, if the serving cell c is the primary cell, for a first PUCCH format (e.g., 1/1a/1b/2/2a/2b/3).

The setting of the wireless device transmit power PUCCH for the physical uplink control channel (PUCCH) transmission in a subframe (TTI, slot, and/or mini-slot) i for a serving cell c may be defined by $$P_{PUCCH}(i) = \min\left\{\begin{array}{l} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{array}\right\}[dBm],$$

for example, if the serving cell c is the primary cell, for a second PUCCH format (e.g., 4/5).

For the accumulation of TPC command for PUCCH, the wireless device may assume that the wireless device transmit power $P_{PUCCH}$ for PUCCH in a subframe (TTI, slot, and/or mini-slot) i may be computed by $P_{PUCCH}(i)=\min\{P_{CMAX,c}(i), P_{O\_PUCCH}+PL_c+g(i)\}[dBm]$, for example, if the wireless device is not transmitting PUCCH for the primary cell.

$P_{CMAX,c}(i)$ may be the configured wireless device transmit power in subframe (TTI, slot, and/or mini-slot) i for a serving cell c. For the accumulation of TPC command for a PUCCH, the wireless device may compute $P_{CMAX,c}(i)$ assuming MPR=0 dB, A-MPR=0 dB, P-MPR=0 dB and $\Delta T_C=0$ dB, for example, if the wireless device does not transmit a PUCCH and PUSCH in a subframe (TTI, slot, and/or mini-slot) i for the serving cell c. MPR, A-MPR, P-MPR and $\Delta T_C$ may be pre-defined in a specification (e.g., in a LTE, NR, and/or any other technologies specifications).

The parameter $\Delta_{F\_PUCCH}(F)$ may be provided by higher layers. A $\Delta_{F\_PUCCH}(F)$ value may correspond to a PUCCH format (F) relative to a PUCCH format (e.g., PUCCH format 1a) The PUCCH format (F) may be pre-defined in a specification (e.g., in LTE, NR, and/or any other technologies specifications).

The value of $\Delta_{TxD}(F')$ may be provided by higher layers, for example, if the wireless device may be configured by higher layers to transmit a PUCCH on two antenna ports. Each PUCCH format F' may be pre-defined in a specification (e.g., in LTE and/or NR technologies specifications); otherwise, the wireless device may set $\Delta_{TxD}(F')=0$.

$h(n_{CQI}, n_{HARQ}, n_{SR})$ may be a PUCCH format dependent value $n_{CQI}$ may correspond to the number of information bits for the channel quality information. The wireless device may set $n_{SR}=1$, for example, if a subframe (TTI, slot, and/or mini-slot) i is configured for SR for the wireless device not having any associated transport block for UL-SCH, otherwise the wireless device may set $n_{SR}=0$. The value of $n_{HARQ}$ may be pre-defined in a specification (e.g., in LTE and/or NR technologies specifications), for example, if the wireless device is configured with more than one serving cell, or the wireless device is configured with one serving cell and transmitting using a PUCCH format (e.g., a PUCCH format 3). Otherwise, $n_{HARQ}$ may be the number of HARQ-ACK bits sent in the subframe (TTI, slot, and/or mini-slot) i.

The wireless device may set $h(n_{CQI}, n_{HARQ}, n_{SR})=0$, for example, for a first PUCCH format (e.g., PUCCH format 1,1a and 1b).

For a second PUCCH format (e.g., PUCCH format 1b) with a channel selection, the wireless device may set $$h(n_{CQI}, n_{HARQ}, n_{SR}) = \frac{(n_{HARQ}-1)}{2},$$

for example, if the wireless device is configured with more than one serving cell. Otherwise, for example, $h(n_{CQI}, n_{HARQ}, n_{SR})=0$.

The wireless device may set $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases},$$

for example, for a third PUCCH format (e.g., PUCCH format 2, 2a, 2b) and a normal cyclic prefix.

The wireless device may set $$h(n_{CQI}, n_{HARQ}, n_{SR}) = \begin{cases} 10\log_{10}\left(\frac{n_{CQI}+n_{HARQ}}{4}\right) & \text{if } n_{CQI}+n_{HARQ} \geq 4 \\ 0 & \text{otherwise} \end{cases},$$

for example, for a fourth PUCCH format (e.g., PUCCH format 2) and an extended cyclic prefix.

For a fifth PUCCH format (e.g., PUCCH format 3) and if a wireless device transmits HARQ-ACK/SR without periodic CSI, the wireless device may set $$h(n_{CQI}, n_{HARQ}, n_{SR}) = \frac{n_{HARQ}+n_{SR}-1}{3}$$

for example, if the wireless device is configured by higher layers to transmit PUCCH format 3 on two antenna ports, or if the wireless device transmits more than a number of bits (e.g., 11 bits) of HARQ-ACK/SR. Otherwise, the wireless device may set $$h(n_{CQI}, n_{HARQ}, n_{SR}) = \frac{n_{HARQ}+n_{SR}-1}{2}.$$

For a sixth PUCCH format (e.g., PUCCH format 3) and if a wireless device transmits HARQ-ACK/SR and periodic CSI, the wireless device may set $$h(n_{CQI}, n_{HARQ}, n_{SR}) = \frac{n_{HARQ}+n_{SR}+n_{CQI}-1}{3}$$

for example, if the wireless device is configured by higher layers to transmit a PUCCH format (e.g., PUCCH format 3) on two antenna ports, or if the wireless device transmits more than a number of bits (e.g., 11 bits) of HARQ-ACK/SR and CSI; Otherwise, for example, the wireless device may set $$h(n_{CQI}, n_{HARQ}, n_{SR}) = \frac{n_{HARQ} + n_{SR} + n_{CQI} - 1}{2}.$$

For a seventh PUCCH format (e.g., PUCCH format 4), for example, $M_{PUCCH,c}(i)$ may be the bandwidth of the PUCCH format 4 expressed in number of resource blocks valid for a subframe (TTI, slot, and/or mini-slot) i and a serving cell c. For PUCCH format 5, for example, the wireless device may set $M_{PUCCH,c}(i)=1$.

The wireless device may set $\Delta_{TF,c}(i)=10 \log_{10} (2^{1.25 \cdot BPRE(i)}-1)$. The wireless device may set $BPRE(i) = O_{UCI}(i)/N_{RE}(i)$. $O_{UCI}(i)$ may be the number of HARQ-ACK/SR/RI/CQI/PMI bits comprising CRC bits transmitted on PUCCH format 4/5 in subframe (TTI, slot, and/or mini-slot) i. The wireless device may set $N_{RE}(i)=M_{PUCCH,c}(i) \cdot N_{sc}^{RB} \cdot N_{symb}^{PUCCH}$ for PUCCH format 4 and $N_{RE}(i)= N_{sc}^{RB} \cdot N_{symb}^{PUCCH}/2$ for PUCCH format 5. The wireless device may set $N_{symb}^{PUCCH}=2 \cdot (N_{symb}^{UL}-1)-1$, for example, if shortened PUCCH format 4 and/or shortened PUCCH format 5 is used in subframe (TTI, slot, and/or mini-slot) i. Otherwise, for example, $N_{symb}^{PUCCH}=2 \cdot (N_{symb}^{UL}-1)-1$.

$P_{O\_PUCCH}$ may be a parameter computed as the sum of a parameter $P_{O\_NOMINAL\_PUCCH}$ provided by higher layers and a parameter $P_{O\_UE\_PUCCH}$ provided by higher layers.

$\delta_{PUCCH}$ may be a device specific correction value (e.g., a UE-specific correction value), may be a TPC command, included in a PDCCH with a DCI format (e.g., DCI format 1A/1B/1D/1/2A/2/2B/2C/2D) for the primary cell, or included in an MPDCCH (e.g., with DCI format 6-1A), or included in an EPDCCH (e.g., with DCI format 1A/1B/1D/1/2A/2/2B/2C/2D) for the primary cell, or sent jointly coded with other device specific PUCCH correction values on a PDCCH/MPDCCH (e.g., with DCI format 3/3A in LTE and/or DCI format 2_2 in NR) of which CRC parity bits may be scrambled with a group RNTI (e.g., TPC-PUCCH-RNTI).

For a wireless device (e.g., a non-BL/CE UE), for example, if the wireless device is not configured for EPDCCH monitoring, the wireless device may attempt to decode a PDCCH of a DCI format (e.g., DCI format 3/3A in LTE and/or DCI format 2_2 in NR) with the wireless device's RNTI (e.g., TPC-PUCCH-RNTI) and one or several PDCCHs of a DCI format (e.g., 1A/1B/1D/1/2A/2/2B/2C/2D) with the wireless device's C-RNTI or SPS (or configured grant type1, and/or configured grant type 2) C-RNTI on every subframe (TTI, slot, and/or mini-slot), except if in DRX.

If, for example, a wireless device is configured for EPDCCH monitoring, the wireless device may attempt to decode, for example, a PDCCH of a DCI format (e.g., DCI format 3/3A in LTE and/or DCI format 2_2 in NR) with the wireless device's RNTI (e.g., TPC-PUCCH-RNTI) and one or several EPDCCHs of DCI format 1A/1B/1D/1/2A/2/2B/2C/2D with the wireless device's C-RNTI or SPS (or configured grant type1, and/or configured grant type 2) C-RNTI, and one or several EPDCCHs of DCI format 1A/1B/1D/1/2A/2/2B/2C/2D with the wireless device's C-RNTI or SPS (or configured grant type1, and/or configured grant type 2) C-RNTI.

For a wireless device (e.g., a BL/CE wireless device configured with CEModeA), the wireless device may attempt to decode an MPDCCH of a DCI format (e.g., DCI format 3/3A in LTE and/or DCI format 2_2) with the wireless device's RNTI (e.g., TPC-PUCCH-RNTI) and an MPDCCH of DCI format 6-1A with the wireless device's C-RNTI or SPS (or configured grant type1, and/or configured grant type 2) C-RNTI on a particular subframe (e.g., every BL/CE downlink subframe, slot, and/or mini-slot), except if in DRX.

The wireless device may use the $\delta_{PUCCH}$ provided in a PDCCH/EPDCCH/MPDCCH, for example, if the wireless device decodes the PDCCH (e.g., with DCI format 1A/1B/1D/1/2A/2/2B/2C/2D), the EPDCCH (e.g., with DCI format 1A/1B/1D/1/2A/2/2B/2C/2D), or the MPDCCH (e.g., with DCI format 6-1A), for the primary cell, and the corresponding detected RNTI equals the C-RNTI or SPS (or configured grant type1, and/or configured grant type 2) C-RNTI of the wireless device, and the TPC field in the DCI format is not used to determine the PUCCH resource. The wireless device may use the $\delta_{PUCCH}$ provided in that PDCCH/MPDCCH, for example, if the wireless device decodes a PDCCH/MPDCCH with DCI format 3/3A. Otherwise, for example, the wireless device may set $\delta_{PUCCH}=0$ dB.

The wireless device may set $$g(i) = g(i-1) + \sum_{m=0}^{M-1} \delta_{PUCCH}(i-k_m) \cdot g(i)$$

may be the current PUCCH power control adjustment state and g(0) may be the first value after reset.

For FDD or FDD-TDD and primary cell frame structure type 1, the wireless device may set M=1 and $k_0=4$.

For TDD, values of M and $k_m$ may be pre-defined in a specification (e.g., in the LTE and/or NR technologies specifications).

The $\delta_{PUCCH}$ dB values signaled on a PDCCH with a DCI format (e.g., 1A/1B/1D/1/2A/2/2B/2C/2D) or an EPDCCH with a DCI format (e.g., 1A/1B/1D/1/2A/2/2B/2C/2D) or an MPDCCH with a DCI format (e.g., 6-1A) may be given in a predefined table (e.g., as shown in FIG. 22). $\delta_{PUCCH}$ may be 0 dB, for example, if the PDCCH with a DCI format (e.g., 1/1A/2/2A/2B/2C/2D) or the EPDCCH with a DCI format (e.g., 1/1A/2/2A/2B/2C/2D) or the MPDCCH with a DCI format (e.g., 6-1A) may be validated as an SPS (or configured grant type1, and/or configured grant type 2) activation PDCCH/EPDCCH/MPDCCH, or the PDCCH/EPDCCH (e.g., with DCI format 1A) or MPDCCH (e.g., with DCI format 6-1A) may be validated as an SPS (or configured grant type1, and/or configured grant type 2) release PDCCH/EPDCCH/MPDCCH.

The $\delta_{PUCCH}$ dB values signaled on a PDCCH/MPDCCH with a DCI format (e.g., DCI format 3/3A in LTE and/or DCI format 2_2 in NR) may be given in a predefined table (e.g., as shown in FIG. 22 or Table 5.1.2.1-2 in 3GPP TS 36.213 v.14.4.0: "Evolved Universal Terrestrial Radio Access (E-UTRA); Physical layer procedures") as semi-statically configured by higher layers.

The wireless device may set g(0)=0, for example, if $P_{O\_UE\_PUCCH}$ value is changed by higher layers. Otherwise, for example, the wireless device may set $g(0)=\Delta P_{rampup}+$ $\delta_{msg2}$ $\delta_{msg2}$ may be the TPC command indicated in the random access response corresponding to the random access preamble transmitted in the primary cell, and $$\Delta P_{rampup} = \min\left[\left\{\max\left(0, P_{CMAX,c} - \begin{pmatrix} P_{0\_PUCCH} + \\ PL_c + h(n_{CQI}, n_{HARQ}, n_{SR}) + \\ \Delta_{F\_PUCCH}(F) + \Delta_{TxD}(F') \end{pmatrix}\right)\right\}, \Delta P_{rampuprequested}\right],$$

for example, if the wireless device is transmitting a PUCCH in a subframe (TTI, slot, and/or mini-slot) i.

Otherwise, for example, the wireless device may set $\Delta P_{rampup} = \min\{\{\max(0, P_{CMAX,c} - (P_{0\_PUCCH} + PL_c))\}, \Delta P_{rampuprequested}]$. $\Delta P_{rampuprequested}$ may be provided by higher layers and may correspond to the total power ramp-up requested by higher layers from the first to the last preamble in the primary cell.

Positive TPC commands for the primary cell may not be accumulated, for example, if the wireless device has reached $P_{CMAX,c}(i)$ for the primary cell.

Negative TPC commands may not be accumulated, for example, if the wireless device has reached minimum power.

The wireless device may reset accumulation, for example, if $P_{O\_UE\_PUCCH}$ value is changed by higher layers. The wireless device may reset accumulation, for example, if the wireless device receives a random access response message for the primary cell. The wireless device may reset accumulation $g(i)=g(i-1)$, for example, if i may be not an uplink subframe (TTI, slot, and/or mini-slot) in TDD or FDD-TDD and primary cell frame structure type 2.

For a wireless device (e.g., a BL/CE wireless device configured with CEModeA), $k=0, 1, \ldots, N-1$ may be determined by $P_{PUCCH,c}(i_k) = P_{PUCCH,c}(i_0)$, for example, if the PUCCH is transmitted in more than one subframe (TTI, slot, and/or mini-slot) $i_0, i_1, \ldots, i_{N-1}$, where $i_0 < i_1 < \ldots < i_{N-1}$, the PUCCH transmit power in a subframe (TTI, slot, and/or mini-slot) $i_k$.

For a wireless device (e.g., a BL/CE wireless device configured with CEModeB), the PUCCH transmit power in subframe (TTI, slot, and/or mini-slot) $i_k$ may be determined by $P_{PUCCH,c}(i_k) = P_{CMAX,c}(i_0)$.

The setting of the wireless device transmit power SRS for the SRS transmitted on a subframe (TTI, slot, and/or mini-slot) i for a serving cell c may be defined by: for example, for serving cell c with frame structure type 2, and not configured for PUSCH/PUCCH transmission $P_{SRS,c}(i) = \min\{P_{CMAX,c}(i), 10 \log_{10}(M_{SRS,c}) + P_{O\_SRS,c}(m) + \alpha_{SRS,c} \cdot PL_c + f_{SRS,c}(i) \cdot\}$ [dBm];

Otherwise, for example, $P_{SRS}$ may be defined by $P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\}$ [dBm].

$P_{CMAX,c}(i)$ may be the configured wireless device transmit power in a subframe (TTI, slot, and/or mini-slot) i for a serving cell c. $P_{SRS\_OFFSET,c}(m)$ may be semi-statically configured by higher layers for $m=0$ and $m=1$ for the serving cell c. For SRS transmission given trigger type 0, the wireless device may set $m=0$. For SRS transmission given trigger type 1, the wireless device may set $m=1$. $M_{SRS,c}$ may be the bandwidth of the SRS transmission in the subframe (TTI, slot, and/or mini-slot) i for the serving cell c expressed in number of resource blocks. $f_c(i)$ may be the current PUSCH power control adjustment state for the serving cell c. $P_{O\_PUSCH,c}(j)$ and $\alpha_c(j)$ may be parameters as pre-defined in a specification (e.g., in LTE, NR, and/or any other technologies specifications) for a subframe (TTI, slot, and/or mini-slot) i, where $j=1$. $\alpha_{SRS,c}$ may be the higher layer parameter (e.g., alpha-SRS) configured by higher layers for the serving cell c. $P_{O\_SRS,c}(m)$ may be a parameter comprising the sum of a component $P_{O\_NOMINAL\_SRS,c}(m)$ provided from higher layers for $m=0$ and 1 and a component $P_{O\_UE\_SRS,c}(m)$ provided by higher layers for $m=0$ and 1 for the serving cell c. For SRS transmission given trigger type 0, the wireless device may set $m=0$. For SRS transmission given trigger type 1, the wireless device may set $m=1$.

For serving cell c with frame structure type 2, and not configured for a PUSCH/PUCCH transmission, the current SRS power control adjustment state may be given by $f_{SRS,c}(i)$ and may be defined by: for example, the wireless device may set $f_{SRS,c}(i) = f_{SRS,c}(i-1) + \delta_{SRS,c}(i-K_{SRS})$, for example, if accumulation is enabled, and $f_{SRS,c}(i) = \delta_{SRS,c}(i-K_{SRS})$, for example, if accumulation is not enabled based on a higher layer parameter (e.g., Accumulation-enabled) for example, $\delta_{SRS,c}(i-K_{SRS})$ may be a correction value, and/or may be an SRS TPC command signaled on a PDCCH (e.g., with DCI format 3B in LTE and/or DCI format 2_3 in NR) in the most recent subframe (TTI, slot, and/or mini-slot) $i-K_{SRS}$ where $K_{SRS} \geq 4$ The wireless device may be not expected to receive different SRS TPC command values for the serving cell c in the same subframe (TTI, slot, and/or mini-slot). For a serving cell c with frame structure type 2, and not configured for PUSCH/PUCCH transmission, the wireless device may attempt to decode a PDCCH of a DCI format (e.g., DCI format 3B in LTE and/or DCI format 2_3 in NR) with CRC scrambled by a higher layer parameter (e.g., SRS-TPC-RNTI) in every subframe (TTI, slot, and/or mini-slot), except when in DRX or where the serving cell c is deactivated.

The wireless device may set $\delta_{SRS,c} = 0$ dB for a subframe (TTI, slot, and/or mini-slot), for example, where no TPC command in a PDCCH with a DCI format (e.g., a DCI format 3B in LTE and/or DCI format 2_3 in NR) is decoded for a serving cell c or where DRX occurs or i is not an uplink/special subframe (TTI, slot, and/or mini-slot) in TDD or FDD-TDD and serving cell c frame structure type 2.

The $\delta_{SRS}$ dB values signaled on a PDCCH with a DCI format (e.g., DCI format 3B in LTE and/or DCI format 2_3 in NR) may be predefined, for example, if a higher layer parameter (e.g., fieldTypeFormat3B) indicates a multi-bit (e.g., 2 bits) TPC command. The $\delta_{SRS}$ dB signaled on a PDCCH with a DCI format (e.g., DCI format 3B in LTE and/or DCI format 2_3 in NR) may be predefined, for example, if a higher layer parameter (e.g., fieldTypeFormat3B) indicates 1-bit TPC command.

$f_{SRS,c}(0)$ may be the first value after reset of accumulation, for example, if accumulation is enabled. The wireless device may reset accumulation, for a serving cell c, for example, if $P_{O\_UE\_SRS,c}$ value is changed by higher layers. The wireless device may reset accumulation for the serving cell c, for example, if the wireless device receives random access response message for the serving cell c.

For both types of $f_{SRS,c}(*)$ (accumulation or current absolute), the first value may be set as follows:

The wireless device may set $f_{SRS,c}(0) = 0$, for example, if $P_{O\_UE\_SRS,c}$ value is received by higher layers.

The wireless device may set $f_{SRS,c}(0) = \Delta P_{rampup,c} = \delta_{msg2,c}$ for example, if $P_{O\_UE\_SRS,c}$ value is not received by higher layers, and if the wireless device receives the random access response message for a serving cell c. $\delta_{msg2,c}$ may be the TPC command indicated in the random access response corresponding to the random access preamble transmitted in the serving cell c, and $$\Delta P_{rampup,c} = \min\left[\left\{\max\left(P_{CMAX,c} - \begin{pmatrix} 0, \\ 10\log_{10}(M_{SRS,c}(0)) + \\ P_{O\_SRS,c}(m) + \alpha_{SRS,c} \cdot PL_c \end{pmatrix}\right)\right\}, \Delta P_{rampuprequested,c}\right]$$

and $\Delta P_{rampuprequested,c}$ may be provided by higher layers and may correspond to the total power ramp-up requested by higher layers from the first to the last preamble in the serving cell c, $M_{SRS,c}(0)$ may be the bandwidth of the SRS transmission expressed in number of resource blocks valid for the subframe of first SRS transmission in the serving cell c.

For a PUSCH, a wireless device may scale a linear value $\hat{P}_{PUSCH,f,c}(i,j,q_d,1)$ of the transmit power $P_{PUSCH,f,c}(i,j,q_d,1)$, with parameters in the following, for example, by the ratio of the number of antenna ports with a non-zero PUSCH transmission to the number of configured antenna ports for the transmission scheme. The resulting scaled power may be split across the antenna ports on which the non-zero PUSCH may be transmitted.

A wireless device may determine the PUSCH transmission power $\hat{P}_{PUSCH,f,c}(i,j,q_d,1)$ in PUSCH transmission period i as $$P_{PUSCH,f,c}(i, j, q_d, l) = \min\left\{\begin{array}{l} P_{CMAX,f,c}(i), \\ P_{O\_PUSCH,f,c}(j) + 10\log_{10} \\ (2^\mu \cdot M_{RB,f,c}^{PUSCH}(i)) + \alpha_{f,c}(j) \cdot \\ PL_{f,c}(q_d) + \Delta_{TF,f,c}(i) + f_{f,c}(i, l) \end{array}\right\}$$

[dBm], for example, if the wireless device transmits the PUSCH on carrier f of serving cell c using parameter set configuration with index j and PUSCH power control adjustment state with index l.

$P_{CMAX,f,c}(i)$ may be the configured wireless device transmit power for carrier f of serving cell c in a PUSCH transmission period i.

$P_{O\_PUSCH,f,c}(j)$ may be a parameter comprising the sum of a component $P_{O\_NOMINAL\_PUSCH,f,c}(j)$ and a component $P_{O\_NOMINAL\_PUSCH,f,c}(i)$, where $j \in \{0, 1, \ldots, J-1\}$. For a PUSCH (re)transmission corresponding to a random access response grant, j=0, the wireless device may set $P_{O\_UE\_PUSCH,f,c}(0)=0$ and $P_{O\_NOMINAL\_PUSCH,f,c}(0)=P_{O\_PRE}+\Delta_{PREAMBLE\_Msg3}$. The parameter preambleInitial-ReceivedTargetPower (for 0 PRE) and Delta-preamble-msg3 (for $\Delta_{PREAMBLE\_Msg3}$) may be provided by higher layers for a carrier f of a serving cell c. For a PUSCH (re)transmission corresponding to a grant-free configuration or semi-persistent grant, j=1, $P_{O\_NOMINAL\_PUSCH,f,c}(1)$ may be provided by a higher layer parameter (e.g., p0-nominal-pusch-withoutgrant), and $P_{O\_UE\_PUSCH,f,c}$ may be provided by a higher layer parameter p0-ue-pusch for a carrier f of the serving cell c. For $j \in \{2, \ldots, J-1\}=S_j$, a $P_{O\_NOMINAL\_PUSCH,f,c}(i)$ value, applicable for all $j \in S_j$, may be provided by a higher layer parameter (e.g., p0-nominal-pusch-withgrant) for each carrier f of the serving cell c, and a set of $P_{O\_UE\_PUSCH,f,c}(j)$ values may be provided by a set of one or more higher layer parameters (e.g., p0-pusch-alpha-set) and a respective index by a higher layer parameter (e.g., p0alphasetindex) for a carrier f of the serving cell c. The size of the set may be J–2 and may be indicated by a higher layer parameter (e.g., num-p0-alpha-sets).

$M_{RB,f,c}^{PUSCH}(i)$ may be the bandwidth of the PUSCH resource assignment expressed in number of resource blocks for a PUSCH transmission period i on a carrier f of a serving cell c, and μ may be predefined and/or semi-statically configured by one or more higher layer parameters.

For j=0, the wireless device may set $\alpha_{f,c}(j)=1$. For j=1, $\alpha_{f,c}(1)$ may be provided by a higher layer parameter (e.g., alpha). For $j \in S_j$, a set of $\alpha_{f,c}(j)$ values may be provided by a set of higher layer parameters (e.g., p0-pusch-alpha-set) and a respective index by higher layer parameter p0alphasetindex for a carrier f of a serving cell c, where the size of the set may be J=2 and may be indicated by a higher layer parameter (e.g., num-p0-alpha-sets).

$PL_{f,c}(q_d)$ may be a downlink path-loss estimate (e.g., in dB) calculated by the wireless device using reference signal (RS) resource $q_d$ for a carrier f of a serving cell c. The wireless device may be configured with a number of RS resources by one or more higher layer parameters (e.g., num-pusch-pathlossReference-rs) and a respective set of RS configurations for the number of RS resources may be provided by a higher layer parameter (e.g., pusch-pathloss-Reference-rs) that may comprise one or both of a set of SS/PBCH block indexes provided by a higher layer parameter (e.g., pusch-pathlossReference-SSB) and a set of CSI-RS configuration indexes provided by a higher layer parameter (e.g., pusch-pathlossReference-CSIRS). The wireless device may identify an RS resource in the set of RS resources that correspond to an SS/PBCH block or to a CSI-RS configuration as provided by a higher layer parameter (e.g., pusch-pathlossreference-index). The wireless device may use the RS resources indicated by a value of an SRI field in one or more DCI formats (e.g., DCI format 0_0 or DCI format 0_1) that may schedule the PUSCH transmission to obtain the downlink path-loss estimate, for example, if the wireless device is configured by a higher layer parameter (e.g., SRS-SpatialRelationInfo) a mapping between a set of SRS resources and a set of RS resources for obtaining a downlink path-loss estimate.

$PL_{f,c}(q_d)$ may be $PL_{f,c}(q_d)$=referenceSignalPower—higher layer filtered RSRP. referenceSignalPower may be provided by higher layers and RSRP may be defined for the reference serving cell and the higher layer filter configuration may be for the reference serving cell. For j=0 referenceSignalPower may be configured by a higher layer parameter (e.g., SS-PBCHBlockPower). For j>0, referenceSignalPower may be configured by a higher layer parameter (e.g., SS-PBCHBlockPower) or by, if periodic CSI-RS transmission is configured, a higher layer parameter (e.g., Pc-SS) providing an offset of the CSI-RS transmission power relative to the SS/PBCH block transmission power.

The wireless device may set $\Delta_{TF,f,c}(i)$ as $\Delta_{TF,f,c}(i)=10\log_{10}((2^{BPRE \cdot K_s}-1) \cdot \beta_{offset}^{PUSCH})$ for $K_s$=1.25 and $\Delta_{TF,f,c}(t)=0$ for $K_s$=0. $K_s$ may be provided by a higher layer parameter (e.g., deltaMCS-Enabled) provided for a carrier f and serving cell c. The wireless device may set $\Delta_{TF,f,c}(i)=0$, for example, if the PUSCH transmission is performed over more than one layers.

BPRE and $\beta_{offset}^{PUSCH}$, for a carrier f and a serving cell c, may be computed as below. The wireless device may set $$BPRE = \sum_{r=0}^{C-1} K_r/N_{RE}$$

for PUSCH with UL-SCH data and BPRE=$O_{CSI}/N_{RE}$ for CSI (e.g., periodic/aperiodic CSI and/or SP CSI) transmission in a PUSCH without UL-SCH data. C may be the number of code blocks, $K_r$ may be the size for code block r. $O_{CSI}$ may be the number of CSI part 1 bits comprising CRC bits, and $N_{RE}$ may be the number of resource elements determined as $N_{RE}=M_{RB,f,c}^{PUSCH}(i) \cdot M_{symb,f,c}^{PUSCH}$ excluding REs used for DM-RS transmission. $M_{symb,f,c}^{PUSCH}(i)$ may be a number of symbols for a PUSCH transmission period on a carrier f of a serving cell c and C, $K_r$ may be predefined and/or semi-statically configured. The wireless device may set $\beta_{offset}^{PUSCH}=1$, for example, if the PUSCH comprises UL-SCH data. The wireless device may set $\beta_{offset}^{PUSCH}=\beta_{offset}^{CSI,1}$, for example, if the PUSCH comprises CSI and does not include UL-SCH data.

For the PUSCH power control adjustment state for a carrier f of a serving cell c in a PUSCH transmission period i, $\delta_{PUSCH,f,c}(i-K_{PUSCH},l)$ may be a correction value, which may be a TPC command, and may be in a PDCCH with one or more DCI formats (e.g., DCI format 0_0 or DCI format 0_1) that may schedule the PUSCH transmission period on the carrier f of the serving cell c or jointly coded with other TPC commands in a PDCCH with one or more DCI formats (e.g., DCI format 2_2) having CRC parity bits scrambled by a particular RNTI (e.g., TPC-PUSCH-RNTI) that may be received by the wireless device prior to the PUSCH transmission.

For the PUSCH power control adjustment state for a carrier f of a serving cell c in a PUSCH transmission period i, $f_{f,c}(i,l)=f_{f,c}(i-1,l)+\delta_{PUSCH,f,c}(i-K_{PUSCH},l)$ may be the PUSCH power control adjustment state for the carrier f of the serving cell c and the PUSCH transmission period i, for example, if accumulation is enabled based on the parameter Accumulation-enabled provided by higher layers. $l \in \{1,2\}$ for example, if the wireless device is configured with a higher layer parameter (e.g., num-pusch-pcadjustment-states); otherwise, for example, l=1. For a PUSCH (re)transmission corresponding to a grant-free configuration or semi-persistent grant, the value of $l \in \{1,2\}$ may be provided to the wireless device by a higher layer parameter (e.g., PUSCH-closed-loop-index). The wireless device may set $\delta_{PUSCH,f,c}(i-K_{PUSCH},l)=0$ dB, for example, if the wireless device may not detect a TPC command for the carrier f of the serving cell c. The respective $\delta_{PUSCH,f,c}$ accumulated values may be predefined, for example, if the PUSCH transmission is based on or in response to a PDCCH decoding with a DCI format (e.g., DCI format 0_0 or DCI format 0_1, or 2_2) having CRC parity bits scrambled by a particular RNTI (e.g., TPC-PUSCH-RNTI).

FIG. 31 shows an example of $\delta_{PUSCH,f,c}$ accumulated values and absolute values. A TPC Command Field (e.g., in DCI format 0_0, DCI format 0_1, or DCI format 2_2, or DCI format 2_3 having CRC parity bits scrambled by a particular RNTI (e.g., TPC-PUSCH-RNTI or TPC-SRS-RNTI)) may be mapped to absolute $\delta_{PUSCH,c}$ value and/or accumulated $\delta_{PUSCH,c}$ value. $f_{f,c}(0,l)$ may be the first value after a reset of accumulation. Positive TPC commands for carrier f of serving cell c may not be accumulated, for example, if the wireless device has reached $P_{CMAX,f,c}(i)$ for the carrier f of the serving cell c. Negative TPC commands for the carrier f of the serving cell c may not be accumulated, for example, if the wireless device has reached minimum power for carrier f of serving cell c. The wireless device may reset accumulation for the carrier f of the serving cell c, for example, if $P_{O\_UE\_PUSCH,f,c}(1)$ value is changed by higher layers, and/or if $\alpha_{f,c}(j)$ value is changed by higher layers.

For the PUSCH power control adjustment state for a carrier f of a serving cell c in a PUSCH transmission period i, $f_{f,c}(i,l)=\delta_{PUSCH,f,c}(i-K_{PUSCH},l)$ may be the PUSCH power control adjustment state for the carrier f of the serving cell c and the PUSCH transmission period, for example, if the accumulation is not enabled based on a particular parameter (e.g., Accumulation-enabled) provided by higher layers. The respective $\delta_{PUSCH,c}$ values may be predefined (e.g., in FIG. 21), for example, if the PUSCH transmission is based on or in response to a PDCCH decoding with a DCI format (e.g., DCI format 0_0 or DCI format 0_1, or 2_2) having CRC parity bits scrambled by a particular RNTI (e.g., TPC-PUSCH-RNTI). The wireless device may set $f_{f,c}(i,l)=f_{f,c}(i-1,l)$ for a PUSCH transmission period, for example, if the wireless device does not detect a DCI format (e.g., DCI format 0_0 or DCI format 0_1, or 2_2) having CRC parity bits scrambled by a particular RNTI (e.g., TPC-PUSCH-RNTI) for carrier f of serving cell c.

For the PUSCH power control adjustment state for a carrier f of a serving cell c in a PUSCH transmission period i, for both types of $f_{f,c}(*)$ (the accumulated or the current absolute values) the first value may be set as follows: The wireless device may set $f_{f,c}(0,l)=0$, for example, if $P_{O\_UE\_PUSCH,f,c}(j)$ value is changed by higher layers and serving cell c is the primary cell and/or if $P_{O\_UE\_PUSCH,f,c}(j)$ value is received by higher layers and the serving cell c is a secondary cell; Else, the wireless device may set $f_{f,c}(0,l)=\Delta P_{rampup,f,c}+\delta_{msg2,f,c}$ for example, if the wireless device receives the random access response message for the carrier f of the serving cell c $\delta_{msg2,f,c}$ may be the TPC command indicated in the random access response corresponding to the random access preamble transmitted for the carrier f in the serving cell c, and $$\Delta P_{rampup,f,c} = \\ \left[\min\left\{\max\left(0, P_{CMAX,f,c} - \begin{pmatrix} 10\log_{10}(2^\mu \cdot M_{RB,f,c}^{PUSCH}(0)) + \\ P_{O\_PUSCH,f,c}(0) + \alpha_{f,c}(0) \cdot PL_c + \\ \Delta_{TF,f,c}(0) + \delta_{msg2,f,c} \end{pmatrix}\right)\right.\right., \\ \left.\Delta P_{rampuprequested,c}\right] \cdot \Delta P_{rampuprequested,f,c}$$

may be provided by higher layers and may correspond to the total power ramp-up requested by higher layers from the first to the last random access preamble for carrier f in the serving cell c. $M_{RB,f,c}^{PUSCH}(0)$ may be the bandwidth of the PUSCH resource assignment expressed in number of resource blocks for the first PUSCH transmission in carrier f of the serving cell c. $\Delta_{TF,f,c}(0)$ may be the power adjustment of first PUSCH transmission in the carrier f of the serving cell c.

The wireless device may apply the procedures for MCG and SCG, for example, if the wireless device is configured with an SCG. The term 'serving cell' may refer to serving cell belonging to an MCG, for example, if the procedures are used for the MCG. The term 'serving cell' may refer to serving cell belonging to an SCG, for example, if the procedures are used for the SCG. The term 'primary cell' may refer to the PSCell of the SCG. The wireless device may use the procedures for a primary PUCCH group and a secondary PUCCH group, for example, if the wireless device is configured with a PUCCH-SCell. The term 'serving cell' may refer to a serving cell belonging to the primary PUCCH group, for example, if the procedures are used for the primary PUCCH group. The term 'serving cell' may refer to a serving cell belonging to the secondary PUCCH group, for example, if the procedures are used for the secondary PUCCH group. The term 'primary cell' may refer to the PUCCH-SCell of the secondary PUCCH group.

A wireless device may determine a PUCCH transmission power $$P_{PUCCH,f,c}(i, q_u, q_d, l)$$

in a PUCCH transmission period i as $$P_{PUCCH,f,c}(i, q_u, q_d, l) = \min \left\{ \begin{array}{l} P_{CMAX,f,c}(i), \\ P_{O\_PUCCH,f,c}(q_u) + PL_{f,c}(q_d) + \Delta_{F\_PUCCH}(F) + \\ \Delta_{TF,f,c}(i) + g_{f,c}(i, l) \end{array} \right\} [dBm],$$

for example, if the wireless device transmits the PUCCH on a carrier f in the primary cell c using PUCCH power control adjustment state with index l.

$P_{CMAX,f,c}(i)$ may be the configured wireless device transmit power for a carrier f of a serving cell c in a PUCCH transmission period i.

$P_{O\_PUCCH,f,c}(q_u)$ may be a parameter comprising the sum of a component $P_{O\_NOMINAL\_PUCCH}$, provided by a higher layer parameter (e.g., P0-nominal-PUCCH) for a carrier f of a primary cell c, and a component $P_{O\_UE\_PUCCH}(q_u)$ provided by a higher layer parameter (e.g., P0-PUCCH), where $0 \leq q_u < Q_u$, $Q_u$ may be a size for a set of $P_{O\_UE\_PUCCH}$ values provided by a higher layer parameter (e.g., num-p0-pucch). The set of $P_{O\_UE\_PUCCH}$ values may be provided by a higher layer parameter (e.g., p0-pucch-set).

$PL_{f,c}(q_d)$ may be a downlink path-loss estimate (e.g., in dB) calculated by the wireless device for a carrier f of the primary cell c using RS resource $q_d$, where $0 \leq q_d < Q_d$. $Q_d$ may be a size for a set of RS resources provided by a higher layer parameter (e.g., num-pucch-pathlossReference-rs). The set of RS resources may be provided by a higher layer parameter (e.g., pucch-pathlossReference-rs). The set of RS resources may comprise one or both of a set of SS/PBCH block indexes provided by a higher layer parameter (e.g., pucch-pathlossReference-SSB) and a set of CSI-RS configuration indexes provided by a higher layer parameter (e.g., pucch-pathlossReference-CSIRS). The wireless device may identify an RS resource in the set of RS resources that corresponds to an SS/PBCH block or to a CSI-RS configuration as provided by a higher layer parameter (e.g., pucch-pathlossreference-index).

The parameter $\Delta_{F\_PUCCH}(F)$ may be provided by a higher layer parameter (e.g., deltaF-pucch-f0) for a first PUCCH format (e.g., PUCCH format 0), deltaF-pucch-f1 for a second PUCCH format (e.g., PUCCH format 1), deltaF-pucch-f2 for a third PUCCH format (e.g., PUCCH format 2), deltaF-pucch-f3 for a fourth PUCCH format (e.g., PUCCH format 3), and deltaF-pucch-f4 for a fifth PUCCH format (e.g., PUCCH format 4). $\Delta_{TF,f,c}(i)$ may be a PUCCH transmission power adjustment component for a carrier f of a primary cell c.

For the PUCCH power control adjustment state for a carrier f of a primary cell c and a PUCCH transmission period i, $\delta_{PUCCH,f,c}(i-K_{PUCCH},l)$ may be a correction value, which may be a TPC command, and may be in a PDCCH with a DCI format (e.g., DCI format 1_0 or DCI format 1_1) for the carrier f of the primary cell c that the wireless device may detect in PUCCH transmission period $i-K_{PUCCH}$, or jointly coded with one or more TPC commands in a PDCCH with a DCI format (e.g., DCI format 2_2) having CRC parity bits scrambled by a particular RNTI (e.g., TPC-PUCCH-RNTI) and $l \in \{1,2\}$ as indicated by a higher layer parameter (e.g., num-pucch-pcadjustment-states). The $\delta_{PUCCH,f,c}$ (e.g., in dB) values signaled on a PDCCH with a DCI format (e.g., DCI format 1_0 or DCI format 1_1 or DCI format 2_2) having CRC parity bits scrambled by a particular RNTI (e.g., TPC-PUCCH-RNTI) may be predefined.

FIG. 32 shows an example of a $\delta_{PUCCH,f,c}$ dB values. A TPC Command Field in a DCI format (e.g., DCI format 1_0 or DCI format 1_1 or DCI format 2_2) having CRC parity bits scrambled by a particular RNTI (e.g., TPC-PUCCH-RNTI) may be mapped to the accumulated $\delta_{PUCCH,c}$ values. The wireless device may set $\delta_{PUCCH,f,c}(i-K_{PUCCH},l)=0$ dB, for example, if the wireless device does not detect a TPC command for a carrier f of the primary cell c.

$g_{f,c}(i,l)=g_{f,c}(i-1,l)+\delta_{PUCCH,f,c}(i-K_{PUCCH},l)$ may be the current PUCCH power control adjustment state and $g_{f,c}(0,l)=0$ may be the first value after a reset, for example, for the PUCCH power control adjustment state for a carrier f of a primary cell c and a PUCCH transmission period i. The wireless device may set $g_{f,c}(0,l)=0$, for example, if $P_{O\_UE\_PUCCH,f,c}$ value is changed by higher layers; Else, for example, the wireless device may set $g_{f,c}(0,l)=\Delta P_{rampup,f,c}+\delta_{msg2,f,c}.\delta_{msg2,f,c}$ may be the TPC command indicated in the random access response corresponding to the random access preamble transmitted for the carrier f in the serving cell c. The wireless device may set $\Delta P_{rampup,f,c}=\min[\{\max(0,P_{CMAX,f,c}-(P_{O\_PUCCH,f,c}+PL_c+\Delta_{F\_PUCCH}(F)+\Delta_{TF,f,c}+\delta_{msg2,f,c}))\},\Delta P_{rampuprequested,f,c}]$, for example, if the wireless device transmits PUCCH; otherwise, for example, the wireless device may set $\Delta P_{rampup,f,c}=\min[\{\max(0,P_{CMAX,f,c}-(P_{O\_PUCCH,f,c}+PL_c))\},\Delta P_{rampuprequested,f,c}]$.

$\Delta P_{rampuprequested,f,c}$ be provided by higher layers and may correspond to the total power ramp-up requested by higher layers from the first to the last preamble for the carrier f in primary cell c, and $\Delta_{F\_PUCCH}(F)$ may correspond to a first PUCCH format (e.g., PUCCH format 0) or a second PUCCH format (e.g., PUCCH format 1). The $\delta_{PUSCH,c}$ accumulated values may be predefined (e.g., in FIG. 21), for example, if the PUSCH transmission is based on or in response to a PDCCH detection with a DCI format (e.g., DCI format 1_0 or DCI format 1_1). The wireless device may not accumulate positive TPC commands for the carrier f in the primary cell c, for example, if the wireless device has reached $P_{CMAX,c}(i)$ for the carrier f in the primary cell c. The wireless device may not accumulate negative TPC commands for the carrier f in the primary cell c, for example, if the wireless device has reached minimum power for the carrier f in the primary cell c. The wireless device may reset accumulation for the carrier f in the primary cell c, for example, if $P_{O\_UE\_PUCCH,f,c}$ value is changed by higher layers.

For a transmit power control of an SRS, the linear value $\hat{P}_{SRS,f,c}(i,q_s,l)$ of the transmit power $P_{SRS,f,c}(i,q_s,l)$ may be split equally across the configured antenna ports for SRS. A wireless device may determine the SRS transmission power $P_{SRS,f,c}(i,q_s,l)$ in SRS transmission period i as $$P_{SRS,f,c}(i, q_s, l) = \min\left\{\begin{array}{l} P_{CMAX,f,c}(i), \\ P_{O\_SRS,f,c}(q_s) + 10\log_{10} \\ (2^\mu \cdot M_{SRS,f,c}(i)) + \alpha_{SRS,f,c}(q_s) \cdot \\ PL_{f,c}(q_s) + h_{f,c}(i, l) \end{array}\right\} [dBm],$$

for example, if the wireless device transmits the SRS on a carrier f of a serving cell c using SRS power control adjustment state with index l.

$P_{CMAX,f,c}(j)$ may be the configured wireless device transmit power for a carrier f of a serving cell c in an SRS transmission period i. $P_{O\_SRS,f,c}(q_s)$ may be provided by a higher layer parameter (e.g., p0-srs) for an SRS resource set $q_s$. $M_{SRS,f,c}(i)$ may be the SRS bandwidth expressed in number of resource blocks for the SRS transmission period on the carrier f of the serving cell c and may be predefined and/or semi-statically configured. $\alpha_{SRS,f,c}(q_s)$ may be provided by a higher layer parameter (e.g., alpha-srs) for the SRS resource set $q_s$.

$PL_{f,c}(q_s)$ may be a downlink path-loss estimate (e.g., in dB) calculated by the wireless device for a carrier f of a serving cell c and an SRS resource set $q_s$ using an RS resource provided by a higher layer parameter (e.g., srs-pathlossReference-rs). The RS resource may be selected from a set of RS resources that may comprise a set of SS/PBCH block indexes provided by a higher layer parameter (e.g., srs-pathlossReference-SSB) and a set of CSI-RS configuration indexes provided by a higher layer parameter (e.g., srs-pathlossReference-CSIRS).

For the SRS power control adjustment state for a carrier f of a serving cell c and an SRS transmission period i, the wireless device may set $h_{f,c}(i,l)=f_{f,c}(i,l)$, for example, if a higher layer parameter (e.g., srs-pcadjustment-state-config) indicate a same power control adjustment state for SRS transmissions and PUSCH transmissions.

For the SRS power control adjustment state for a carrier f of a serving cell c and an SRS transmission period the wireless device may set $h_{f,c}(i)=h_{f,c}(i-1)+\delta_{SRS,f,c}(i-K_{SRS})$ for example, if a higher layer parameter (e.g., srs-pcadjustment-state-config) indicates a separate power control adjustment state between SRS transmissions and PUSCH transmissions and/or if the accumulation is enabled based on a particular parameter (e.g., Accumulation-enabled-srs) provided by higher layers. $\delta_{SRS,f,c}(i-K_{SRS})$ may be jointly coded with other TPC commands in a PDCCH with a DCI format (e.g., DCI format 2_3) having CRC parity bits scrambled by a particular RNTI (e.g., TPC-SRS-RNTI) that may be received by the wireless device prior to the SRS transmission and accumulative values of $\delta_{SRS,f,c}(i-K_{SRS})$ may be predefined (e.g., in FIG. 21). The wireless device may set $\delta_{SRS,f,c}(i-K_{SRS})$ (e.g., in dB), for example, if the wireless device does not detect a TPC command for serving cell c. $h_{f,c}(0)$ may be the first value after a reset of the accumulation. Positive TPC commands for the serving cell c may not be accumulated, for example, if the wireless device has reached $P_{CMAX,f,c}(l)$ for the carrier f of the serving cell c. Negative TPC commands may not be accumulated, for example, if the wireless device has reached minimum power for the carrier f of the serving cell c. A wireless device may reset accumulation for the carrier f of the serving cell c, for example, if $P_{O\_SRS,f,c}$ value is changed by higher layers and/or if $\alpha_{SRS,f,c}$ value is changed by higher layers.

For the SRS power control adjustment state for a carrier f of a serving cell c and an SRS transmission period i, the wireless device may set $h_{f,c}(i)=\delta_{SRS,f,c}(i-K_{SRS})$, for example, if a higher layer parameter (e.g., srs-pcadjustment-state-config) indicates a separate power control adjustment state between SRS transmissions and PUSCH transmissions and/or if the accumulation is not enabled based on a parameter (e.g., Accumulation-enabled-srs) provided by higher layers, jointly coded with other TPC commands in a PDCCH with a DCI format (e.g., DCI format 2_3) having CRC parity bits scrambled by a particular RNTI (e.g., TPC-SRS-RNTI) that may be received by the wireless device prior to the SRS transmission and absolute values of $\delta_{SRS,f,c}(i-K_{SRS})$ may be predefined (e.g., in FIG. 21). The $\delta_{PUSCH,c}$ absolute values may be predefined (e.g., in FIG. 21), for example, if a DCI format (e.g., DCI format 2_3) has CRC scrambled by a particular RNTI (e.g., TPC-SRS-RNTI). The wireless device may set $h_{f,c}(i)=h_{f,c}(i-1)$ for an SRS transmission period i, for example, if the wireless device does not detect a DCI (e.g., DCI format 2_3) having CRC scrambled by a particular RNTI (e.g., TPC-SRS-RNTI) for carrier f of serving cell c.

A wireless device may determine a beam failure associated with one or more cells and initiate a BFRQ procedure. A BFRQ procedure may comprise transmission, by the wireless device, of a BFRQ signal via resources of a cell. Such a procedure may have disadvantages. For example, a preamble transmitted as part of a BFRQ signal may be transmitted in the cell in which the beam failure was detected. If a beam associated with a cell has failed, it is likely that the cell may experience other link problems. A wireless device may, for example, determine a beam failure associated with a downlink channel of a cell. The cause of the beam failure may often also affect uplink channels for that cell, thereby preventing the wireless device from sending a BFRQ signal as part of a BFRQ procedure. If a beam failure is detected in a cell without a configured uplink (e.g., an SCell), a wireless device may be unable to initiate a BFRQ procedure for that cell.

A BFRQ procedure preamble may be transmitted by a PHY layer of the wireless device. This may limit resources available to transmit a BFRQ signal in connection with a BFRQ procedure. If there are insufficient resources to allow dedication of a transmission of the BFRQ signal to the wireless device (e.g., in an SCell), a wireless device may be instructed to perform more time-consuming procedures (e.g., a contention-based procedure).

Some or all of these disadvantages may be avoided, and/or other advantages achieved, by reporting a BFRQ signal and/or an indicator of a beam failure using a MAC CE. A MAC CE may be transmitted via any cell in which an uplink is configured. This may allow a wireless device to indicate a BFRQ signal and/or an indicator of a beam failure of a cell via a transmission in a different cell. Reporting a BFRQ signal and/or an indicator of a beam failure using a MAC CE may facilitate reporting by a layer of the wireless device (e.g., the MAC layer 235 shown in FIG. 2B) different from a layer (e.g., the PHY layer 236) in which beam failure may be detected and in which other BFRQ procedures may be performed. Reporting a BFRQ signal and/or an indicator of a beam failure using a MAC CE may make additional transmission resources available for, and/or provide increased transmission scheduling flexibility in connection with, beam failure recovery.

Reporting a BFRQ signal and/or an indicator of a beam failure using a MAC CE may reduce the chance of link failure and/or may help avoid delays in recovering from a beam failure if an existing BFRQ procedure (e.g., transmitting a preamble via RACH resources) is unsuccessful. A BFRQ procedure, performed by a wireless device, may be unsuccessful for various reasons. A BFRQ procedure may fail based on no response being received from a base station (e.g., a gNB), based on no candidate beam being identified, based on an expiry of a beam failure recovery timer, and/or a combination thereof. For example, a beam failure recovery timer may start if a wireless device determines a beam failure detection event. The wireless device may determine the beam failure detection event based on one or more beam failure detections (or instances) based on one or more measurements (e.g., BLER, RSRP, and/or RSRQ) on one or more beams (e.g., a DL serving beam). A wireless device may stop a beam failure recovery timer based on a response, transmitted by a base station, that corresponds to a BFRQ signal and/or an indicator of a beam failure that the wireless device transmits during a BFRQ procedure. A wireless device performing a BFRQ procedure to recover from a beam failure detected on a cell may attempt one or more BFRQ signal transmissions (e.g., one or more preamble transmissions) via BFRQ resources of that cell. If no response from the base station is received before timer expiry, the BFRQ procedure may fail.

In an existing BFRQ procedure, a wireless device may detect a beam failure on one or more (serving) beams on a cell but may fail to identify at least one candidate beam of the cell. There may, for example, be no beam associated with a BFRQ preamble/resource having a BLER or RSRP higher than a pre-determined (e.g., based on previously-received BFRQ parameters) threshold. If no candidate beam is determined, the wireless device may wait until a next available transmission of DL reference signals configured on the cell and may try to identify at least one candidate beam based on the DL reference signals. However, waiting for the next available transmission may result in a prolonged delay to recover from a beam failure. In an existing BFRQ procedure, based on failing to identify at least one candidate beam on a cell and/or other reason for BFRQ procedure failure, a wireless device may also or alternatively start a contention based RACH procedure on the cell. As part of a RACH procedure, the wireless device may compete with one or more other wireless devices to successfully transmit at least one preamble as a BFRQ signal to a base station, and/or to receive a response from the base station corresponding that BFRQ signal, during the contention based RACH procedure. The wireless device may be unable to successfully complete the BFRQ procedure because of contention between the wireless device and the one or more other wireless devices.

If a wireless device triggers a BFRQ procedure, and/or if the wireless devices determines a beam failure detection event and/or a beam failure recovery timer starts, it may be beneficial if the wireless device informs a base station of a BFRQ signal and/or an indicator of a beam failure via one or more neighbor cells (e.g., a PCell, a PSCell, and/or an SCell) of the cell associated with the beam failure, and/or beneficial if the wireless device informs the base station of a BFRQ signal and/or an indicator of the beam failure via a layer different from the PHY layer (e.g., a MAC layer). Transmitting a BFRQ signal and/or an indicator of a beam failure of a cell via one or more neighbor cells and/or via a different layer may increase a possibility that a base station may detect a problem on the cell (e.g., based on diversified medium/channels to transmit the BFRQ signal and/or the indicator). Transmitting a BFRQ signal and/or an indicator of a beam failure of a cell via one or more neighbor cells and/or via a different layer may allow a base station to detect a problem on the cell and to transmit a response (and/or take other action) if the base station fails to detect at least one preamble transmitted by a wireless device as part of a BFRQ procedure in an existing BFRQ procedure.

Transmitting a BFRQ signal and/or an indicator of a beam failure of a cell via one or more neighbor cells and/or via a different layer may allow beam failure recovery that might not otherwise be possible. If, for example, a wireless device detects a DL beam failure for an SCell without an activated UL associated with a wireless device, the wireless device may not be able to take action using a BFRQ procedure in that SCell. The wireless device may be able to transmit one or more preambles for a BFRQ via one or more resources configured on a PCell, but if a base station does not have enough dedicated preambles assigned to the wireless device, the base station may indicate to the wireless device (e.g., via one or more RRC messages) to perform a contention based RACH procedure on the PCell. However, by transmitting a BFRQ signal and/or an indicator of a beam failure of the SCell via one or more other neighbor cells (e.g., a cell other than the PCell without sufficient assigned preambles) and/or via a different layer, the wireless device may inform the base station of the beam failure without performing the contention based procedure in the PCell.

Conditions causing a beam failure may trigger, and/or may coincide with, other conditions that trigger, a PHR. A wireless device may trigger a PHR during a BFRQ procedure, for example, if a PHR prohibit timer expires (or has expired) and there is a large change of pathloss. A change in pathloss triggering a BFRQ procedure may be based, for example, on a comparison with an RRC configured threshold (e.g., phr-Tx-PowerFactorChange). A beam failure may result in a large change of pathloss. A wireless device may trigger a PHR based on one or more of: an expiry of a PHR periodic timer during a BFRQ procedure, detecting at least one beam failure instance, determining a beam failure detection event, starting a beam failure recovery timer, an expiry of a beam failure recovery timer, and/or determining a failure of a BFRQ procedure.

If a wireless device triggers a PHR and receives no response from a base station corresponding to a BFRQ procedure (e.g., if the wireless device receives no response to at least one BFRQ procedure preamble transmission), the wireless device may inform the base station of a BFRQ signal and/or an indicator of a beam failure of a cell via the PHR. A wireless device may (e.g., depending on PHR configuration parameters) trigger a PHR that uses a single entry PHR MAC CE (e.g., as shown in FIG. 23A), that uses an SUL single entry PHR MAC CE (e.g., as shown in FIG. 23B), that uses a multiple entry PHR MAC CE (e.g., as shown in FIG. 25 and/or FIG. 26), that uses an SUL multiple entry PHR MAC CE (e.g., as shown in FIG. 27 and/or FIG. 28), and/or that uses another type of PHR MAC CE. A wireless device may also or alternatively inform a base station of a BFRQ signal and/or an indicator of a beam failure, via a PHR MAC CE, prior to, instead of, or during a BFRQ procedure. A wireless device may also or alternatively inform a base station of a BFRQ signal and/or an indicator of a beam failure using any other type of MAC CE (e.g., a MAC CE not used for a PHR).

A wireless device may use one or more reserved bits of a PHR MAC CE (e.g., one or more of the R fields shown in FIG. 23A, FIG. 23B, FIG. 25, FIG. 26, FIG. 27, and/or FIG. 28) to indicate a BFRQ signal and/or an indicator of a beam failure. For example, the reserved bits of the PHR MAC CE may be used to indicate whether a beam failure is detected for the cell. For example, R=0 may indicate no beam failure of a cell, and R=1 may indicate a beam failure of a cell (or vice versa).

Figure 33A:
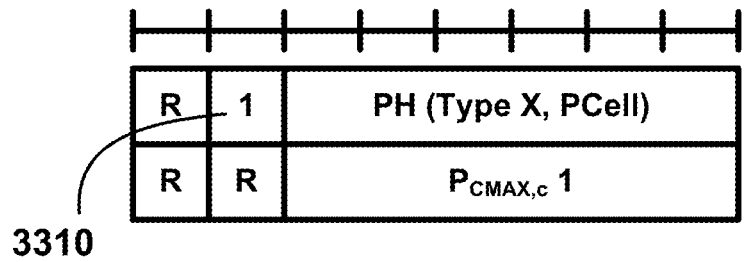
FIG. 33A and FIG. 33B show examples of PHR MAC CEs indicating beam failures.

FIG. 33A shows an example of a single entry PHR MAC CE, similar to the single entry PHR MAC CE of FIG. 23A, that may be used to report a BFRQ signal and/or an indicator of a beam failure. One or more R fields in (e.g., one or more of the R fields shown in FIG. 23A, FIG. 24A, and/or FIG. 33A) may be used to indicate the BFRQ signal and/or an indicator of the beam failure (e.g., an indication of at least one candidate beam and/or presence or absence of the beam failure of a corresponding cell). FIG. 33A is an example BFRQ signal and/or an indicator of the beam failure. A field 3310, which is an R field in FIG. 23A, may comprise a 1 bit to indicate a beam failure in the cell associated with the single entry PHR MAC CE. Any of the other R field bits may also or alternatively be used to indicate a BFRQ signal and/or an indicator of a beam failure. A 0 bit in field 3310 (and/or in other R fields) may indicate the absence of a beam failure.

Figure 33B:
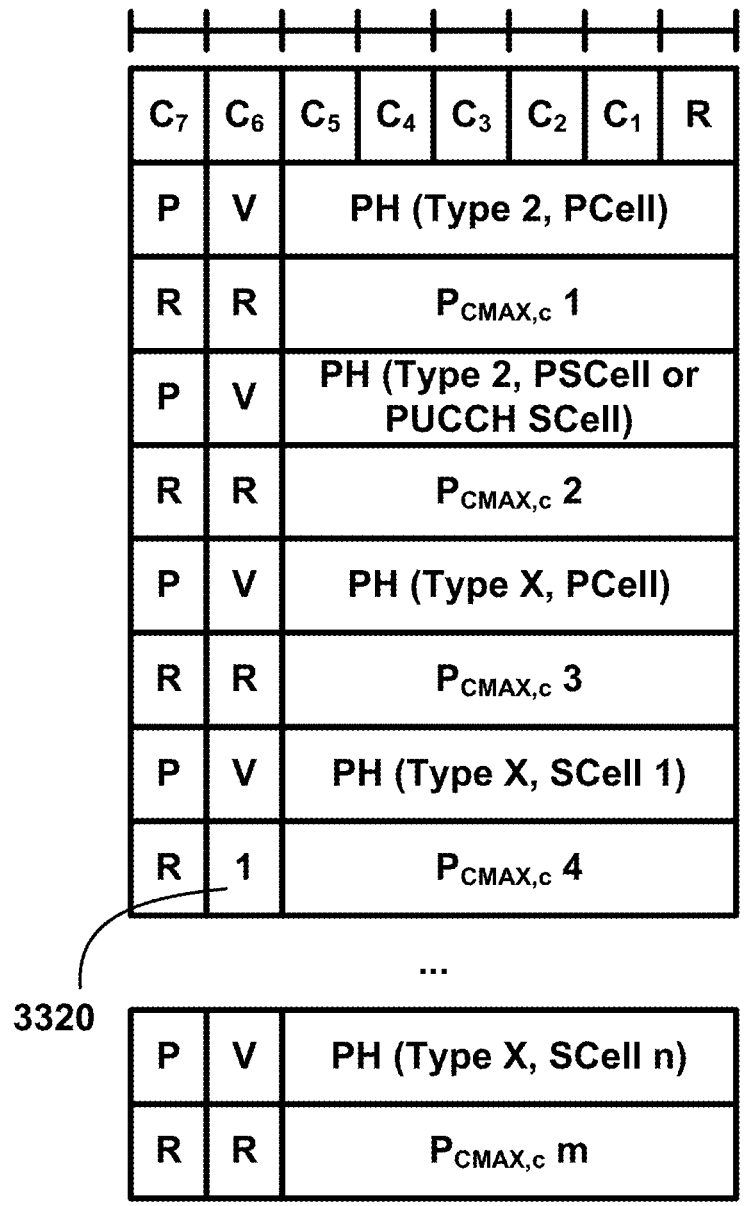

FIG. 33B shows an example of a multiple entry PHR MAC CE, similar to the multiple entry PHR MAC CE shown in FIG. 25, that may be used to report a BFRQ signal and/or an indicator of a beam failure. One or more R fields in (e.g., one or more of the R fields shown in FIG. 25 and/or FIG. 33B) may be used to indicate the BFRQ signal and/or an indicator of the beam failure (e.g., an indication of at least one candidate beam and/or presence or absence of the beam failure of a corresponding cell). FIG. 33B is an example BFRQ signal and/or an indicator of the beam failure. A field 3320, which field is an R field in FIG. 25, comprises a 1 bit to indicate a beam failure in the cell associated with SCell1. One or more additional fields of the multiple entry PHR MAC CE may indicate the cell associated with the beam failure. For example, the location of the field 3320 may correspond to the $C_i$ index (where i=1, . . . , 7 in FIG. 33B) in the bitmap field, thereby indicating that the cell associated with the $C_i$ index is experiencing the beam failure. Any of the other R field bits may also or alternatively be used to indicate a beam failure. A 0 bit in field 3320 (and/or in other R fields) may indicate the absence of a beam failure.

Other fields of other PHR MAC CEs may be used. In a multiple entry PHR MAC CE similar to that shown in FIG. 26, for example, a wireless device may use the first R field (e.g., preceding the $C_i$ index bits of the bitmap indicating the BFRQ signal and/or an indicator of the beam failure (e.g., an indication of at least one candidate beam and/or presence or absence of the beam failure of a corresponding cell) of 32 cells) to indicate whether the wireless device detects a beam failure in a PCell. Other R fields may be used to indicate a BFRQ signal and/or an indicator of a beam failures in other cells. In an SUL single/multiple entry PHR MAC CE similar to that shown in FIG. 28, for example, a wireless device may use one or more reserved bits associated with a non-SUL carrier and/or an SUL carrier. One or both of the two reserved bits (R fields) in the octet comprising $P_{CMAX,c}$ 1, and/or one or both of the two reserved bits in the octet comprising $P_{CMAX,c}$ 3, may be used by a wireless device as to indicate a BFRQ signal and/or an indicator of a beam failure on the PCell.

A PH value transmitted with an indicator of a beam failure in a PHR MAC CE may be at least one of a first type real PH, a first type virtual PH, a second type real PH, a second type virtual PH, a third type real PH, and/or a third type virtual PH. For a cell configured with an SUL carrier, a wireless device may, for example, transmit a third type real PH (if an SRS is scheduled) or a third type virtual PH (if an SRS is not scheduled) in the corresponding PH field associated with the SUL carrier of the cell. For a cell configured with or without an SUL carrier, a wireless device may, for example, transmit a first type real PH (if a PUSCH and/or a PUCCH is scheduled) or a first type virtual PH (if a PUSCH or a PUCCH is not scheduled) in the corresponding PH field associated with a non-SUL carrier of the cell. For a cell configured with a PUCCH, a wireless device may, for example, transmit a second type real PH (if a PUSCH or a PUCCH is scheduled) or a second type virtual PH (if a PUSCH or a PUCCH is not scheduled) in the corresponding PH field associated with a carrier configured with the PUCCH of the cell.

A wireless device may determine a PH (e.g., at least one of a first type real PH, a first type virtual PH, a second type real PH, a second type virtual PH, a third type real PH, and/or a third type virtual PH) if, for example, a PHR prohibit timer expires (or has expired), and there is a large change of pathloss (e.g., determined based on comparing with an RRC configured threshold (e.g., phr-Tx-PowerFactorChange)). A wireless device may determine a PH (e.g., at least one of a first type real PH, a first type virtual PH, a second type real PH, a second type virtual PH, a third type real PH, and/or a third type virtual PH) based on an expiry of a PHR periodic timer during a BFRQ procedure (e.g., based on one or more of: detecting at least one beam failure instance, determining a beam failure detection event, starting a beam failure recovery timer, determining a failure of a BFRQ procedure, and/or one or more other determinations or events).

A wireless device may transmit a MAC CE (e.g., a PHR MAC CE) via at least one UL resource available after the wireless device triggers the MAC CE and/or after the wireless device determines one or more fields (e.g., PH values) in the MAC CE. A wireless device may cancel, abandon, clear, and/or suspend a triggered transmission of MAC CE (e.g., a PHR MAC CE) based on a successful completion of a BFRQ procedure prior to transmitting the triggered transmission of MAC CE. Based on a successful completion of a BFRQ procedure prior to transmitting a triggered transmission of a MAC CE (e.g., a PHR MAC CE), a wireless device may cancel, abandon, clear, and/or suspend the triggered transmission of the MAC CE and/or may (re)trigger a transmission of a MAC CE with an indicator associated with the BFRQ procedure being changed to indicate no beam failure.

A wireless device configured with a carrier aggregation with a plurality of cells, transmitting a BFRQ signal and/or an indicator of beam failure via a MAC CE (e.g., a PHR MAC CE), may advantageously inform a base station of one or more BFRQ signals and/or indicator(s) of beam failures of one or more serving cells via the MAC CE. This may facilitate power saving by allowing a wireless device to drop at least one BFRQ preamble because of insufficient transmit power in an existing BFRQ procedure (e.g., if parallel transmissions across a plurality of cells associated with the wireless device are triggered).

Operations of a base station may be advantageously affected by reporting of a BFRQ signal and/or an indicator of a beam failure via one or more fields in a MAC CE (e.g., a PHR MAC CE). The base station may use a BFRQ signal, an indicator of a beam failure, and/or a PH value transmitted by a wireless device, for example, to allocate a UL grant (e.g., a resource size and/or an MCS) and/or to determine a transmit power command for the wireless device.

Figure 34:
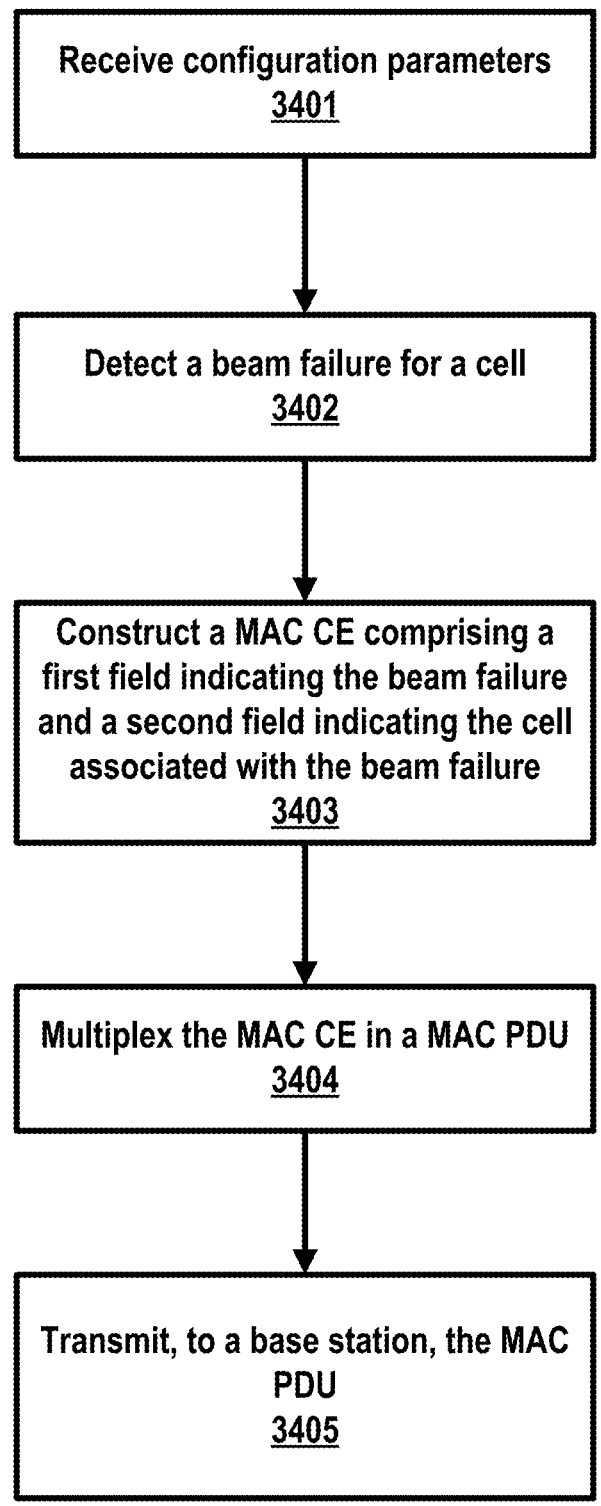
FIG. 34 shows an example beam failure reporting procedure.

FIG. 34 shows an example beam failure reporting procedure. One or more of the steps shown in FIG. 34 may be performed by a wireless device and/or by one or more other devices. One or more of the steps shown in FIG. 34 may be modified, omitted, and/or rearranged. One or more other steps may be added.

In step 3401, one or more configuration parameters may be received. The configuration parameters may be received in one or more messages and may comprise any of the configuration parameters, and be received via any of the messages, described herein. The configuration parameters may comprise PHR parameters, BFRQ parameters, and/or other parameters. In step 3402, a beam failure may be detected for a cell. The beam failure may be detected for a downlink control channel or for any other downlink or uplink channel. The cell may be a PCell, and SCell, and/or any other type of cell. The beam failure may be detected based on a BLER and/or other value.

In step 3403, a MAC CE may be constructed. The MAC CE may be a PHR MAC CE or may be another type of MAC CE. The MAC CE may comprise one or more first fields having values, that indicate one or more BFRQ signals (e.g., candidate beam indices) and/or one or more beam failure indications, and one or more second fields that indicate one or cells associated with the one or more beam failures. In step 3404, the MAC CE may be multiplexed in a MAC PDU (e.g., as shown in FIG. 21A). In step 3405, the MAC PDU comprising the MAC CE may be transmitted (e.g., to a base station) via one or more cells. The MAC PDU may be transmitted to a base station via a cell not experiencing a beam failure (e.g., via a cell other than the one or more cells associated with the one or more beam failures).

Figure 35:
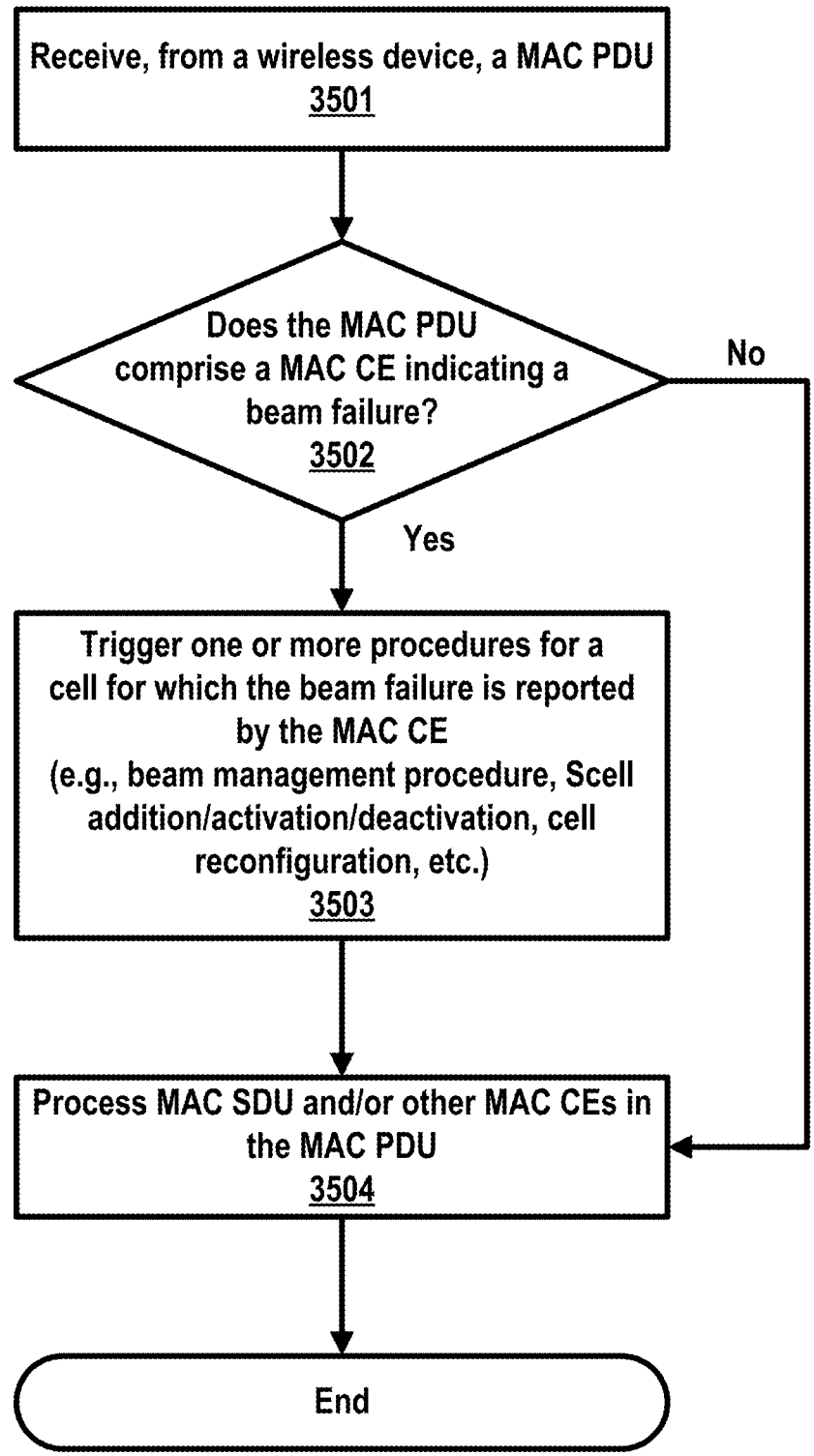
FIG. 35 shows an example beam failure reporting procedure.

FIG. 35 shows another example beam failure reporting procedure. One or more of the steps shown in FIG. 35 may be performed by a base station and/or by one or more other devices. One or more of the steps shown in FIG. 35 may be modified, omitted, and/or rearranged. One or more other steps may be added.

In step 3501 a MAC PDU may be received (e.g., from a wireless device). The MAC PDU may comprise one or more MAC CEs. In step 3402, it may be determined whether the MAC PDU comprises a MAC CE indicating one or more BFRQ signals and/or one or more beam failure indicators for one or more serving cells. Such a MAC CE may be a PHR MAC CE and/or other type of MAC CE. If the MAC PDU is determined not to comprise a MAC CE indicating one or more BFRQ signals and/or one or more beam failures, step 3404 (described below) may be performed. If the MAC PDU is determined to comprise a MAC CE indicating one or more BFRQ signals and/or one or more beam failures, step 3403 may be performed.

As part of step 3403, one or more cells associated with the one or more BFRQ signals and/or the one or more beam failures indicated by the MAC CE may be identified. Those cells may be identified based on other fields of the MAC CE and/or based on other MAC CEs in the PDU and/or based on other data. Based on those indicated beam failure(s) on one or more beams and/or on the identified cell(s), one or more procedures may be triggered for one or more of the identified cell(s). The triggered procedures may comprise one or more beam management procedures, one or more SCell additions, activations, and/or deactivations, one or more cell reconfigurations, and/or one or more other procedures. In step 3404, other parts of the MAC PDU (e.g., one or more other MAC CEs and/or one or more MAC SDUs) may be processed.

Any or all of the steps of FIG. 34 and/or of FIG. 35 may be performed before initiation of a BFRQ procedure for a beam failure detected or reported as part of the reporting procedure of FIG. 34 and/or of FIG. 35, during such a BFRQ procedure (e.g., before that BFRQ procedure has failed or otherwise completed), after a failure (or other completion) of such a BFRQ procedure, or instead of such a BFRQ procedure.

A wireless device may receive, from a base station, one or more messages comprising configuration parameters of one or more cells. The wireless device may determine a power headroom (PH) value for a cell of the one or more cells. The wireless device may transmit a power headroom report (PHR) comprising: a first field indicating the PH value of the cell; and/or a second field indicating whether the wireless device performs a beam failure recovery procedure for the cell when the PH value is determined. The beam failure recovery procedure may comprise detecting a beam failure, identifying at least one candidate beam, and/or monitoring a control channel for a corresponding response from a base station. The configuration parameters may comprise at least one PH configuration parameter and at least one beam failure detection configuration parameter. The at least one PH configuration parameter may comprise at least one of a PHR prohibit timer, a PHR periodic timer, and/or a PHR pathloss change threshold. The at least one beam failure detection configuration parameter may comprise at least one of a beam failure recovery timer value, a first threshold employed to detect a beam failure, and/or a second threshold employed to identify at least one candidate beam. A PHR value may be associated with at least one of: a first type real PH, a first type virtual PH, a second type real PH, a second type virtual PH, a third type real PH, and/or a third type virtual PH. A wireless may trigger a PHR based on at least one of: the PHR prohibit timer being expired and/or a pathloss change larger than the PHR pathloss change threshold, the PHR prohibit timer having been expired and/or a pathloss change larger than the PHR pathloss change threshold, the PHR periodic timer being expired, (re)configuration of the PHR functionality, an activation of at least one secondary cell configured with at least one uplink, an addition of a primary secondary cell, and/or a beam failure detection on one or more cells associated with the wireless device.

A method may comprise receiving, by a wireless device from a base station, one or more messages comprising configuration parameters of one or more cells comprising a first cell; determining a detection of a beam failure for a downlink control channel of the first cell; and/or sending (e.g., transmitting), based on (e.g., in response to) the detection of the beam failure, at least one medium access channel control element comprising: a first field indicating a presence of one or more fields for the first cell, and/or the one or more fields indicating the beam failure for the downlink control channel of the first cell. The at least one medium access channel control element may be a power headroom reporting medium access channel control element. The at least one medium access channel control element may comprise one or more second fields indicating: a power headroom value of the first cell, and/or an allowed transmit power of the wireless device. The power headroom value may be based on a first virtual power headroom determined without a transmission via the uplink shared channel. Based on (e.g., in response to) the first cell comprising a first uplink carrier and a second uplink carrier, the power headroom value may comprise: a first power headroom value of the first uplink carrier, and/or a second power headroom value of the second uplink carrier. The second power headroom value may be determined based on a transmit power of one or more sounding reference signals of the second uplink carrier based on (e.g., in response to) a scheduled transmission of the one or more sounding reference signals of the second uplink carrier. The second power headroom value may be determined based on one or more reference power values of the one or more sounding reference signals of the second uplink carrier based on (e.g., in response to) the one or more sounding reference signals of the second uplink carrier not being scheduled to transmit.

The one or more messages may comprise beam configuration parameters indicating: configuration of one or more reference signals for a beam failure recovery procedure, a first threshold for the beam failure recovery procedure, a second threshold for the beam failure recovery procedure, one or more random access resources for the beam failure recovery procedure, and/or association between each of one or more random access resources and at least one of the one or more reference signals. The one or more random access resources may comprise: one or more random access channels, and/or one or more preambles.

The method may further comprise performing a beam failure recovery procedure comprising: measuring the one or more reference signals, determining a block error rate of a downlink control channel being higher than the first threshold, identifying, as a candidate beam, at least one of the one or more reference signals based on one or more measured received signal powers of the one or more reference signals, sending (e.g., transmitting) at least one of the one or more preambles to perform the beam failure recovery procedure, wherein the at least one of the one or more preambles is associated with the at least one of the one or more reference signals, and/or monitoring a downlink control channel for a corresponding response.

The configuration parameters further may further comprise: a first value of a beam detection timer, a second value of a beam failure recovery timer, and/or a third value of a beam failure detection counter. The detection of a beam failure may be based on (e.g., in response to) the determining the block error rate of the downlink control channel being higher than the first threshold. The method may further comprise: incrementing the beam failure detection counter by one based on (e.g., in response to) the determining the block error rate, and/or starting a beam recovery timer based on (e.g., in response to) the beam failure detection counter being equal to the third value. The detection of a beam failure may be based on (e.g., in response to) the starting a beam recovery timer. The method may further comprise determining that the beam failure recovery procedure unsuccessfully completed based on (e.g., in response to): no response corresponding the at least one of the one or more preambles, and/or the beam recovery timer expiring. The detection of a beam failure may be based on (e.g., in response to) the determining the beam failure recovery procedure unsuccessfully completed.

The configuration parameters may comprise at least one power headroom configuration parameter indicating at least one of a prohibit timer value, a periodic timer value, and/or a pathloss change threshold. The method may further comprising: sending (e.g., transmitting) at least one second medium access channel control element, and/or starting, based on (e.g., in response to) the sending: a prohibit timer, and/or a periodic timer. The wireless device may send (e.g., transmit) the at least one medium access channel control element further based on (e.g., in response to) at least one of: the prohibit timer being expired and a pathloss change of the one or more reference signals larger than the pathloss change threshold, the prohibit timer having been expired and a pathloss change of the one or more reference signals larger than the pathloss change threshold, the periodic timer being expired, an activation of at least one secondary cell configured with at least one uplink, and/or an addition of a primary secondary cell. The method may further comprise, based on (e.g., in response to) sending at least one medium access channel control element, restarting: the prohibit timer, and/or the periodic timer.

A method may comprise: receiving, by a wireless device from a base station, one or more messages comprising: configuration parameters of one or more cells comprising a first cell, and/or beam configuration parameters comprising a threshold; measuring a block error rate of one or more downlink control channels of the first cell; determining a beam failure for the one or more downlink control channel of the first cell based on (e.g., in response to) the block error rate being higher than the threshold; and/or sending (e.g., transmitting), based on (e.g., in response to) the determining the beam failure, at least one medium access channel control element comprising: a first field indicating a presence of one or more second fields for the first cell, and/or the one or more second fields indicating the beam failure for the downlink control channel of the first cell.

A method may comprise receiving, by a wireless device from a base station, one or more messages comprising configuration parameters indicating: a first threshold, a second threshold, and/or one or more downlink reference signals of the first cell; measuring a block error rate of one or more downlink control channels of the first cell; determining a beam failure for the one or more downlink control channel of the first cell in response to the block error rate being higher than the first threshold; measuring one or more received signal powers of the one or more downlink reference signals; and/or sending (e.g., transmitting), in response to the determining the beam failure and the one or more received signal powers being lower than the second threshold, at least one medium access channel control element comprising: a first field indicating a presence of one or more second fields for the first cell, and/or the one or more second fields indicating the beam failure for the downlink control channel of the first cell.

Figure 36:
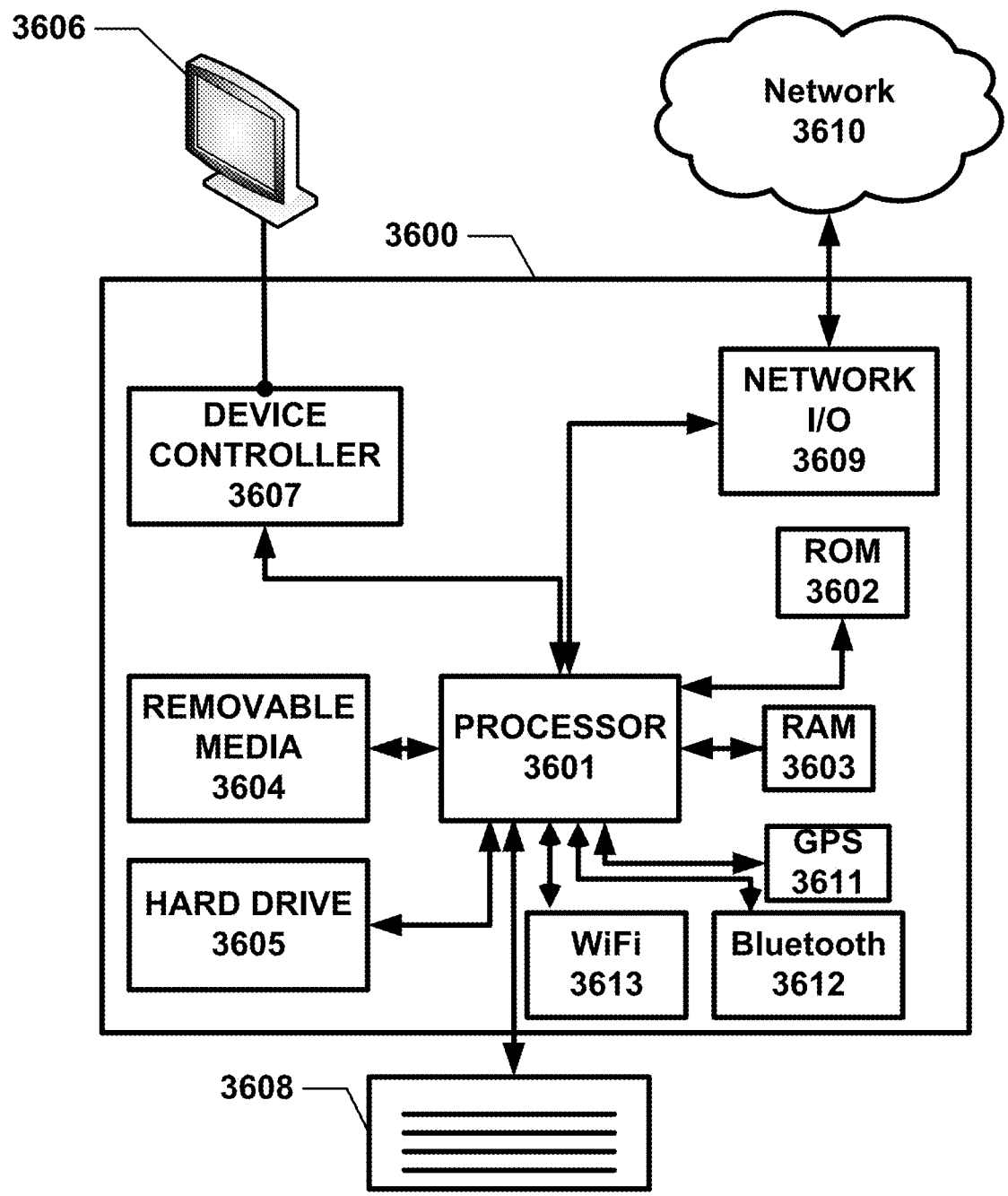
FIG. 36 shows example elements of a computing device that may be used to implement any of the various devices described herein.

FIG. 36 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3600 may include one or more processors 3601, which may execute instructions stored in the random access memory (RAM) 3603, the removable media 3604 (such as a Universal Serial Bus (USB) drive, compact disk (CD) or digital versatile disk (DVD), or floppy disk drive), or any other desired storage medium. Instructions may also be stored in an attached (or internal) hard drive 3605. The computing device 3600 may also include a security processor (not shown), which may execute instructions of one or more computer programs to monitor the processes executing on the processor 3601 and any process that requests access to any hardware and/or software components of the computing device 3600 (e.g., ROM 3602, RAM 3603, the removable media 3604, the hard drive 3605, the device controller 3607, a network interface 3609, a GPS 3611, a Bluetooth interface 3612, a WiFi interface 3613, etc.). The computing device 3600 may include one or more output devices, such as the display 3606 (e.g., a screen, a display device, a monitor, a television, etc.), and may include one or more output device controllers 3607, such as a video processor. There may also be one or more user input devices 3608, such as a remote control, keyboard, mouse, touch screen, microphone, etc.

The computing device 3600 may also include one or more network interfaces, such as a network interface 3609, which may be a wired interface, a wireless interface, or a combination of the two. The network interface 3609 may provide an interface for the computing device 3600 to communicate with a network 3610 (e.g., a RAN, or any other network). The network interface 3609 may include a modem (e.g., a cable modem), and the external network 3610 may include communication links, an external network, an in-home network, a provider's wireless, coaxial, fiber, or hybrid fiber/coaxial distribution system (e.g., a DOCSIS network), or any other desired network. Additionally, the computing device 3600 may include a location-detecting device, such as a global positioning system (GPS) microprocessor 3611, which may be configured to receive and process global positioning signals and determine, with possible assistance from an external server and antenna, a geographic position of the computing device 3600.

The example in FIG. 36 may be a hardware configuration, although the components shown may be implemented as software as well. Modifications may be made to add, remove, combine, divide, etc. components of the computing device 3600 as desired. Additionally, the components may be implemented using basic computing devices and components, and the same components (e.g., processor 3601, ROM storage 3602, display 3606, etc.) may be used to implement any of the other computing devices and components described herein. For example, the various components described herein may be implemented using computing devices having components such as a processor executing computer-executable instructions stored on a computer-readable medium, as shown in FIG. 36. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology. One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
receiving, by a wireless device from a base station, at least one message comprising configuration parameters of at least one cell;
determining beam failure for a plurality of cells; and
transmitting, based on the beam failure for the plurality of cells, at least one medium access control (MAC) control element (CE) comprising:
a plurality of first fields, wherein each first field of the plurality of first fields is associated with a cell of the plurality of cells and indicates a presence of a second field, of a plurality of second fields, for that cell; and
the plurality of second fields, wherein each second field of the plurality of second fields is associated with beam failure for a cell of the plurality of cells.

2. The method of claim 1, wherein the beam failure for the plurality of cells is associated with at least one downlink control channel of the plurality of cells.

3. The method of claim 1, wherein the at least one MAC CE is associated with at least one of:
reporting beam failure;
a beam failure indication;
a power backoff;
a real transmission;
a reference format;
a power headroom report (PHR); or
a transmit power.

4. The method of claim 1, wherein the transmitting the at least one MAC CE comprises transmitting the at least one MAC CE via a second cell.

5. The method of claim 1, wherein the plurality of second fields comprises beam information associated with the beam failure for the plurality of cells.

6. The method of claim 1, wherein the at least one message comprises beam configuration parameters indicating at least one of:
configuration of at least one reference signal for beam failure recovery;
a first threshold for beam failure recovery;
a second threshold for beam failure recovery;
at least one random access resource for beam failure recovery; or association between each of the at least one random access resource and the at least one reference signal.

7. The method of claim 1, further comprising based on the beam failure for the plurality of cells:
transmitting, via a second cell, at least one preamble associated with beam failure recovery; and
monitoring a downlink control channel for a response to the at least one preamble; and
wherein the transmitting the at least one MAC CE comprises transmitting the at least one MAC CE after determining that the response has not been received.

8. The method of claim 1, wherein the at least one MAC CE further comprises:
at least one third field, associated with a second cell, that indicates lack of presence of at least one fourth field for the second cell.

9. A method comprising:
determining, by a wireless device configured to receive downlink communications, beam failure for a plurality of cells;
transmitting, based on the beam failure for the plurality of cells, at least one medium access control (MAC) control element (CE) comprising:
a plurality of first fields, wherein each first field of the plurality of first fields is associated with a cell of the plurality of cells and indicates a presence of a second field, of a plurality of second fields, for that cell; and
the plurality of second fields, wherein each second field of the plurality of second fields is associated with beam failure for a cell of the plurality of cells;
transmitting, via at least one cell and based on at least one beam failure, at least one preamble; and
monitoring a downlink control channel for a response to the at least one preamble.

10. The method of claim 9, wherein the transmitting the at least one MAC CE comprises transmitting the at least one MAC CE after determining the response has not been received.

11. The method of claim 9, wherein the at least one MAC CE is associated with at least one of:
reporting beam failure;
a beam failure indication;
a power backoff;
a real transmission;
a reference format;
a power headroom report (PHR); or
a transmit power.

12. The method of claim 9, wherein the transmitting the at least one MAC CE comprises transmitting the at least one MAC CE via a second cell.

13. The method of claim 9, wherein the at least one MAC CE further comprises:
a third field, associated with a second cell, that indicates lack of presence of a fourth field for the second cell.

14. A method comprising:
determining, by a wireless device configured to receive downlink communications, beam failure for a plurality of cells; and
transmitting, based on the beam failure for the plurality of cells, at least one medium access control (MAC) control element (CE) comprising:
a plurality of first fields, wherein each first field of the plurality of first fields is associated with a cell of the plurality of cells and indicates a presence of a second field, of a plurality of second fields, for that cell; and the plurality of second fields, wherein each second field of the plurality of second fields is associated with beam failure for a cell of the plurality of cells.

15. The method of claim 14, wherein the beam failure for the plurality of cells is associated with at least one downlink control channel of the plurality of cells.

16. The method of claim 14, wherein the at least one MAC CE is associated with at least one of:
    reporting beam failure;
    a beam failure indication;
    a power backoff;
    a real transmission;
    a reference format;
    a power headroom report (PHR); or
    a transmit power.

17. The method of claim 14, wherein the at least one MAC CE further comprises:
    a third field, associated with a second cell, that indicates lack of presence of a fourth field for the second cell.

18. The method of claim 14, wherein at least one cell of the plurality of cells is configured as a downlink-only cell for the wireless device.

\* \* \* \* \*

UNITED STATES PATENT AND TRADEMARK OFFICE
CERTIFICATE OF CORRECTION

PATENT NO. : 11,419,066 B2
APPLICATION NO. : 16/277400
DATED : August 16, 2022
INVENTOR(S) : Jeon et al.

It is certified that error appears in the above-identified patent and that said Letters Patent is hereby corrected as shown below:

On the Title Page

Page 3, Column 2, item (56) Other Publications, Line 70:
Delete "an" and insert --on-- therefor Page 4, Column 1, item (56) Other Publications, Line 36:
Delete "an" and insert --on-- therefor Page 4, Column 2, item (56) Other Publications, Line 2:
Delete "Media Tek" and insert --MediaTek-- therefor Page 4, Column 2, item (56) Other Publications, Line 62:
Delete "CPPO" and insert --OPPO-- therefor Page 5, Column 1, item (56) Other Publications, Line 25:
Delete "anhancement" and insert --enhancement-- therefor Page 5, Column 1, item (56) Other Publications, Line 41:
Delete "mutli-CC" and insert --multi-CC-- therefor Page 5, Column 2, item (56) Other Publications, Line 31:
Delete "Bedin," and insert --Berlin,-- therefor Page 5, Column 2, item (56) Other Publications, Line 60:
Delete "tor" and insert --for-- therefor Page 6, Column 1, item (56) Other Publications, Line 62:
Delete "Discussior" and insert --Discussion-- therefor Signed and Sealed this
Second Day of July, 2024

Katherine Kelly Vidal
*Director of the United States Patent and Trademark Office*

Page 6, Column 2, item (56) Other Publications, Line 17:
Delete "an" and insert --on-- therefor Page 7, Column 1, item (56) Other Publications, Line 38:
Delete "ncorpated," and insert --Incorporated,-- therefor Page 7, Column 1, item (56) Other Publications, Line 47:
After "Title", insert --:-- therefor Page 7, Column 2, item (56) Other Publications, Line 34:
Delete "bean" and insert --beam-- therefor Page 7, Column 2, item (56) Other Publications, Line 37:
Delete "mean" and insert --beam-- therefor Page 8, Column 1, item (56) Other Publications, Line 67:
Delete "Remaing" and insert --Remaining-- therefor Page 8, Column 2, item (56) Other Publications, Line 38:
Delete "Shangha" and insert --Shanghai-- therefor Page 9, Column 1, item (56) Other Publications, Line 49:
Delete "ncorporated." and insert --Incorporated,-- therefor Page 9, Column 1, item (56) Other Publications, Line 55:
Delete "mpacts:" and insert --Impacts:-- therefor Page 9, Column 1, item (56) Other Publications, Line 64:
Delete "Z018," and insert --2018,-- therefor Page 9, Column 1, item (56) Other Publications, Line 67:
Delete "Z018," and insert --2018,-- therefor Page 9, Column 2, item (56) Other Publications, Line 2:
Delete "Z018," and insert --2018,-- therefor Page 9, Column 2, item (56) Other Publications, Line 49:
Delete "#10Z," and insert --#102,-- therefor Page 9, Column 2, item (56) Other Publications, Line 63:
Delete "R2-18080Z4" and insert --R2-1808024-- therefor Page 10, Column 1, item (56) Other Publications, Line 2:
Delete "Dormat" and insert --Dormant-- therefor Page 10, Column 2, item (56) Other Publications, Line 19:
Delete "W2" and insert --WG2-- therefor In the Specification Column 10, Detailed Description, Line 21:
Delete "RRC Idle" and insert --RRC_Idle-- therefor Column 10, Detailed Description, Line 23:
Delete "RRC Idle" and insert --RRC_Idle-- therefor Column 10, Detailed Description, Line 36:
Delete "RRC Idle" and insert --RRC_Idle-- therefor Column 10, Detailed Description, Line 60:
Delete "MasterinformationBlock" and insert --MasterInformationBlock-- therefor Column 10, Detailed Description, Line 65:
Delete "RRC Idle" and insert --RRC_Idle-- therefor Column 12, Detailed Description, Line 59:
After "station 2", insert --, 120B-- therefor Column 23, Detailed Description, Line 14:
Delete "RRC IDLE" and insert --RRC_IDLE-- therefor Column 28, Detailed Description, Line 54:
Delete "RRC IDLE," and insert --RRC_IDLE,-- therefor Column 32, Detailed Description, Line 5:
Delete "1250," and insert --1240,-- therefor Column 34, Detailed Description, Line 20:
Delete "RRC_Connected" and insert --RRC Connected-- therefor Column 34, Detailed Description, Line 22:
Delete "RRC Idle," and insert --RRC_Idle,-- therefor Column 39, Detailed Description, Line 32:
Delete "RRC IDLE" and insert --RRC_IDLE-- therefor Column 40, Detailed Description, Line 63:
Delete "1810" and insert --1812-- therefor Column 40, Detailed Description, Line 65:
Delete "1802" and insert --1812-- therefor

CERTIFICATE OF CORRECTION (continued)
U.S. Pat. No. 11,419,066 B2

Column 41, Detailed Description, Line 1:
Delete "2013," and insert --1813,-- therefor Column 50, Detailed Description, Line 32:
Delete "SUL1multiplePHR" and insert --SULmultiplePHR-- therefor Column 52, Detailed Description, Line 67:
Delete "in in" and insert --in-- therefor Column 54, Detailed Description, Lines 52-55:
Delete "$PH_{type1,f,c}(i,j,q_d,l) = P_{CMAX,f,c}(i) - \{P_{O\_PUSCH,f,c}(j) + 10\log_{10}(2^\mu \cdot M_{RB,f,c}^{PUSCH}(i)) + \alpha_{f,c}(j) \cdot PL_{f,c} + \Delta_{TF,f,c}(i) + f_{f,c}(i,l)\} \, [dB]$" and insert --$PH_{type1,f,c}(i,j,q_d,l) = P_{CMAX,f,c}(i) - \{P_{O\_PUSCH,f,c}(j) + 10\log_{10}\left(2^\mu \cdot M_{RB,f,c}^{PUSCH}(i)\right) + \alpha_{f,c}(j) \cdot PL_{f,c}(q_d) + \Delta_{TF,f,c}(i) + f_{f,c}(i,l)\} \, [dB]$ -- therefor Column 54, Detailed Description, Line 56:
Delete "$P_{O\_PUSCH,f,c}(i)$," and insert --$P_{O\_PUSCH,f,c}(j)$-- therefor Column 54, Detailed Description, Line 67:
Delete "$2^\mu \cdot M_{RB,f,c}^{PUSCH} = 1$)" and insert --$2^\mu \cdot M_{RB,f,c}^{PUSCH}(i) = 1$)-- therefor Column 55, Detailed Description, Lines 5-7:
Delete "$PH_{type1,f,c}(i,j,q_d,l) = \tilde{P}_{CMAX,f,c}(i) - \{P_{O\_PUSCH,f,c}(j) + \alpha_{f,c}(j) \cdot PL_{f,c}(q_d) + f_{f,c}(i,l)\} \, [dB]$" and insert --$PH_{type1,f,c}(i,j,q_d,l) = \tilde{P}_{CMAX,f,c}(i) - \{P_{O\_PUSCH,f,c}(j) + \alpha_{f,c}(j) \cdot PL_{f,c}(q_d) + f_{f,c}(i,l)\} \, [dB]$ -- therefor Column 56, Detailed Description, Line 46:
After "period", insert --i-- therefor Column 56, Detailed Description, Line 55:
Delete "in in" and insert --in-- therefor Column 57, Detailed Description, Lines 24-25:
Delete "PDSCH-to-HARQ_feeback" and insert --PDSCH-to-HARQ_feedback-- therefor Column 58, Detailed Description, Line 14:
Delete "bits variable" and insert --bits --variable-- therefor

CERTIFICATE OF CORRECTION (continued)
U.S. Pat. No. 11,419,066 B2

Column 58, Detailed Description, Line 15:
Delete "bits the" and insert --bits --the-- therefor Column 59, Detailed Description, Line 32:
Delete "bits the" and insert -- bits --the-- therefor Column 59, Detailed Description, Lines 38-39:
Delete "PRB bundling OFF" and insert --PRB_bundling=OFF-- therefor Column 59, Detailed Description, Lines 39-40:
Delete "PRB bundling ON);" and insert --PRB_bundling=ON);-- therefor Column 59, Detailed Description, Lines 54-55:
Delete "bits the" and insert --bits --the-- therefor Column 62, Detailed Description, Line 37:
After "$P_{PUSCH,c}(i)$", insert --,--

Column 62, Detailed Description, Lines 46-47:
Delete "$P_{SRS,c}(i)$ respectively," and insert --$P_{SRS,c}(i)$, respectively.-- therefor Column 62, Detailed Description, Line 60:
Delete "(HIT)" and insert --(HII)-- therefor Column 63, Detailed Description, Line 61:
Delete "$P_{PUSCH,c}$" and insert --$P_{\text{PUSCH},c}(i)$-- therefor Column 64, Detailed Description, Line 34:
Delete "$P_{O\_UE\_PUSCH,c,2}(1) \quad P_{O\_NOMINAL\_PUSCH,c,2}(1),$"
and insert --$P_{O\_PUSCH,c}(1) = P_{O\_UE\_PUSCH,c,2}(1) + P_{O\_NOMINAL\_PUSCH,c,2}(1)$,-- therefor Column 64, Detailed Description, Line 50:
Delete "$P_{O\_PUSCH,c}(i)$" and insert --$P_{\text{O\_PUSCH, c}}(j)$-- therefor Column 65, Detailed Description, Line 16:
Delete "PL$_c$=referenceSignalPower higher" and insert --PL$_c$=referenceSignalPower-higher-- therefor Column 66, Detailed Description, Line 16:
Delete "f$_c$(c)" and insert --f$_c$(i)-- therefor Column 66, Detailed Description, Line 26:
Delete "f$_c$(i), f$_c$(i−1)+$\delta_{PUSCH,c}$(i−K$_{PUSCH}$)" and insert --$f_c(i) = f_c(i-1) + \delta_{\text{PUSCH},c}(i - K_{\text{PUSCH}})$-- therefor Column 66, Detailed Description, Line 27:
After "$\delta_{PUSCH,c}$(i−K$_{PUSCH}$)", insert --,--

CERTIFICATE OF CORRECTION (continued)
U.S. Pat. No. 11,419,066 B2

Column 67, Detailed Description, Line 21:
Delete "and/may" and insert --and I may-- therefor Column 67, Detailed Description, Line 26:
Delete "to," and insert --to-- therefor Column 67, Detailed Description, Lines 26-27:
Delete "$K_{PUSCH}$, PUSCH" and insert --$K_{PUSCH}$-- therefor Column 67, Detailed Description, Line 31:
After "i-$K_{PUSCH}$", insert --,-- therefor Column 69, Detailed Description, Line 3:
Delete "$f_c(i)+\delta_{PUSCH,c}(i–K_{PUSCH})$" and insert --$f_c(i) = \delta_{PUSCH,c}(i–K_{PUSCH})$-- therefor Column 69, Detailed Description, Line 43:
Delete "i'=mod($n_{HARQ\_ID}^i$−$n_{HARQ\_ID}N_{HARQ}$)" and insert -- $i' = \mod\left(n^i_{HARQ\_ID} - n_{HARQ\_ID}, N_{HARQ}\right)$ -- therefor Column 69, Detailed Description, Line 57:
Delete "$i' = \mod(n_{HARQ\_ID}^i - n_{HARQ\_ID} N_{HARQ})$" and insert -- $i' = \mod\left(n^i_{HARQ\_ID} - n_{HARQ\_ID}, N_{HARQ}\right)$ -- therefor Column 69, Detailed Description, Line 67:
Delete "1 $K_{PUSCH}$." and insert --i-$K_{PUSCH}$.-- therefor Column 70, Detailed Description, Line 42:
Delete "$f_c$" and insert --$f_c(0)$-- therefor Column 70, Detailed Description, Line 51:
After "in the", delete "and"

Column 70, Detailed Description, Line 51:
After "cell c,", insert --and-- therefor Column 71, Detailed Description, Line 20:
Delete "PUCCH" and insert --$P_{PUCCH}$-- therefor Column 71, Detailed Description, Line 62:
Delete "h($n_{CQI},n_{HARQ},n_{SR}$)" and insert --$h(n_{CQI}, n_{HARQ}, n_{SR})$-- therefor Column 72, Detailed Description, Lines 45-46:

After "$h(n_{CQI}, n_{HARQ}, n_{SR}) = \frac{n_{HARQ} + n_{SR} - 1}{3}$", insert --,--

Column 72, Detailed Description, Line 65:

After "$h(n_{CQI}, n_{HARQ}, n_{SR}) = \frac{n_{HARQ} + n_{SR} + n_{CQI} - 1}{3}$", insert --,--

Column 73, Detailed Description, Line 30:

Delete "$N_{svmb}^{PUCCH}=2 \cdot (N_{svmb}^{UL}-1)-1.$" and insert -- $N_{symb}^{PUCCH} = 2 \cdot (N_{symb}^{UL} - 1)$ --- therefor Column 74, Detailed Description, Line 40:
Delete "$k_{in}$" and insert --$k_m$-- therefor Column 75, Detailed Description, Line 47:
Delete "SRS" and insert --$P_{SRS}$-- therefor Column 76, Detailed Description, Line 27:
After "i-$K_{SRS}$", insert --,-- therefor Column 76, Detailed Description, Line 27:
After "$K_{SRS} \geq 4$", insert --.-- therefor Column 76, Detailed Description, Line 65:
After "$f_{SRS,c}(0)=\Delta P_{rampup,c}=\delta_{msg2,c}$", insert --,--

Column 77, Detailed Description, Line 20:
Delete "$P_{PUSCH,f,c}(i,j,q_d,1)$" and insert --$P_{PUSCH,f,c}(i,j,q_d,l)$-- therefor Column 77, Detailed Description, Line 20:
Delete "$P_{PUSCH,f,c}(i,j,q_d,1)$" and insert --$P_{PUSCH,f,c}(i,j,q_d,l)$-- therefor Column 77, Detailed Description, Line 29:
Delete "$\hat{P}_{PUSCH,f,c}(i,j,q_d,1)$" and insert --$P_{PUSCH,f,c}(i,j,q_d,l)$-- therefor Column 77, Detailed Description, Line 48:
Delete "$P_{O\_NOMINAL\_PUSCH,f,c}(i),$" and insert --$P_{O\_UE\_PUSCH,f,c}(j),$-- therefor Column 77, Detailed Description, Line 51:
After "$P_{O\_UE\_PUSCH,f,c}(0)=0$", insert --,--

Column 77, Detailed Description, Line 53:
Delete "0 PRE)" and insert --$P_{O\_PRE}$)-- therefor

CERTIFICATE OF CORRECTION (continued)
U.S. Pat. No. 11,419,066 B2

Column 77, Detailed Description, Line 54:
Delete "$\Delta_{PREAMBLE\_Msg3}$" and insert -- $\Delta_{PREAMBLE\_Msg3}$ )-- therefor Column 77, Detailed Description, Line 59:
Delete "$P_{O\_UE\_PUSCH,f,c}$" and insert -- $P_{O\_UE\_PUSCH,f,c}(1)$ -- therefor Column 77, Detailed Description, Line 62:
Delete "$P_{O\_NOMINAL\_PUSCH,f,c}(i)$" and insert -- $P_{O\_NOMINAL\_PUSCH,f,c}(j)$ -- therefor Column 78, Detailed Description, Line 44:
After "j=0", insert --,-- therefor Column 78, Detailed Description, Line 53:
Delete "$\Delta_{TF,f,c}(t)=0$" and insert -- $\Delta_{TF,f,c}(i) = 0$ -- therefor Column 79, Detailed Description, Line 4:
Delete "K," and insert --$K_r$-- therefor Column 79, Detailed Description, Line 4:
Delete "r." and insert --r,-- therefor Column 79, Detailed Description, Line 7:
Delete "$N_{RE}=M_{RB,f,c}^{PUSCH}(i) \cdot M_{symb,f,c}^{PUSCH}$" and insert -- $N_{RE} = M_{RB,f,c}^{PUSCH}(i) \cdot N_{symb,f,c}^{PUSCH}(i)$ -- therefor Column 79, Detailed Description, Line 8:
Delete "$M_{symb,f,c}^{PUSCH}(i)$" and insert -- $N_{symb,f,c}^{PUSCH}(i)$ -- therefor Column 79, Detailed Description, Line 10:
After "period", insert --i-- therefor Column 79, Detailed Description, Line 14:
Delete "$\beta_{offset}^{PUSCH}=\beta_{offset}^{CS1,1}$," and insert -- $\beta_{offset}^{PUSCH} = \beta_{offset}^{CS1,1}$,-- therefor Column 79, Detailed Description, Line 22:
After "period", insert --i--

Column 79, Detailed Description, Line 35:
After "l∈{1,2}", insert --,--

Column 79, Detailed Description, Line 66:

CERTIFICATE OF CORRECTION (continued)
U.S. Pat. No. 11,419,066 B2

Delete "$P_{O\_UE\_PUSCH,f,c}(1)$" and insert --$P_{O\_UE\_PUSCH,f,c}(j)$-- therefor Column 80, Detailed Description, Line 29:
After "$\Delta P_{rampup,f,c}+\delta_{msg2,f,c}$", insert --,--

Column 80, Detailed Description, Line 54:
Delete "c." and insert --c-- therefor

Column 81, Detailed Description, Line 36:
Delete "$0 \leq q_u < Q_u$," and insert --$0 \leq q_u < Q_u$,-- therefor Column 81, Detailed Description, Line 42:
Delete "$q_d$." and insert --$q_d$,-- therefor Column 82, Detailed Description, Line 15:
After "example of", delete "a"

Column 82, Detailed Description, Line 31:
Delete "$g_{f,c}(0,1)=\Delta P_{rampupf,c}+$" and insert --$g_{f,c}(0,l) = \Delta P_{rampup,f,c}$--

Column 82, Detailed Description, Line 38:
"$\delta_{msg2,f,c}))\}$," and insert --$\delta_{msg2,f,c}))\}$-- therefor Column 82, Detailed Description, Line 41:
Delete "$(P_{O\_PUCCH,f,c}+PL_c)))\}$," and insert --$\delta_{msg2,f,c}))\}$-- therefor Column 82, Detailed Description, Line 42:
Before "be provided", insert --may-- therefor Column 83, Detailed Description, Line 11:
Delete "$P_{CMAX,f,c}(j)$" and insert --$P_{CMAX,f,c}(i)$-- therefor Column 83, Detailed Description, Line 17:
After "period", insert --i-- therefor Column 83, Detailed Description, Line 18:
After "and", insert --μ-- therefor Column 83, Detailed Description, Line 39:
After "period", insert --i,-- therefor Column 83, Detailed Description, Line 40:
After "$h_{f,c}(i)=h_{f,c}(i-1)+\delta_{SRS,f,c}(i-K_{SRS})$", insert --,-- therefor Column 83, Detailed Description, Line 53:
Delete "$\delta_{SRS,f,c}(i-K_{SRS})$" and insert --$\delta_{SRS,f,c}(i-K_{SRS}) = 0$-- therefor Column 83, Detailed Description, Line 58:
Delete "$P_{CMAX,f,c}(1)$" and insert --$P_{CMAX,f,c}(i)$-- therefor